US006985905B2

(12) United States Patent
Prompt et al.

(10) Patent No.: US 6,985,905 B2
(45) Date of Patent: Jan. 10, 2006

(54) SYSTEM AND METHOD FOR PROVIDING ACCESS TO DATABASES VIA DIRECTORIES AND OTHER HIERARCHICAL STRUCTURES AND INTERFACES

(75) Inventors: Michel Prompt, Novato, CA (US); Claude Y. Samuelson, Novato, CA (US)

(73) Assignee: Radiant Logic Inc., Novato, CA (US)

( * ) Notice: Subject to any disclaimer, the term of this patent is extended or adjusted under 35 U.S.C. 154(b) by 145 days.

(21) Appl. No.: 09/798,003

(22) Filed: Mar. 2, 2001

(65) Prior Publication Data
US 2001/0034733 A1    Oct. 25, 2001

Related U.S. Application Data

(60) Provisional application No. 60/186,814, filed on Mar. 3, 2000, provisional application No. 60/203,858, filed on May 12, 2000.

(51) Int. Cl.
G06F 17/30    (2006.01)
(52) U.S. Cl. .................................. 707/102
(58) Field of Classification Search ............ 707/104.1, 707/3, 102, 4, 103 Y
See application file for complete search history.

(56) References Cited

U.S. PATENT DOCUMENTS

| 5,634,053 | A |   | 5/1997  | Noble et al. |
| 5,802,510 | A | * | 9/1998  | Jones ............................ 707/2 |
| 5,974,407 | A |   | 10/1999 | Sacks |
| 6,023,694 | A |   | 2/2000  | Kouchi et al. |
| 6,101,500 | A | * | 8/2000  | Lau ........................ 707/103 R |
| 6,199,062 | B1 | * | 3/2001  | Byrne et al. .................. 707/3 |
| 6,236,988 | B1 | * | 5/2001  | Aldred .......................... 707/3 |

FOREIGN PATENT DOCUMENTS

WO    WO 97/15018    4/1997

* cited by examiner

*Primary Examiner*—Alford Kindred
*Assistant Examiner*—Sana Al-Hashemi
(74) *Attorney, Agent, or Firm*—Fenwick & West LLP

(57) ABSTRACT

A hierarchical/relational translation system is provided for enabling information from unrelated heterogeneous relational computing systems to be accessed, navigated, searched, browsed, and shared over a hierarchical computing system. In one embodiment, the hierarchical/relational translation system includes a virtual directory server for capturing information in the nature of relational database schema and metadata. The captured schema and metadata are then translated into virtual directories that are universally compatible with standard communication protocols used with hierarchical computing systems. A virtual directory of information organizes an index of data records and a standard addressing schema is provided to enable customizable access to relevant views of relational computing systems. Several embodiments for presenting the virtual directory information tree are included. In one embodiment, the virtual directory is displayed using browser format. In another embodiment, the virtual directory is presented in electronic mail format. Still, in another embodiment the virtual directory is presented over a wireless medium and through portable devices.

9 Claims, 59 Drawing Sheets

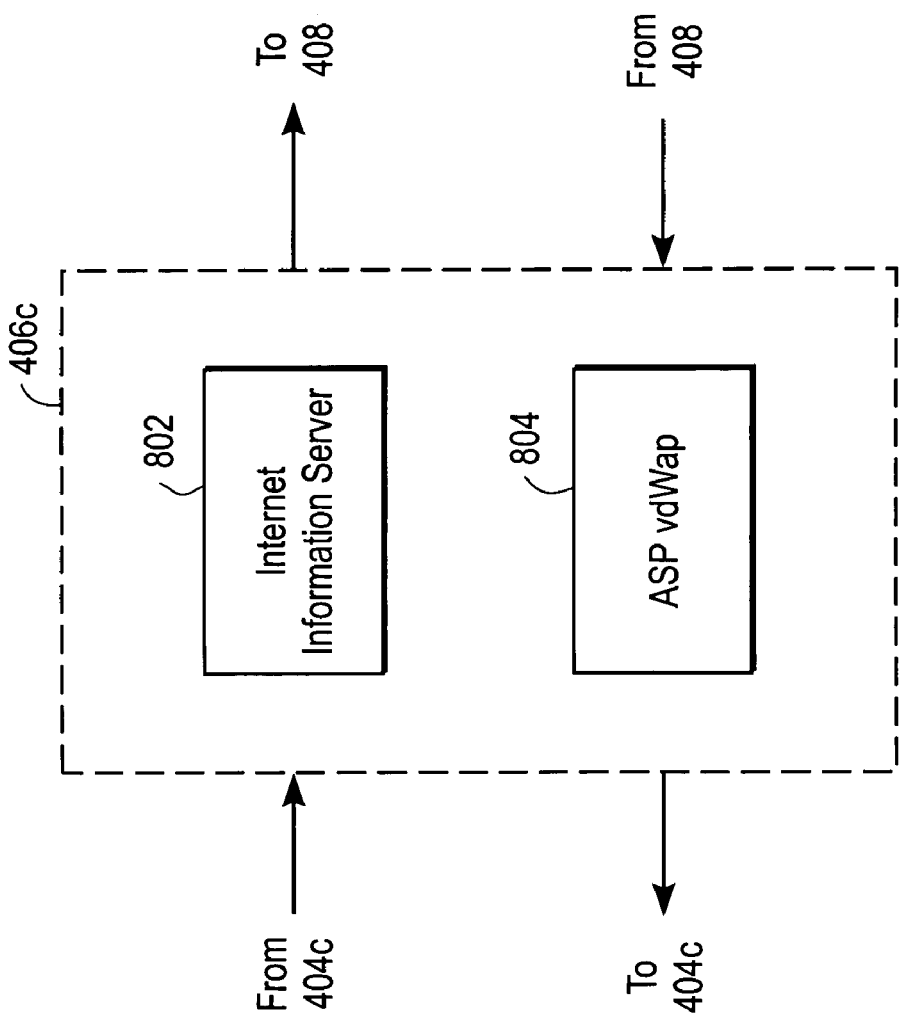

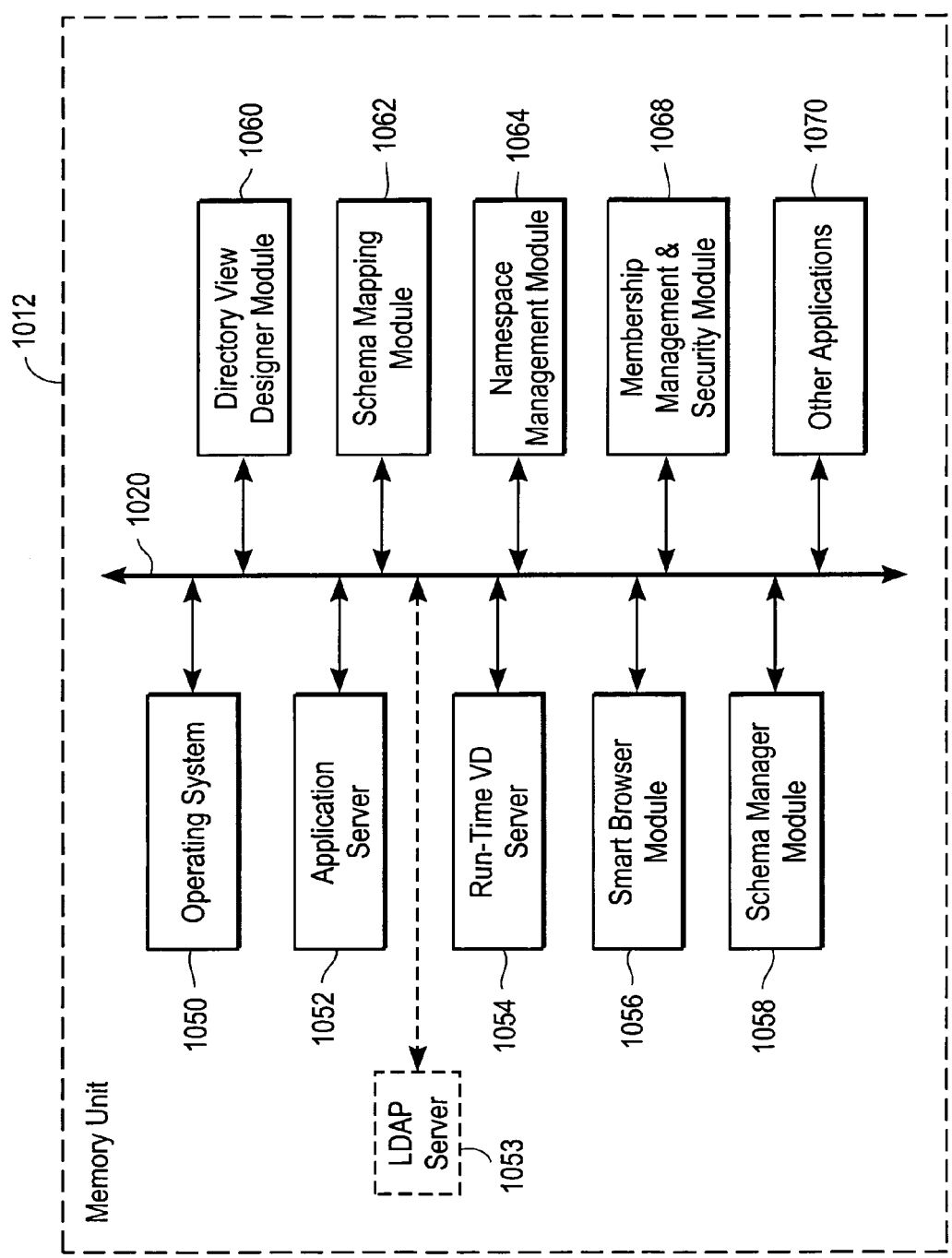

Hub and Router unites back office applications and unlocks their data for use on the Net Unique Addressing Schemas including the new Data Record URL and Hub and Router Structured Data indexes are stored in a Hub and expressed as an LDAP address which can be presented as a directory for use by end-users or by other computers

| Default Table Template | | | Default Form Template | |
|---|---|---|---|---|
| ProductName | UnitPrice | Discontinued | ProductName: | \tDirectView\tField\tProductName\t |
| (ProductName_Column_Data) | (UnitPrice_Column_Data) | (Discontinued_Column_Data) | UnitPrice: | \tDirectView\tField\tUnitPrice\t |
| | | | Discontinued: | \tDirectView\tField\tDiscontinued\t |

FIG. 35

SYSTEM AND METHOD FOR PROVIDING ACCESS TO DATABASES VIA DIRECTORIES AND OTHER HIERARCHICAL STRUCTURES AND INTERFACES

CROSS-REFERENCE TO RELATED APPLICATIONS

This application claims priority under 35 U.S.C. § 119(e) U.S. Provisional Application No. 60/186,814, filed on Mar. 3, 2000, now abandoned, by Michel Prompt, et al., entitled "System and Method for Providing Access to Databases Via Directories and Other Hierarchical Structures and Interfaces," the subject matter of which is herein incorporated by reference in its entirety. This application also claims priority under 35 U.S.C. § 119(e) from U.S. Provisional Application No. 60/203,858, filed on May 12, 2000, now abandoned, by Michel Prompt, et al., entitled "System and Method for Providing Access to Databases Via Directories and Other Hierarchical Structures and Interfaces (CIP)," the subject matter of which is herein incorporated by reference in its entirety.

BACKGROUND OF THE INVENTION

1. Technical Field

The invention relates generally to communication network systems, and more specifically, to a method, system and computer medium for locating, extracting and transforming data from unrelated relational network data sources into an integrated format that may be universally addressed and viewed over network systems according to a hierarchical representation.

2. Description of the Related Art

There are conventionally-known ways of indexing and addressing information on the Internet (also referred to interchangeably as the "Net") using an Internet directory. An Internet directory is an application service that generally performs information retrieval based on properties associated with the data of interest. Internet directories can store various types of objects, wherein each object is associated with a type of property or characteristic. For example, one type of Internet directory that provides a standard way of indexing and addressing the computer servers that host Net sites is the Domain Name System (DNS). Typically, a DNS server includes a method of creating a symbolic name for an Internet Protocol numeric address associated with the hardware of the Net server, and provides the .com, .net, .org, etc., domain addresses.

Along with DNS, users are additionally able to determine an address for documents through the HyperText Transfer Protocol (HTTP) that provides a Uniform Resource Locator (URL) for a page formatted with HyperText Markup Language (HTML). This addressing technique provides users a way to access any web page in the world. Although this addressing scheme has worked well to provide a hierarchical addressing scheme during the initial growth of the worldwide web (Web), the amount and importance of the data continues to expand. In particular, the increasing amounts and wide-spread diversity of information that relates to a significant portion of the world's economy is based on critical data records inside databases. Yet, there is no simple and effective manner in which to address and reference such data records originating from diverse heterogeneous databases according to context. For example, there is no conventional standard URL for a sales total, inventory, or a customer record in a database. Accordingly, there is growing need to reach a finer level of granularity of data addressing and management.

A new level of "granularity" is needed in order to locate and distribute information that is increasingly fragmented in its locale, but that potentially gives rise to value-added benefits when integrated with information from other sources. The evolution of the Internet has created an entirely new set of challenges that include dealing with the millions of web sites, billion of documents and trillions of objects that are now available in an increasingly decentralized computer environment. A completely decentralized Net creates a critical need to categorize (i.e., index) information and provide an address (i.e., location) for each piece of data on the Net. If this does not occur, the Net becomes something like a large telephone system without a telephone directory to look-up and to locate the numbers of individuals and groups. While developers have standardized techniques to organize and communicate much of this information through the conventional indexing techniques described above, they have not adequately addressed the following problems.

In the past, conventional client-server computing was inward-focused and directed to a tightly controlled environment. More specifically, conventional client-server computing was developed for distributed networks, and in particular, for use inside an enterprise or organization. Frequently, many enterprises store their data in a collection of disparate databases and deploy applications based on their short-term departmental needs. This conventional approach becomes increasingly problematic as an enterprise grows and the information contained in these disparate databases become increasingly difficult to integrate. The narrow scope of each application can eventually become a hindrance to the overall needs of the organization as information databases grow and change along with the evolving state of the enterprise.

The difficulties of the inward-focused model are more clearly understood when considered in the context of the future growth pertaining to the Net-based economy, which explodes the conventional inward-focused model into an environment that is highly decentralized and far more open to outward-focused computing. One key problem confronting enterprises that attempt to migrate their businesses onto the Net is how to take advantage of existing lines of business applications that are still bound to the inward-focused client-server model. As such, it would be beneficial to provide enterprises and organizations experiencing this problem with a way to unlock their data for use by other applications and other users. By doing so, these "back office" applications do not risk becoming isolated "islands of automation" in an endless ocean of information. Accordingly, it would be beneficial to be able to access and selectively assemble such data from disparately-located data sources and to automatically manage the data with an integrated view of the network and the application infrastructure. What is needed is an efficient integrated solution to a fragmented and distributed enterprise information system.

Directory services are an established component of the network infrastructure, stemming from the Internet's DNS to electronic mail (email) systems, and to the Operating System (OS) domains of corporate intranets. Applications that can leverage the strength of this infrastructure are on the rise and are placing new demands on the directory architecture. Led by the dramatic growth of e-commerce, it would be desirable to move directory-enabled applications toward a model of centralizing administration. This aspect of centralized administration is beneficial because it would allow tasks to be administered from anywhere in a network. To this end, directory-enabled applications moving towards a model having centralized administration would be better-suited to enable access to a richer set of data than provided by conventional directories.

However, for corporate information technology (IT) staff deploying directories in the past, the process has often proven to be slow and expensive. Conventional Internet directory deployment is slow because the process is complicated, at least for several reasons. First, conventional Internet directories suffer from the "yet another database" syndrome. Because the source of the directory information frequently exists in other parts of the infrastructure, the issues of resolving authoritative ownership of the data can be problematic. Second, the inconsistency amongst the various data sources conventionally require reconciling the different data formats and data models associated with each disparate data source. Third, synchronizing data from disparate sources into the directory requires extensive and careful planning.

These complexities in turn result in higher costs, which is another problem typically experienced with conventional Internet directory deployment. Interestingly, a leading directory market research firm (e.g., the Burton Group) has estimated that a typical enterprise directory might take a year to deploy and cost up to $2 Million.

The LightWeight Directory Access Protocol (LDAP) is a standard directory protocol that can be used to establish a universal addressing scheme. However, the complexity of deploying LDAP alone is a drawback holding back the development of such an addressing scheme as discussed below. LDAP is an open Internet standard addressing scheme for accessing directories that has been adopted by the Internet Engineering Task Force (IETF) standards regulation organization as well as by leading developers in the computing industry. Generally, LDAP is a type of Internet directory service based on the International Telecommunications Union (ITU) X.500 series of recommendations, and which facilitates property-based information retrieval by using one or more Internet transports as a native means for establishing communication between client and server computers. In particular, LDAP is an object-oriented protocol enabling a client to send a message to a server and to receive a response. The server typically maintains a directory of object entries, and the message sent from the client can request that the server add an object entry to the directory. Those skilled in the art will recognize that adding an object to a directory is accomplished by instantiating the object. The data model associated with LDAP includes entries, each of which has information (e.g., attributes) pertaining to an object. The entries can be represented by a hierarchical tree structure. A third version of LDAP known by those skilled in the art to be defined in RFC 2251.

Although LDAP can be used to enable queries and updates to be made to a directory structure, the LDAP implementation alone does not and has not conventionally provided a reliable and scaleable enterprise directory primarily because recursive inquiries are required to accommodate the disparate syntax and semantics used by various database providers. The recursive inquiries involve re-synchronizing information existing in unrelated data sources on an ongoing basis due to the incompatibilities introduced by the disparate data models of each data source. Furthermore, as the number of records in the relational table increases, the need for additional recursive inquiries impedes the reliability, efficiency and scalability of the directory.

In order to take advantage of the features of an LDAP directory, this directory must be first created and populated. Since most of the data that would become the source for this directory resides essentially in RDBMS, the complexity of converting the relational data model to the hierarchical data model is problematic. Conventional directory technology can be built on top of an RDBMS engine, but the internal logic and data model of an LDAP directory is so different from an RDBMS, that this conversion is always required. The internal logic of the RDBMS is typically irrelevant from the perspective of the directory, since the entire schema and organization of the directory is based on LDAP, which is modeled as an object-oriented database with inheritance, object class, attributes, and entries. This difference in data representation and data model is problematic because it forces the directory-implementer through a complex and lengthy data modeling and conversion effort. For example, in conventional directory implementations, the data that resides in the RDBMS must be extracted, and converted into a different information model and format (e.g., LDIF as is known in the art) as an intermediate form, and then imported into an LDAP-based directory. To maintain current information in the directory, this process must be repeated on a regular basis, which brings about re-synchronization.

There are other problems associated with this conventional process. First, translating RDBMS logic into an LDAP-based directory is not a lossless process. For example, data types commonly used by RDBMS applications do not exist in the LDAP model. Such data types include, but are not limited to, date and floating-number fields. Some requirements from LDAP do not correspond an exact translation in RDBMS, like for instance, multivalue attributes. Additionally, the lack of transaction support afforded by LDAP directories means that the success of between "batched import" are not always guaranteed.

The LDAP directories are based on a domain- and attribute-oriented data model, while RDBMS are based on an entity- and relationship-oriented data model. From a theoretical perspective, it can be shown that the two models are equivalent in expressiveness as is understood by those skilled in the art of data modeling. For example, one piece of information represented in one model may be translated without loss into the other model. However, conventional directory implementations have not successfully realized a full implementation of the features of the domain and attribute data model, hence, destroying the possibility for lossless automatic translation from one data model to another.

The consequence of having mismatched data models also results in lengthy and costly deployment for an essential infrastructure function. Nevertheless, LDAP is beneficial for several reasons. For example, LDAP is well-suited for use with directories, as compared to databases, particularly for enabling ubiquitous look-up over a network. Also, the LDAP API is also supported by many conventional client computers having, for example, email or web browser functionality, that virtually any user connected to a network may gain access to directories given the appropriate security clearance. Although the database access API structured query language (SQL) provides rich access capabilities when the data is needed locally, it alone inadequately provides secure data access over a network. In order to provide network access to database data, application programmers must use vendor-specific software drivers to enable secure data access over a network.

Accordingly, there is a need for the deployment of Internet directory services that follows a simpler and more flexible approach with consideration that a significant hurdle to overcome entails the mismatch between the hierarchical data structure of a directory and the more complex relational data models supported by the databases that house the data needed for the directory. What is needed is a way to unite "back office" applications (i.e., those applications distinctive to an enterprise and its corresponding proprietary syntax, semantics, logical information modeling, physical data modeling and other mechanisms) so as to seamlessly gain access to data from these divergent sources, and to integrate the data for value-added applications over computer networks outside each of the specific enterprises. Additionally, it is desirable to provide directory-enabled applications that rely upon a model of centralized administration. By doing so, the directory-enabled applications would allow the inclusion of richer, more complex data and data relationships in the directory than has been conventionally known. It would be beneficial if there were a standard addressing scheme for indexing each data record on the Net. With such a universal addressing scheme, a finer level of granularity of data addressing and management can be achieved, thereby enabling end-users improved access to data content.

SUMMARY OF THE INVENTION

A computer system having a hierarchical/relational translation system is provided for enabling information from unrelated heterogeneous relational computing systems to be accessed, navigated, searched, browsed, and shared over hierarchical computing systems. In one embodiment of the present invention, the relational computing system comprises unrelated heterogeneous relational databases, and the hierarchical computing system comprises a client computer coupled to a communications network. In the same embodiment, the hierarchical/relational translation system includes a virtual directory server for capturing information in the nature of relational database schema and metadata, and for communicating with the client application over the network.

The hierarchical/relational translation system of present invention includes a method for bridging the mismatched and disparate data models used by the database and hierarchical-directory worlds. The method includes accessing and capturing the database schema and metadata from various relational databases. The captured schema and metadata are then translated into virtual directories that are universally compatible with standard communication protocols used with hierarchical computing systems. To do so, the method includes mapping relational database objects and logical relationships to virtual directory entries that are configured to communicate all aspects of the virtual directory structure over the network to the client application.

In the described embodiments, users can search and/or browse the virtual directory to find the data needed or they can query the directory with simple commands to search for the information needed. The present invention also enables the ability to select either default or customized views of the virtual directory.

In accordance with one aspect of the present invention, a standard addressing schema is provided to enable customizable access to relevant views of relational computing systems. In one embodiment of the present invention, the virtual directory server provides the standard accessing schema in the nature of an Information Resource Locator (IRL). The IRL is defined to mean an LDAP URL and is used as an address locator for any type of data record. In particular, the RL enables data to be indexed and addressed through an industry standard representation by the hierarchical computing system. Thus, the system of the present invention provides access to all data through the Internet in a logical and powerful manner.

Another aspect of the present invention comprises distributing the information on the virtual directory server to the hierarchical computing systems with an industry standard communication scheme. With this standard communication scheme used to address data, mission critical databases can be unlocked for a variety of uses. The data can be used to drive e-commerce and e-business applications, thereby being opened for use to far more people than with conventional client-server techniques, while at the same time maintaining proper access control levels. Accordingly, a method is provided for translating the address of any structured data into the structured format of the industry standard representation. In one embodiment of the present invention, an Internet standard known as the Lightweight Directory Access Protocol (LDAP) is used.

With the same embodiment, the present invention is designed to map structured data into an LDAP URL in order to provide an Internet address for data records. In particular, structured data indexes are stored in a virtual directory of information (VDI) and are expressed using an LDAP address, which can be presented as a directory for use by end-users (users). By associating an address for each data record using an industry standard method, the present invention enables individual data records to be accessed over the Internet using a directory environment that users will already be familiar with. The VDI organizes an index of the data records into a directory, and the directory provides a logical organization of the repository of data records. In particular, the data records comprise the address location of the particular records. With the address of a specific data record, a user can locate a very specific piece of information, for example, a sales total, an inventory level, or a price point. In accordance with the present invention, this is beneficial because a virtual directory distribution system creates a new level of data access and granularity for locating and accessing data over networks.

According to another aspect of the present invention, the structured data indexes stored in a VDI and expressed using an LDAP address can be presented as a directory for use by other computers. When the data is referenced using a standardized address, other computer applications may use the data retrieved to drive a process or trigger an event. In accordance with the present invention, the data addresses can be routed for use by such computer applications. To this end, the present invention also introduces a system having a VDI "hub and router" which is used to combine data records located amongst disparate data sources for access in a virtually seamless and transparent manner to a user or computer application. The hub creates a consistent organization of the data records, and the router ensures the query is directed to the source data and back to the user or application invoking the query. Additionally, because the data address are expressed using the industry standard LDAP, multiple VDI hub and router combinations can be deployed within single or multiple enterprises and linked together.

The virtual directory of information organizes an index of data records. According to one aspect of the present invention, a virtual directory server enables the dynamic reconfiguration of a virtual directory information tree and associated content. The dynamic reconfiguration is advantageous because it removes the necessity to replicate database data into the virtual directory. With dynamic reconfiguration, the routing of queries to extract database schema in the source database is returned back to the user or application making the query. In one embodiment of the present invention, the routing of the data records can be implemented automatically through a computer program. In an alternative embodiment, the routing of the data records can be implemented on demand from an end-user.

Another advantage of the present invention is that directory deployment is neither costly nor complicated as with conventional techniques.

In accordance with the present invention, several embodiments for presenting the data records of the virtual directory server are disclosed. In one embodiment, the virtual directory is displayed using a browser format. For example, the virtual directory may be presented to a client application as part of a Windows Explorer page. In another embodiment, the virtual directory is displayed using an electronic mail format at a client application. Still, in another embodiment, the virtual directory is presented over a wireless medium and through portable devices.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The teachings of the present invention can be readily understood by considering the following detailed description in conjunction with the accompanying drawings.

FIG. 8A is a block diagram of a third embodiment for the server of communication system of the FIG. 5C.

FIG. 10B is a block diagram of the memory unit for the hardware of FIG. 10A.

29B illustrates an example of the display name functioning as the default name.

FIG. 35 is a table illustrating a 1×n, and an n×1 default representation in accordance with the present invention.

Figure 1:
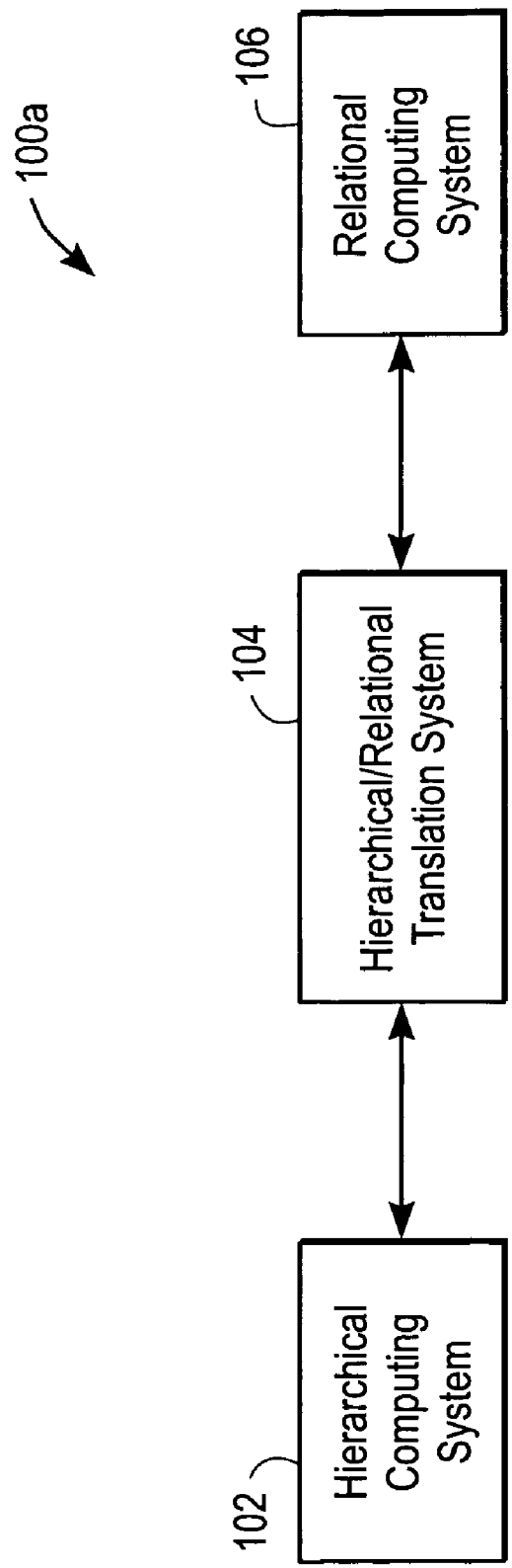
FIG. 1 is a high-level block diagram of a communication system including the hierarchical/relational translation system in accordance with the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

A system, method, computer medium and other embodiments for locating, extracting and transforming data from unrelated sources of information into an integrated format that may be universally addressed over network systems are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as (modules) code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

One aspect of the present invention includes an embodiment of the process steps and instructions described herein in the form of a computer program. Alternatively, the process steps and instructions of the present invention could be embodied in firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Moreover, the present invention is claimed below as operating on or working in conjunction with an information system. Such an information system as claimed may be the entire information system for providing a virtual directory of information as detailed below in the described embodiments or only portions of such a system. For example, the present invention can operate with an information system that need only be a communications network in the simplest sense to catalog information. At the other extreme, the present invention can operate with an information system that locates, extracts and transforms data from a variety of unrelated relational network data sources into a hierarchical network data model through the dynamic reconfiguration of the Directory Information Tree (DIT) and contents without the necessity of replicating information from the relational data sources into the virtual directory as detailed below in the described embodiments or only portions of such a system. Thus, the present invention is capable of operating with any information system from those with minimal functionality, to those providing all of the functionality disclosed herein.

Reference will now be made in detail to several embodiments of the present invention, examples of which are illustrated in the accompanying drawings. Wherever practicable, the same reference numbers will be used throughout the drawings to refer to the same or like parts.

Bridging the Gap between Databases Versus Directories with Virtual Directories

There is an ongoing debate regarding the differences between databases and directories. Accordingly, the differences between directories and databases are now discussed so as to clarify how the virtual directories of the present invention bridges the gap between them.

A. Comparison of Databases and Directories

There exists an ongoing debate that directories are best-suited for applications whose data is stable and that require information to be read quickly and frequently but written slowly and infrequently. This particular view contends that conventional Relational DataBase Management Systems (RDBMS) technology does not yield adequate speed and performance results for such applications. Instead, it is believed by some that in cases where information is rewritten frequently, and where relational data hierarchies and an object model are necessary, databases are best-suited to the task. Consideration of the above-mentioned opinion regarding the correct use of directories must be viewed in its appropriate context, namely where databases are intended only for the storage of very specific types of information that must be propelled by a different kind of engine, which is typically proprietary. This reasoning is based on the assumption that because the directory data is not "relational," RDBMS technology is inappropriate as an engine. Although the usage of directories has been conventionally restricted to a limited type of processing, the present inventors have realized that directories can be considered to be a special case database.

Additionally, such conventional assumptions may not be entirely accurate. Although speed and performance benefits associated with directories are highly attractive features of directories, there are a few situations that contradict the conventional view of choosing RDBMS technology versus directory technology for specific purposes. To say that directories excel in areas where it is obvious that databases do a fine job is misleading. A couple of arguments have been made regarding: (1) the ability of directories to out-perform relational databases; and (2) the specific abilities of directories to be beneficial over databases when data is predominantly read-oriented. However, neither of these arguments appears to be credible upon close scrutiny for the following reasons.

First, regarding relational databases, performance is virtually the highest priority. For example, those in doubt of performance being of highest priority need only review the amount of time database vendors spend on TPC benchmarks in attempting to woo customers by proving split-second differences in performance over the competition.

Second, the argument for better treatment of read-only data does a disservice to database vendors. Business-critical applications deployed in separate enterprises around the world rely upon responses at sub-second precision to read-only database queries; therefore, to suggest that a directory could better serve the need for very quick access of data is misleading. Additionally, if it were the case that directories could better serve the need for quick access of data, then application architects would have turned to directories many years ago in their quest to constantly provide better performing applications for end-users. A high read-to-write ratio is certainly a valid justification for the use of directory technology. However, if there actually is a tradeoff between the read-to-write ratio and performance, then enterprises that use RDBMS technology to create a database with information that changes hundreds of times per day and that is read millions of times per minute, would have supplanted RDBMS technology with the directory technology. Instead, the fastest and most heavily-used information-distribution systems presently are based on RDBMS technology.

The hierarchical nature of the directory provides another aspect in which to differentiate directories (i.e., application programs or software packages) from databases. For example, the directory hierarchy allows users and applications (i.e., application programs or software packages) to discover the relationships between directory objects as they progress further into the directory structure. Generally, the architecture of the directory is self-disclosing. This means that each object clearly shows the relationship between its parents above in the hierarchy, and its children below in the hierarchy. By comparison, the objects in a relational database can have a much more complex web of interactions, although they are hidden from view. All logical relationships in a relational database are implicit and cannot be viewed by those who do not have any previous knowledge of the database schema.

The high read-to-write ratio and the hierarchical self-disclosing criteria make directories an ideal mechanism for sharing data across a network, including those embodiments where the network comprises the Internet. When business partners share data, they do not necessarily know the intricacies of each other's database environments and may not have access to the appropriate third party software driver to access a database. Problems arise when the data being shared falls outside of the bounds of what is traditionally considered appropriate for storage in a directory. Conventionally, directories have been thought of as a source for relatively static data. This thought comes from problems associated with synchronization and replication between the unrelated sources of the relational data and the directory. Furthermore, source data is often stored in the core operational databases used by the enterprise. This data is extracted and copied into the directory using a utility application called LDAP Data Interchange Format (LDIF). When directories are populated in this way on a nightly, or even weekly basis, the value of the data diminishes the older it becomes.

The need for hierarchies, an object model, and some form of inheritance in LDAP justify the use of an object-oriented relational database system for the purposes of data storage and access. However, this justification for relational databases is contradicted by products that rely on both hierarchical and relational aspects, such as, for example: Oracle Internet Directory (OID), IBM SecureWay, and Microsoft Active Directory, which are implemented on top of Oracle 8i, IBM DB/2, and the Microsoft Jet database engine, respectively. Accordingly, there is support that the notion of a flat data hierarchy being a guarantee of maximum directory performance is not entirely valid since the fact that these proprietary directory technologies use a relational engine implies that relationships are just as important in a directory, as they are in a database.

B. The Role of Directories Abstracting Information from Databases

Based upon the above discussion, a conclusion might be drawn that because RDBMS technology offers power and speed and because a directory can be implemented on top of an RDBMS, there is no difference between the two technologies. However, directories and relational databases are not interchangeable.

The relational model is defined to mean a set of logical concepts, and, as such, is true or false in the limit of its definitions. A relational view is a virtual relation derived from base relations by applying relational algebraic operations. This requires selecting one or more tables that are stored in a database, and combining the tables using any valid sequence of relational operations to obtain a view. Examples of relational operations include selection, projection, join, etc. The result of applying the relational operations typically embody a table having properties of relational algebra. A view is defined to mean a result of a series of relational operations performed on one or more tables. Accordingly, a view can be the result of very complex operations. For example, a view can be established from a series of join operations followed by a projection operation. Additionally, a view can be characterized as a "virtual" table, meaning that the view is a "derived" table as opposed to being a "base" table.

There is a need for data abstraction because even though a directory can be implemented on top of an RDBMS, an RDBMS cannot take the place of a directory. Even in the situation when the RDBMS is used as the engine for a directory, the RDBMS must be programmed to provide a set of services that are characteristic of a directory. Directories have their own value, that is, they are ubiquitous in all sorts of applications such as email and groupware, network operating systems, and centralized Internet directories. Besides the significant difference between databases and directories being that directories support a ubiquitous Internet access standard, directories also have the ability to provide a self-disclosing schema. Although this look-up and discovery specialty distinctive to directories may sound minor to database adherents, it provides critical features that cannot be matched by relational databases.

Furthermore, many types of RDBMS technology conventionally use a data dictionary and a data catalog of some sort. The data dictionary comprises a directory of tables and their component fields, while the data catalog is a summarized abstract of a database's content. It is often the case in distributed computing that each enterprise has many disparate databases, each with its own directory. It thus remains a challenge as to how all of this information can be managed so as to facilitate analytical business processes without the need to abstract the information across all of these databases.

Directories provide a type of data-abstraction mechanism by acting as a central point for data management. Each database's data dictionary and data catalog are useful tools for managing and abstracting its data. Although each database can have its own internal directories, this does not change the fact that an enterprise-wide directory requires the implementation of a specific set of services that are directory-specific. Accordingly, a summary layer would be advantageous in providing the level of abstraction needed to maximize the productivity of data-storage and information-analysis activities across disparate databases at least at the enterprise level.

C. Using the Directory as a Tool to Manage Information Aggregation amongst Databases having the Same Implicit Scope A directory can help to manage the scope of diverse information and to facilitate the search for information via the abstraction of aggregated data. There are at least two significant ways to use a directory, namely for searching and browsing, each of which will now be discussed as having a strong and distinct relationship with the way that users access for information and with the access paths that are used to obtain the data that is needed.

With the model of searching, the user either knows precisely or can ascertain via the use of attributes and keywords the item of interest. With either technique, the user generally provides a filter to find a specific object that meets the particular criteria by searching according to attributes. This approach provides a pattern of direct access to data and favors a flat hierarchy, an example of which is the White Pages.

With the model of browsing, the user has an approximate idea of the item of interest based on a broader criterion of the relationships between different types of information. This in turn facilitates category- and taxonomy-based navigation, which can be conveniently described as searching according to relationships. This approach provides a pattern of indirect access to data and favors a complex hierarchy with well-defined relationships between objects. A corresponding data structure allows the creation of a set of views that facilitates navigation, such as a categorized list driven by relationships between objects, an example of which is the Yellow Pages.

In general, directories can support information retrieval in an easy manner because the scope of an RDBMS is limited to objects therewithin. Metadata is not included, which is why data dictionaries and data catalogs are so heavily used for this purpose. Considering the many distributed systems and different information models used in databases, the maintenance of these varying scopes of information becomes unwieldy without a repository of "supertools" to aggregate data. In particular, a directory can be used to manage a group of databases, each pertaining to a different scope of information and containing different objects with unique definitions. When the objects in each database have commonality despite their differing granularity and information focus, directories can help facilitate information retrieval across an enterprise.

A directory is a system that can reconcile the divergent scope of information amongst unrelated databases. Directory technology provides an easy way to solve the problem of how to integrate fragmented information, that is, information spread amongst individual databases each having a narrow scope of content. As will be described in greater detail herein, the present invention provides a method to enumerate objects and their attributes, to build relationships and taxonomies based on this enumeration, and to aggregate data according to principles of generalization and specialization. While database technology uses container aggregation, in which an object is defined according to what it contains or includes rather than by categories and supercategories into which its component attributes can be classified, the data can be organized into a hierarchical model with change made to the semantics. The directory is a hierarchical model that is well-suited for aggregating relational-hierarchy. As will become evident in the description to follow, when information is retrieved either by searching or browsing a directory according to relationships, the relationships between objects in a directory become meaningful.

D. Defining and Modeling Virtual Directories

Although a search by attribute in a flat directory structure by convention works well, a search by relationship typically is problematic for the reasons already described. To overcome this hurdle, one aspect of the present invention involves mapping relationships that have already been defined within existing databases into a centralized set of hierarchical access paths that permit search and navigation. As such, the virtual directories described herein provide an alternative to large-scale data extraction and aggregation that supports both the search and browse usage models.

An aspect in accordance with the present invention directed towards the search model enables one-to-one relationships supported by a set of pointers to individual objects in the schema. This particular implementation is well-suited for a flat data hierarchy. Another aspect of the present invention which is directed towards the browse model translates the one-to-one object relationships into two hierarchies. Doing so results in mapping rules being straightforward, so that existing relationships can be used to construct an access path to the individual database objects. Additionally, the translation of objects accounts for the fact that relationships between objects cannot be duplicated in a flat data structure, which in turn can result in valuable context, that provide the ability to access different views, being lost.

It thus follows that the virtual directories of the present invention use schema-based data extraction to create a hierarchical object model. One benefit of this approach is that information does not need to be extracted, aggregated and synchronized with existing data sources on an ongoing basis, as compared with conventional approaches.

E. Illustrating the Benefits of Virtual Directories

To further clarify the benefits of the virtual directories in accordance with the present invention, an example will now be discussed. An enterprise software company uses: (1) an accounting software package to track customer and vendor receivables and payables; and (2) a sales support software package to track purchases by existing customers, prospective customers and their needs, and sales volume. The accounting package contains tables representing customers and vendors. The sales support package contains tables representing existing customers, potential customers, and sales representatives. Customers whose information is stored in the accounting package are tracked by their payment; however, the customers whose information is stored in the sales support package are tracked by their purchase history. The company's sales representatives have a need to access data on existing customers' overall expenditures in order to determine what level of pricing is compatible with their financial needs, and additionally to determine their credit-worthiness.

To perform this analysis, the representatives require the ability to quickly check the customer views in both the accounting package and their own sales support package. Because the customer records in each database contain different data types and are therefore not totally reconcilable, the representatives are best-served by a method of data access that allows them to navigate across schemas through directory layers in order to quickly check both views.

In accordance with the virtual directory server of the present invention, there is provided a method to access customer data stored in both databases. The virtual directory establishes a link between the two types of customer records and aggregates their data without changing the view. The aggregated records in the virtual directory constitute a "supercategory" of customers, which automates the process of searching for information in both source databases, and provides a unique way to index and address the data. In particular, the link between the two types of customer records is an ad hoc join. Using a standard Application Programming Interface (API) facilitates the mapping that allows navigation between the two unrelated databases. More importantly, the same mechanism is able to operate on different schema to aggregate data and to provide a simple way to deliver a choice of views. As subsequently described, one embodiment of the API that is well-suited for these purposes is LDAP.

The use of virtual directories in accordance with the present invention also offers advantages to directory administrators. These advantages are best appreciated by discussing how the VDS 408 solves many common problems being experienced by administrators deploying LDAP directories. For example, data replication and synchronization issues are eliminated with the VDS. Furthermore, the VDS enables dynamic reconfiguration of the LDAP namespace and schema. With the VDS, rapid deployment of LDAP namespaces can be established. Also, the VDS provides unlimited extensibility to existing LDAP structures.

In accordance with the present invention, the VDS eliminates data replication and synchronization issues by not requiring that any data be held within the directory itself. Requests from LDAP clients return live data from the authoritative source, so that the VDS handles schema transformation automatically. This is contrasted with conventional LDAP directories which require data to be extracted from the authoritative source of the information and transformed into a format matching the LDAP schema of the directory. With past methods, the data had to be loaded into the directory using LDIF on a periodic basis, and in order to maintain current information in the directory, this process must be repeated on a regular basis.

In one aspect of the present invention, the VDS enables dynamic LDAP namespace configuration by separating the data structure mapping and LDAP namespace creation into two distinct processes. More details about this process are described subsequently. Furthermore, relationships in back-end databases are initially mapped into the VDS server 408 using an automated database schema discovery mechanism. LDAP namespace hierarchies are then built on top of this mapping. As new LDAP attributes and objects are required in the namespace, they can be added using an interface that will be described subsequently as the DirectoryView Designer™ interface and corresponding module. The interface includes a familiar point-and-click control input enabling changes to the directory structure to take effect immediately.

Having mapped one or more relational database structures into the VDS, multiple directory hierarchies can be created based on the same data mapping to provide rapid LDAP namespace deployment. This enables the instantaneous deployment of new directory namespace structures, as the need arises. Unlike traditional LDAP implementations, where a new mapping requires either a redesign of the existing directory or a new directory structure, the present invention enables directory administrators to respond immediately to new application requests for directory data.

The VDS provides unlimited LDAP extensibility to any existing LDAP directory implementation using the object referral mechanism. Object referral allows one LDAP directory to make reference to another LDAP directory when clients request objects or attributes that are not stored in the primary directory. Using object referral, the VDS enables the extension of an existing LDAP structure without the necessity for directory redesign. With the present invention, objects and attributes can be added to an existing directory structure quickly to accommodate the changing needs of the client applications.

There are several advantages that the virtual directory server of the present invention provides to an application architect. As will be discussed in further detail below, the VDS provides an innovative way of addressing legacy application databases. For example, the VDS provides a single, industry standard API to all database data. Additionally, the VDS enables the aggregation of data from diverse heterogeneous databases. Also, the VDS allows the rapid deployment of collaborative business-to-business (B2B) applications. Finally, the VDS enables business processes to move into the network.

The VDS provides a single industry standard API by using an LDAP proxy layer to access one or more heterogeneous relational databases. Doing so allows application developers to use a single, open standard API to access any relational data source. The VDS provides a self-describing schema eliminating the need for application developers and users to understand the internal organization of each relational database being accessed. As users navigate through successive levels in the virtual directory structure, context is retained from one level to the next. This combination of a single API, self-describing schema, and the preservation of context dramatically simplifies database navigation for both application programmers and end users.

The VDS provides aggregate data from unrelated heterogeneous databases. As will be discussed herein, the term "unrelated" is defined to mean proprietary ownership stemming from various vendors, and the term "heterogeneous" is defined to mean diverse scope of content and/or context. The DirectoryView Designer™ interface is used to construct the objects in the virtual directory tree structure. Each object can represent a call to a relational database system table or view. By using container objects, that is, objects that do nothing themselves but contain references to other objects, a group of calls to related and/or unrelated heterogeneous databases that contain related data can be aggregated.

The VDS allows rapid deployment of collaborative B2B applications. The DirectoryView Designer™ interface is used to construct customized views of data in the field of corporate relational databases. The deployment of customized views is fast and simple, and does not require a great deal of technical sophistication. This means that business users can utilize the present invention to deploy customized views of real-time operational data as the needs of business partners arise. Additionally, role-based security provides for very granular authorization to view objects, assuring complete confidentiality to business partners accessing data over the network, like for example, the Internet. Business partners also have the flexibility to use customized LDAP applications and/or a plug-in (e.g., SmartBrowser™ application) to a web browser, like the Internet Explorer or Netscape Navigator.

The VDS enables business processes to move into the network. The relationship between tables in a relational database system enumerate the business processes acting upon the corporate data and together build an interrelated sequence of hierarchical connections. These hierarchical connections represent how the work of the business is done. In accordance with the present invention, the VDS enables the enumeration of these business processes to be moved out of the proprietary bounds of each unique database management system and into the network where they can be operated upon by the individuals and applications that can make best use of them.

Virtual Directory System Overview

Referring now to the high-level block diagram of FIG. 1, there is shown an example of a system 100*a* that implements the virtual directory system for locating, extracting and translating relational data objects and relationships into a representation that is useable with hierarchical data models in accordance with the present invention. In the example of FIG. 1, system 100*a* includes a hierarchical computing system 102 coupled to a hierarchical/relational translation system 104, which in turn, is communicatively coupled to a relational computing system 106. In general, hierarchical computing system 102 is based upon a top-down hierarchical data model, where information is navigable and ordered pursuant to predefined relationships being either one-to-one or one-to-many. The hierarchical network data models within system 102 are closely tied to their physical data storage since the data structures representing relationships are a part of the storage system.

By contrast, relational computing system 106 provides the unrelated heterogeneous sources of information, which can be based upon simple to more complex network data relational models that house the data but not necessarily the corresponding relationships amongst the data. Instead of relationships becoming inherently a part of the structure of system 106, logical relationships are represented by primary key matches that are connected as needed according to various relational operations. To this extent, the structure of relational computing system 106 alone typically lacks a pre-established path of navigation, unlike hierarchical computing system 102. In the hierarchical system 102, the paths are explicit, thereby allowing navigation and data discovery to be generally simple because up-front knowledge about particulars paths are not required. By contrast, relational computing system 106 includes implicit paths, which are dynamic in nature. This means that there is higher flexibility in terms of path navigation and information discovery, but requires knowledge about the objects and relationships (i.e., schema) in advance. Moreover, for clarity, further references made to "relationships" in the context of relational computing system 106 and corresponding embodiments disclosed shall refer to the "logical relationships."

In between systems 102 and 106, hierarchical/relational translation system 104 bridges the mismatch in data models between the hierarchical data structures in system 102 and the relational data structures in system 106. In general, system 104 provides the mapping from relational to hierarchical systems so that data may be shared across systems, and between unrelated sources of relational information. In doing so, translation system 104 allows the explicit definition of implicit relationships inherent to the relational computing system 106. The information within the relational computing system 106 can then be navigated and discovered in a manner that is substantially similar to navigating and discovering information in the hierarchical computing system 102.

Figure 2:
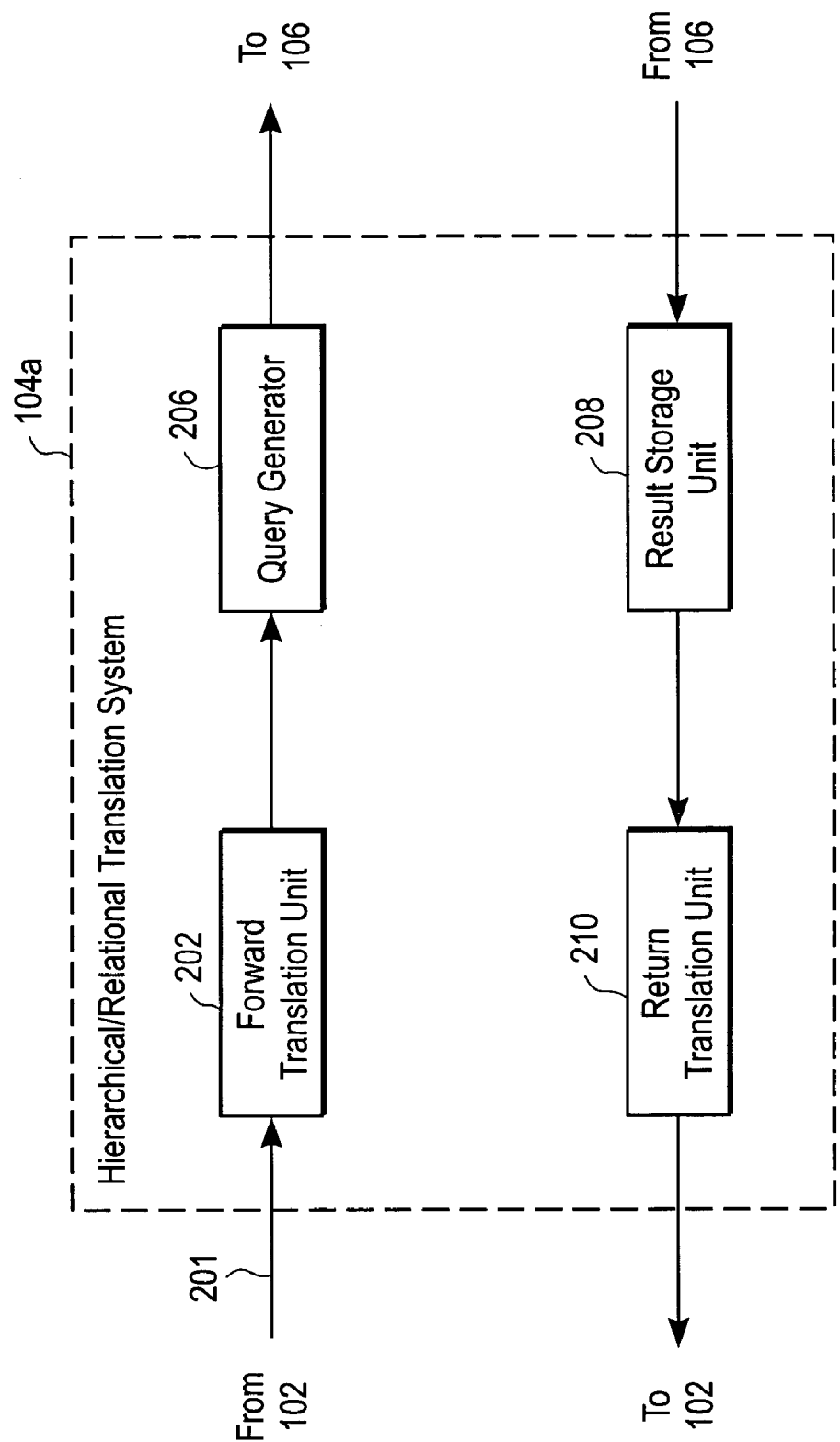
FIG. 2 is a block diagram of a first embodiment of the hierarchical/relational translation system of the present invention.

FIG. 2 shows further details of one embodiment for a hierarchical/relational translation system 104*a*. In particular, a forward translation unit 202 receives requests 201 from hierarchical computing system 102, and provides a request to a query unit 206. In one embodiment to be described subsequently, this request 201 will be an Information Resource Locator (IRL, that is, an LDAP URL). Query generator 206 formulates the request into a format where relational computing system can be queried for the requested information. The extracted relational information from relational computing system 106 is received by a result storage unit 208, which transfers the extracted information to a return translation unit 210. Return translation unit converts the data received in a relational format to a hierarchical format compatible with hierarchical computing system 102. Return translation unit 210 then passes the converted data to hierarchical computing system 102 for review or further selection.

Figure 3A:
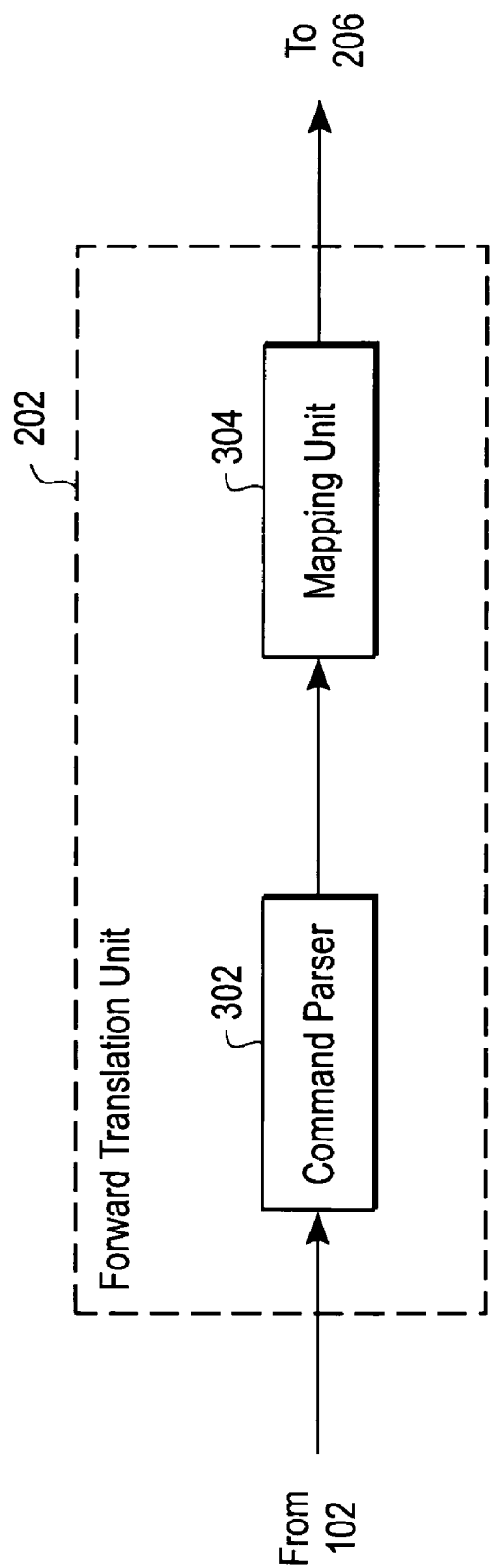
FIG. 3A is a block diagram of a first embodiment of a forward translation unit in accordance with the present invention.

Turning to FIG. 3A, there is shown an embodiment of the forward translation unit 202 of FIG. 2. Unit 202 includes a command parser 302 for receiving requests from the hierarchical computing system 102 and for breaking down (i.e., decomposing) any commands embedded within the requests. The commands are forwarded to mapping unit 304. Unit 304 includes information about the metadata previously captured from the relational computing system 106 along with the pre-defined virtual directory definitions as previously established by a directory designer. Unit 304 uses this information to interpret the command and calls the query generator 206 with the appropriate information.

Figure 3B:
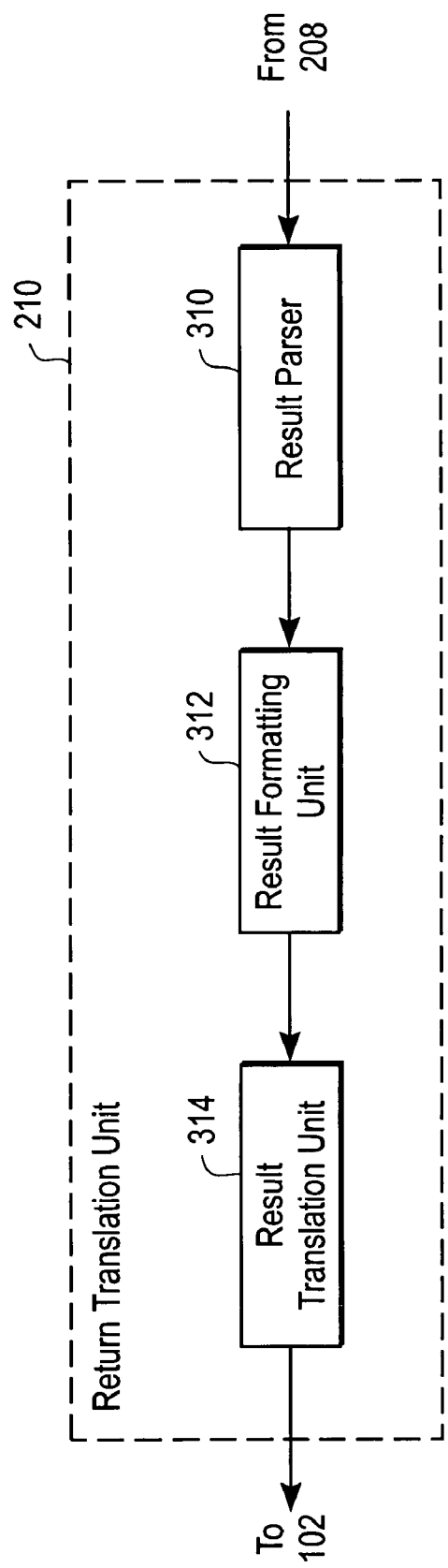
FIG. 3B is a block diagram of a first embodiment of a return translation unit in accordance with the present invention.

Reference is now made to FIG. 3B to describe one embodiment of the return translation unit 210 of FIG. 2. Unit 210 includes a result parser 310 for receiving responses from the result storage unit 208 which are received from relational computing system 106 in response to the queries sent from query unit 206. Result parser 310 breaks down relational data from the results received from result storage unit 208. This decomposed data is forwarded to a result formatting unit 312. Unit 312 formats the results received from parser 310 into a form compatible with the hierarchical computing system 102, and transmits the results to hierarchy computing system 102 through result transmission unit 314.

Figure 4:
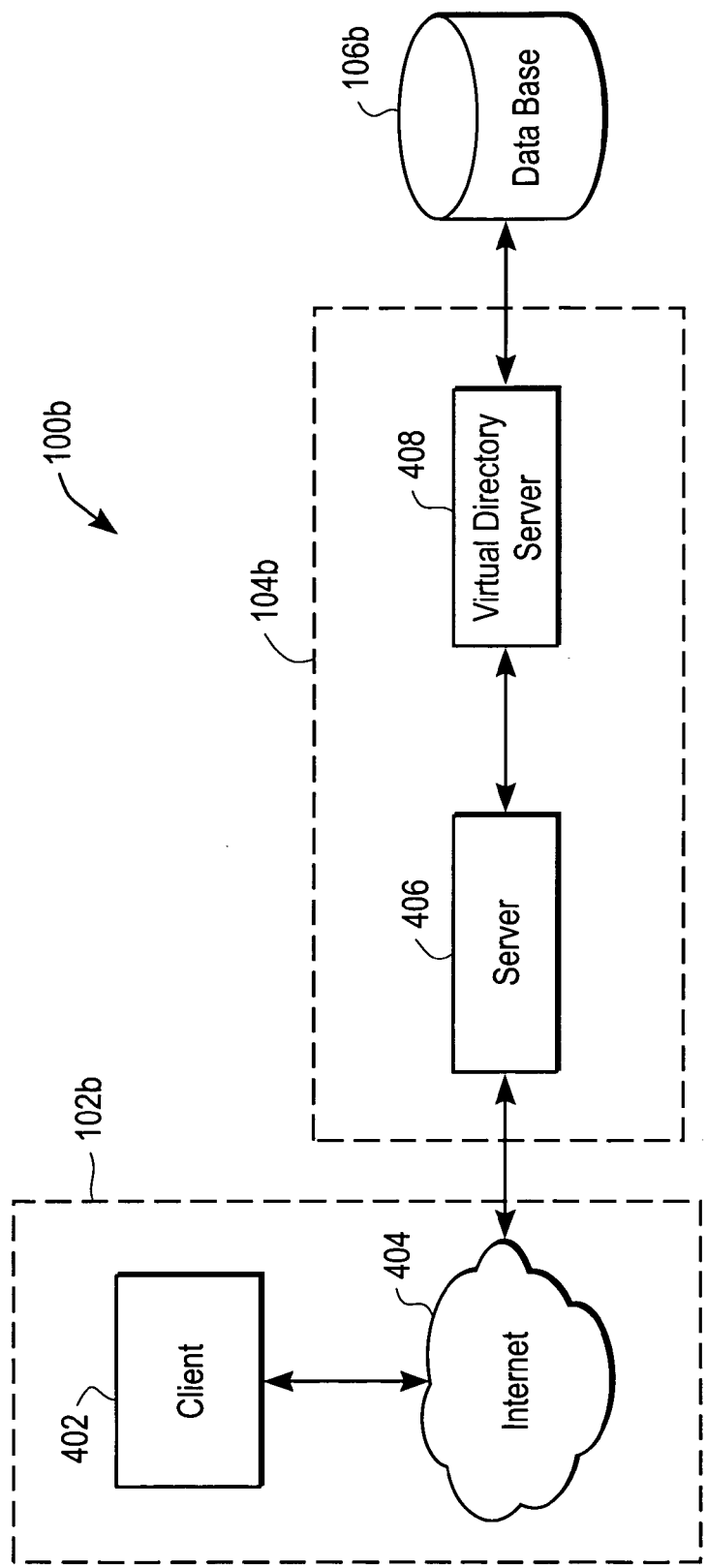
FIG. 4 is a block diagram of a second embodiment of the communication system of FIG. 1.

FIG. 4 shows a block diagram of a second embodiment 100*b* of communication system 100*a*, namely having more details for the hierarchical computing system 102*b*, the hierarchical/relational translation system 104*b*, and the relational computing system 106*b*. In the embodiment shown in FIG. 4, network communication system 100*b* enables the translation of relational database objects and (logical) relationships to virtual directory entries that are useable with hierarchical network data models in accordance with the present invention. Hierarchical computing system 102*b* includes one or more client computers 402 (used interchangeably herein with "user stations," "workstations" and "clients") that communicate over a network 404 with the translation system 104*b*. Translation system 104*b* includes at least one server computer (used interchangeably with "server") 406 having a virtual directory server 408. It is noted that reference made herein to a virtual directory server 408 refers to an application program for creating and "serving" virtual directories. By contrast, server 406 is a computer-based device having an operating system for executing the virtual directory server (application) 408. Accordingly, virtual directory 408 is referred to interchangeably herein as a "virtual directory", and VDS 408, and can be implemented by including software on server 406 for maintaining a virtual representation of directory information as described herein. The embodiment of the system 100*b* also illustrates that the relational computing system 106*b* can be a relational database.

Alternatively, virtual directory 408 can be implemented as a separate server computer from server 406. Accordingly, reference is made to an alternative embodiment for VDS 408 when implemented as a separate physical server from server 406.

One embodiment of network 404 in accordance with the present invention includes the Internet. However, it will be appreciated by those skilled in the art that the present invention works suitably-well with a wide variety of computer networks over numerous topologies, so long as network 404 connects the distributed user stations 402 to server 406. It is noted that the present invention is not limited by the type of physical connections that client and server devices make to attach to the network. Thus, to the extent the discussion herein identifies a particular type of network, such description is purely illustrative and is not intended to limit the applicability of the present invention to a specific type of network. For example, other public or private communication networks that can be used for network 404 include Local Area Networks (LANs), Wide Area Networks (WANs), intranets, extranets, Virtual Private Networks (VPNs), and wireless networks (i.e., with the appropriate wireless interfaces as known in the industry substituted for the hard-wired communication links). Generally, these types of communication networks can in turn be communicatively coupled to other networks comprising storage devices, server computers, databases, and client computers that are communicatively coupled to other computers and storage devices.

Client 402 and server 406 may beneficially utilize the present invention, and may contain an embodiment of the process steps and modules of the present invention in the form of a computer program. Alternatively, the process steps and modules of the present invention could be embodied in firmware, or hardware, and when embodied in software, could be downloaded to reside on and be operated from different platforms used by real time network operating systems. FIGS. 11–15 will thus be discussed accordingly for such process steps.

A. Exemplary Embodiment for Client Computer

Each user at client 402 works with system 100*b* to seamlessly access server 406 through network 404. Referring now to the block diagram of FIG. 17, a first embodiment for the client computer 402 is shown. The workstation 402 comprises a control unit 1702 coupled to a display device 1704, a keyboard 1706, a control input device 1708, a network controller 1710, and an Input/Output (I/O) device 1712 by a bus 1714.

Figure 17:
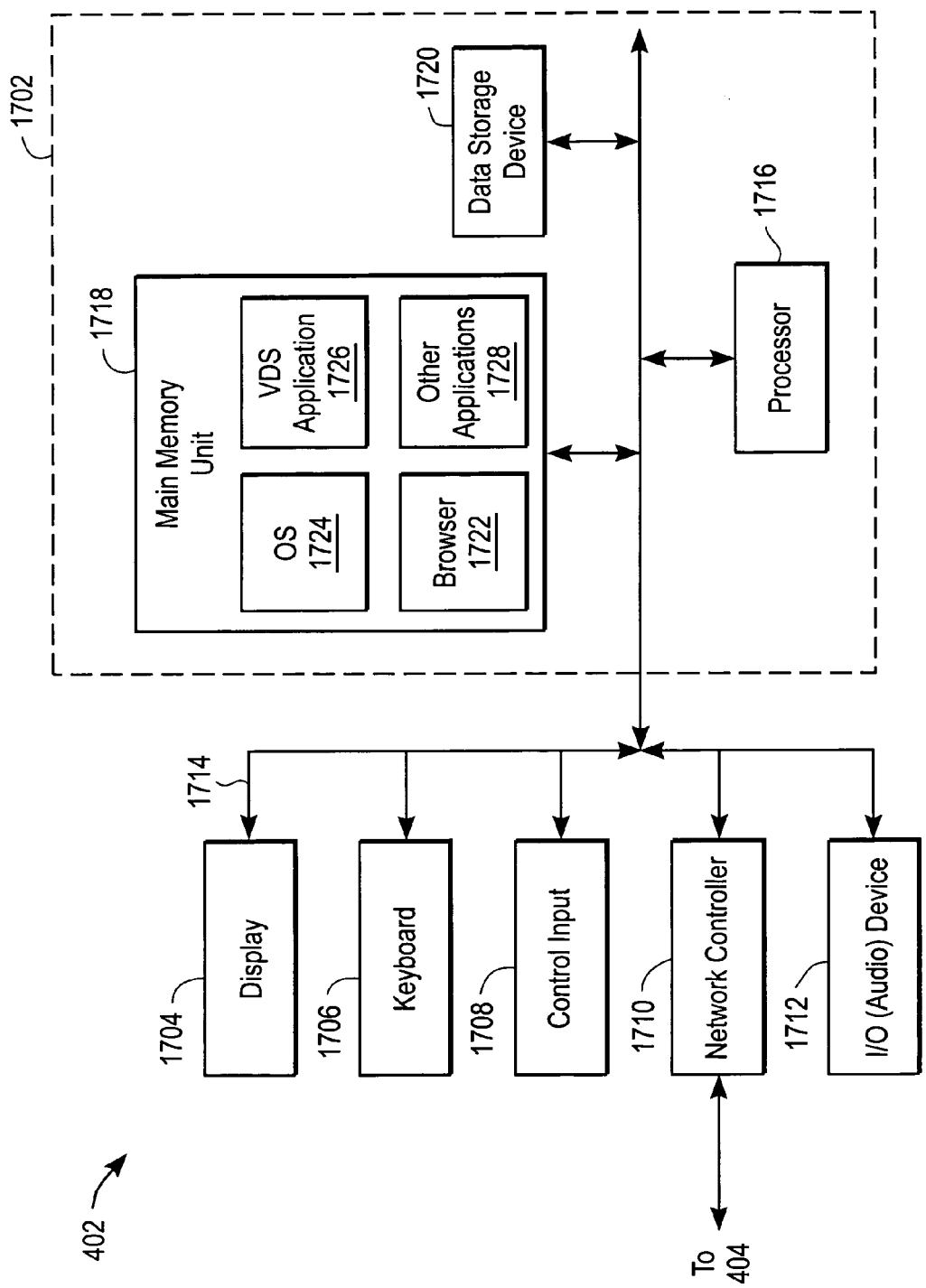
FIG. 17 is a block diagram of the hardware for the client computer according to the present invention.

Control unit 1702 may comprise an arithmetic logic unit, a microprocessor, a general purpose computer, a personal digital assistant or some other information appliance equipped to provide electronic display signals to display device 1704. In one embodiment, control unit 1702 comprises a general purpose computer having a graphical user interface, which may be generated by, for example, a program written in the Java language running on top of an operating system like the WINDOWS® or UNIX® based operating systems. In the embodiment of FIG. 17, one or more applications, electronic mail applications, spreadsheet applications, database applications, and web browser applications, generate the displays, store information, and retrieve information as part of system 100a, 100b. The control unit 1702 also has other conventional connections to other systems such as a network for the distribution of files (e.g., media objects) using standard network protocols such as TCP/IP, HTTP, LDAP and SMTP as will be understood by those skilled in art and shown in detail in FIG. 17.

It should be apparent to those skilled in the art that control unit 1702 may include more or less components than those shown in FIG. 17, without departing from the spirit and scope of the present invention. For example, control unit 1702 may include additional memory, such as, for example, a first or second level cache, or one or more application specific integrated circuits (ASICs). Similarly, additional components may be coupled to control unit 1702 including, for example, image scanning devices, digital still or video cameras, or other devices that may or may not be equipped to capture and/or download electronic data to control unit 1702.

Also shown in FIG. 17, the control unit 1702 includes a central processing unit (CPU) 1716 (otherwise referred to interchangeably as a processor), a main memory unit 1718, and a data storage device 1720, all of which are communicatively coupled to a system bus 1714.

CPU 1716 processes data signals and may comprise various computing architectures including a complex instruction set computer (CISC) architecture, a reduced instruction set computer (RISC) architecture, or an architecture implementing a combination of instruction sets. Although only a single CPU is shown in FIG. 17, multiple CPUs may be included.

Main memory unit 1718 can generally store instructions and data that may be executed by CPU 1716. FIG. 17 shows further details of main memory unit 1718 for a client computer 402 according to one embodiment. Those skilled in the art will recognize that main memory 1718 may include other features than those illustrated. The instructions and data may comprise code devices for performing any and all of the techniques described herein. Main memory unit 1718 may be a dynamic random access memory (DRAM) device, a static random access memory (SRAM) device, or some other memory device known in the art. The memory unit 1718 preferably includes an Internet (web) browser application 1722 being of conventional type that provides access to the Internet and processes HTML, DHTML, XML, XSL, or other mark-up language to generate images on the display device 1704. For example, the web browser application 1722 could be a Netscape Navigator or Microsoft Internet Explorer browser. Alternatively, an LDAP client may be substituted for browser 1722, as will be recognized by those skilled in the art. The main memory unit 1718 also includes an Operating System (OS) 1724, a client program 1726 to enable communication between the client computer 402 and the server 406 for creating, editing, moving, adding, searching, removing or viewing information, including the directory views of the virtual directory system described in accordance with the present invention. For example, OS 1724 may be of conventional type such as WINDOWS® 98/2000 based operating systems. In other embodiments, the present invention may additionally be used in conjunction with any computer network operating system (NOS), which is an operating system used to manage network resources. A NOS may manage multiple inputs or requests concurrently and may provide the security necessary in a multi-user environment. An example of an NOS that is completely self-contained includes WINDOWS® NT manufactured by the Microsoft Corporation of Redmond, Wash.

Data storage device 1720 stores data and instructions for CPU 1716 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 1714 represents a shared bus for communicating information and data through control unit 1702. System bus 1714 may represent one or more buses including an industry standard architecture (ISA) bus, a peripheral component interconnect (PCI) bus, a universal serial bus (USB), or some other bus known in the art to provide similar functionality.

Additional components coupled to control unit 1702 through system bus 1714 will now be described, and which include display device 1704, a keyboard 1706, a control input device 1708, a network controller 1710, and an I/O device 1712. Display device 1704 represents any device equipped to display electronic images and data as described herein. Display device 1704 may be a cathode ray tube (CRT), a liquid crystal display (LCD), or any other similarly equipped display device, screen or monitor. As will be described subsequently with respect to other embodiments of the client computer, display device can be the touch panel LCD screen of a Personal Digital Assistant (PDA) or the LCD screen of a portable hand held device like a cellular phone.

Keyboard 1706 represents an alpha-numeric input device coupled to control unit 1702 to communicate information and command selections to CPU 1716. Control input device 1708 represents a user input device equipped to communicate positional data as well as command selections to CPU 1716. Control input device 1716 may include a mouse, a trackball, a stylus, a pen, a touch screen, cursor direction keys, joystick, touchpad, or other mechanisms to cause movement of a cursor. Network controller 1710 links control unit 1702 to network 404 and may include network I/O adapters for enabling connection to multiple processing systems. The network of processing systems may comprise a LAN, WAN, and any other interconnected data path across which multiple devices may communicate.

One or more input/output devices 1712 are coupled to system bus 1714. For example, I/O device 1712 could be an audio device equipped to receive audio input and transmit audio output. Audio input may be received through various devices including a microphone within I/O device 1712 and network controller 1710. Similarly, audio output may originate from various devices including CPU 1716 and network controller 1710. In one embodiment, I/O device 1712 is a general purpose audio add-in expansion card designed for use within a general purpose computer. Optionally, I/O device 1712 may contain one or more analog-to-digital or digital-to-analog converters, and/or one or more digital signal processors to facilitate audio processing.

B. Exemplary Embodiments for Database

Database 106b represents any relational database system table or view. Preferably, any OLE DB, ODBC or JDBC compliant database is well-suited to work with the present invention. Although a single database 106 is shown in FIG. 4, multiple heterogeneous databases may be included. Examples of such databases include: Microsoft SQL server, Oracle, Informix, DB2, Sybase and Microsoft Access.

C. Exemplary Embodiment for Server Computer

Figure 10A:
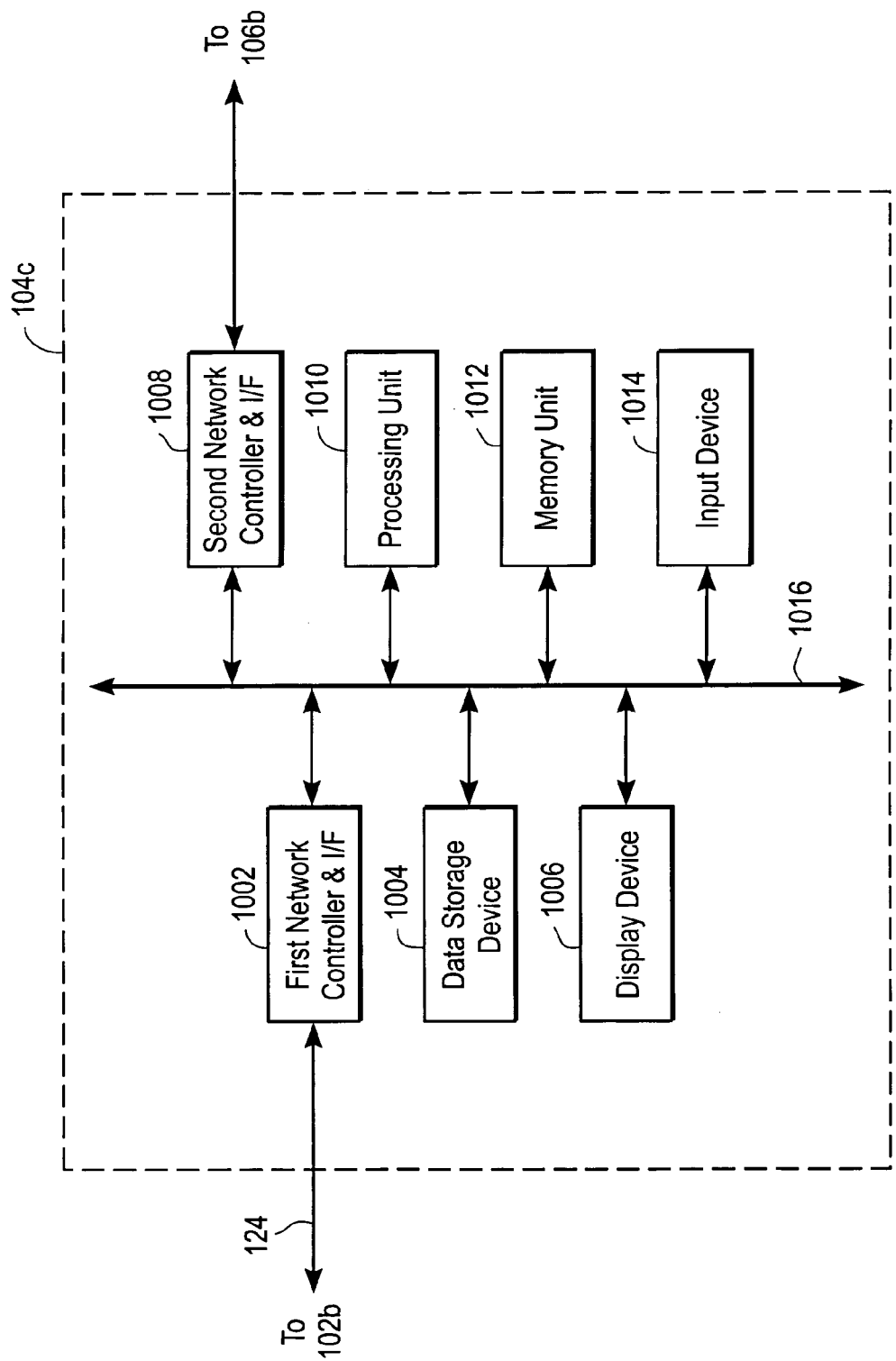
FIG. 10A is a block diagram of the hardware for the server (or virtual directory server) according to the present invention.

Referring now to the block diagrams of FIGS. 10A–10B, further details of system 104b (including server 406 and VDS 408) are shown, namely through a particular embodiment of hardware as seen in hierarchical/relational translation system 104c. In the example of FIG. 10A, system 104c can include server 406 hosting the virtual directory 408 shown in FIG. 4 (and as will be described in more detail with respect to FIG. 10B). As shown in FIG. 10A, translation system 104C preferably includes a first network controller and interface (I/F) 1002 coupled to a data storage device 1004, a display device 1006, a second network controller and interface (I/F) 1008, a processing unit 1010, a memory unit 1012, and input device 1014 via a bus 1016. As shown in FIG. 10A, the first network controller and I/F 1002 is communicatively coupled via 124 to the hierarchical computing system 102b. In particular, first network controller and I/F 1002 is coupled to network 404 and ultimately to client 402. The second network controller and I/F 1008 is communicatively coupled to relational computing system 106b.

For convenience and ease of understanding the present invention, similar components used in both the client computer 402 (of FIG. 17) and the server 406 will be referenced by comparison. To this end, processing unit 1010 is similar to processor 1716 in terms of functionality. That is, processing unit 1010 processes data signals and may comprise various computing architectures including CISC or RISC architecture, or an architecture implementing a combination of instruction sets. In one embodiment, server 406 includes a multiple processor system which hosts virtual directory 408, as will be described in FIG. 10B with reference to application module 1054. As an example, a WINDOWS® NT/2000 server can be used for server 406, while other multiple processor systems may work suitably well with the present invention, including the Dell 1800 made and sold by Dell Computer Corporation.

Input device 1014 represents, primarily for convenience, the functional combination of devices for receiving control input, keyboard input of data, and I/O input. As such, the block diagram for input device 1014 in FIG. 10A may equivalently represent the functionality of keyboard 1706, control input device 1708 and I/O device 1712 of FIG. 17. Additionally, data storage device 1004 is similar to data storage device 1720, but stores data and instructions for processing unit 1010.

System bus 1016 represents a shared bus for communicating information and data through hierarchical/relational translation system 104c. System bus 1714 may represent one or more buses including an industry standard architecture (ISA) bus, a peripheral component interconnect (PCI) bus, a universal serial bus (USB), or some other bus known in the art to provide similar functionality.

Referring now to FIG. 10B, by way of example, portions of the memory unit 1012 needed for the processes of the present invention according to one embodiment of the present invention are shown and will now be described more specifically. In FIG. 10B, the memory unit 1012 preferably comprises an operating system 1050, other applications 1070, an application server program 1052, an LDAP server program 1053, at least one virtual directory server application 1054, a first module 1058, a second module 1060, a third module 1056, a fourth module 1062, a fifth module 1064, and a sixth module 1068, all communicatively coupled together via system bus 1020. As noted above, the memory unit 1012 stores instructions and/or data that may be executed by processing unit 1010. The instructions and/or data may comprise code for performing any and/or all of the techniques described herein. These modules 1050–1070 are coupled by bus 1020 to the processing unit 1010 for communication and cooperation to provide the functionality of the system 100b. Those skilled in the art will recognize that while the present invention will now be described as modules or portions of the memory unit 1012 of a computer system, the module or portions may also be stored in other media such as permanent data storage and may be distributed across a network having a plurality of different computers such as in a client/server environment.

The memory unit 1012 may also include one or more other application programs 1070 including, without limitation, word processing applications, electronic mail applications, and spreadsheet applications.

In accordance with the present invention, network 404 enables the communication between multiple components of server 406 and client 402, as well as other devices, which may or may not be co-located, but may be distributed for convenience, security or other reasons. To facilitate the communication between client 402 and server 404, a client-server computer network operating system (NOS) may be used for operating system 1050 to manage network resources. An NOS can manage multiple inputs or requests concurrently and may provide the security necessary in a multi-user environment. Operating system 1050 can include, for example, a NOS of conventional type such as a WINDOWS® NT/2000, and UNIX® used with the Microsystem SOLARIS® computing environment. Another conventional type of operating system that may be used with the present invention includes LINUX® based operating systems.

The virtual directory server (VDS) application 1054 is a procedure or routines that control the processing unit 1010 preferably at run-time on server 406. VDS application 1054 represents server 408 in that embodiment where server 406 hosts VDS 408. Alternatively, VDS application 1054 runs on a separate server similar to server 406 where VDS 408 is embodied as a physical server. Although only a single VDS application 1054 is shown in memory unit 1012 of FIG. 10B for ease of understanding the present invention, the server 406 may typically have several such VDS applications 1054; each application 1054 used for displaying information aggregated from unrelated heterogeneous sets of relational databases according to context.

In one embodiment, system 100b includes the VDS application 1054 along with six modules of software according to the present invention. These six modules are described below as the first module 1058, second module 1060, third module 1056, fourth module 1062, fifth module 1064, and sixth module 1068. The first module 1058 is embodied as a program for extracting and defining schema from any relational data sources that can be reached using Object Linking and Embedding DataBase (OLE DB), Open DataBase Connectivity (ODBC), and/or Java DataBase Connectivity (JDBC) software drivers. The second module 1060 is a program that includes processes for building virtual directory definitions using an oriented path derived from a schema for relational data sources, and represented by a hierarchical sub-directory of objects in a Directory Information Tree (DIT) structure. The third module 1056 includes a program for enabling browsing of the contents at the client application corresponding to the directory view definitions. The fourth module 1062 includes a program for mapping relational objects, such as tables, columns, attributes, and logical relationships into an external (e.g., XML) format. The fifth module 1064 maps the entities described by the module 1062 into the hierarchical object classes and attributes, which in one embodiment can be for LDAP. The sixth module 1068 includes processes for managing system security using Group access rights, and access control lists for directory entries, which may be implemented by conventionally known techniques. Exemplary functions and implementation for the VDS application 1054, and the first, second, third, fourth, and fifth modules 1056–064 are described below in more detail.

One Embodiment of the Present Invention

A particular embodiment for implementing system 100*b*, provided only by way of example, will now be discussed with focus directed to a VDS application 1054 used on server 406 along with a six module, or six-tier Internet application implemented with the Microsoft Development Environment. In this section, more details about the function of application 1054 and the first through fifth modules 1058, 1060, 1056, 1062, and 1064 are discussed, follow by an explanation of a process for using these modules. To add further clarification to particular aspects of the present invention, reference will be made to the flow-charts of FIGS. 11–15 appropriately throughout the discussion.

A. Virtual Directory Server

Reference will now be made to the VDS 408 which is implemented with the virtual directory server (VDS) application 1054 of the present invention as shown in FIG. 10B. The (VDS) application 1054 is implemented with software for accessing and extracting data 1102 from unrelated relational databases, transforming 1104 the extracted information into a representation that is compatible with a hierarchical model, and enabling the representation to be viewed on the client 402 as a virtual directory of information when queried 1108 by client 402. Generally, the VDS application 1054 maps relational database objects into a directory structure and enables users to navigate across diverse unrelated application namespaces. A namespace is the scope of those entities each referenced by some unique "qualified" name and defined by a schema. In particular, the virtual directory server 408 maps database views into a directory structure that is in compliance with LDAP, thereby resulting in LDAP directory structures. The virtual directory server 408 does not necessarily store any information itself, unlike conventional LDAP implementations. In a particular embodiment and as will be described with regard to FIG. 12 subsequently, requests are received from clients having applications operating in compliance with LDAP. The requests received are processed by the virtual directory server 408 and transmitted to the target database 106*b* hosting the data of interest. To this end, the virtual directory server 408 provides a virtual LDAP directory interface to diverse heterogeneous enterprise databases and allows the dynamic reconfiguration of the Directory Information Tree (DIT) and associated content. This aspect of the present invention is beneficial because a representation of complex data relationships is provided to users but without the need for replication of data and synchronization when translating data from a system using a network relational model to a system using a network hierarchical model.

In one embodiment of the present invention, the data source is a relational database 106*b* which forms the authoritative source of directory information to be viewed with the VDS 408 in accordance with the present invention. For example, the database 106*b* could be a PeopleSoft® application database having information in the nature of human resources. Alternatively, the database 106*b* could be an Oracle® database having financial information. In accordance with one aspect of the present invention, the virtual directory server 408 should preferably support, as a source for the directory data, the use of any relational database that can be accessed using OLE DB, ODBC, or JDBC.

According to one aspect of the present invention, the VDS 408 does not eliminate the need for an enterprise directory. Rather, enterprise directories are an integral part of any network infrastructure, and the VDS 408 inter-operates with the enterprise directory to provide even more functionality to directory-enabled applications. Enterprise directories store information from a wide array of sources, including the network operating system (NOS), and are well-suited for hosting the NOS level of data. Instead of supplementing enterprise directories, the VDS 408 in accordance with the present invention enables access to enterprise data that reside in related and unrelated relational databases. As will be described further herein, the VDS 408 is beneficial because of its ability to provide information housed in relational databases to LDAP-enabled applications.

In accordance with another aspect of the present invention, the VDS does not eliminate the need for a metadirectory. Metadirectories consolidate the management of multiple applications and NOS directories, and are a valuable component of any network infrastructure. With one embodiment of the present invention, the VDS 408 provides an LDAP interface to data that already exists in the infrastructure of relational database 106*b* of an enterprise. Utilizing the VDS 408 of the present invention with an enterprise metadirectory results in a faster directory infrastructure implementation and a more flexible directory design.

Figure 18:
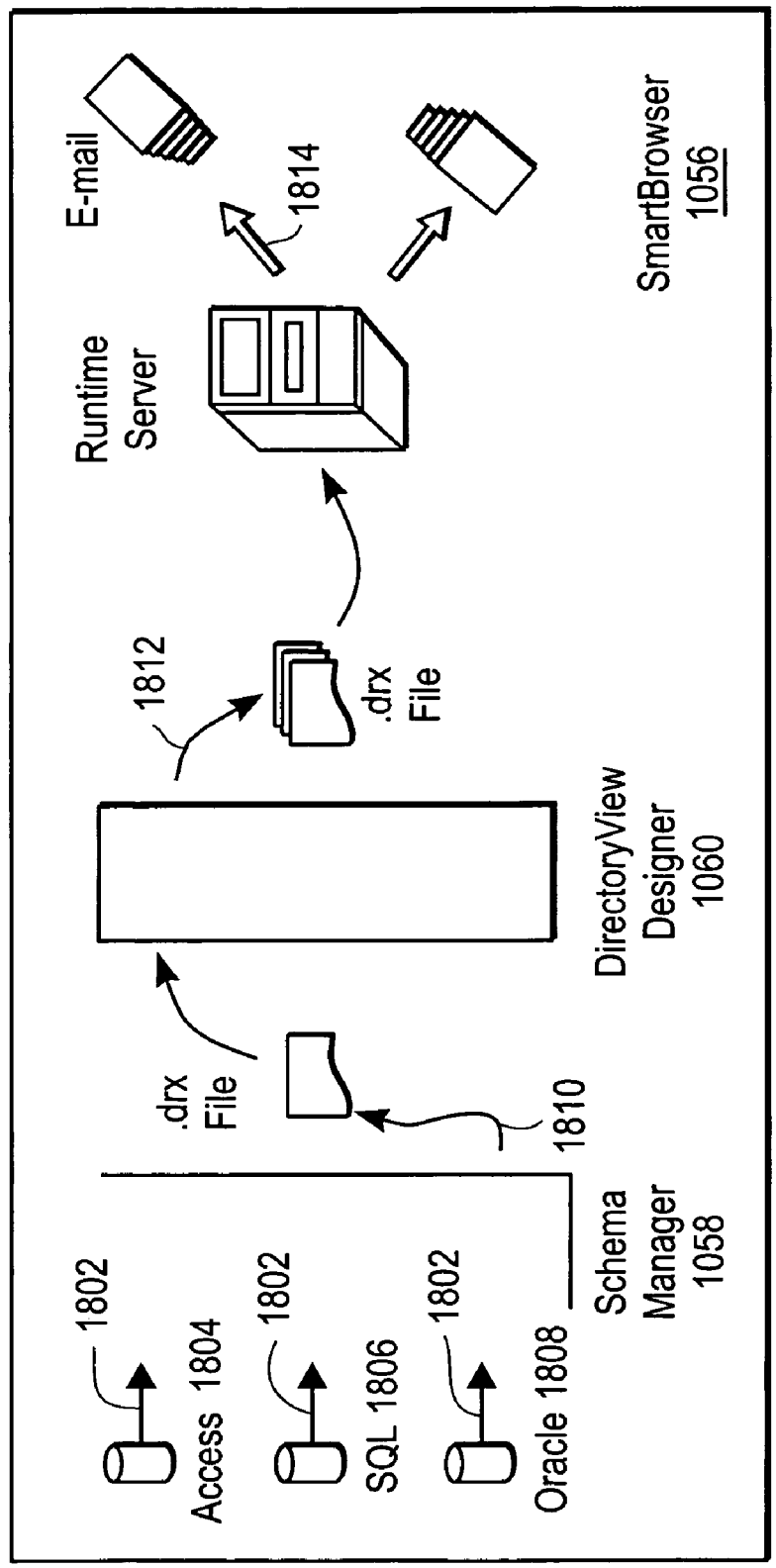
FIG. 18 is a data-flow diagram of the schema capture process according to one embodiment of the present invention.

To further clarify aspects of the present invention, reference will contemporaneously be made to FIG. 18, while the present invention is described in the context of first, second, third, fourth, fifth, and sixth modules interacting across the relational computing system 106*b*, hierarchical/relational translation system 104*b*, and hierarchical computing system 102*b*. Although the particular modules 1056–1064 are mentioned, it will be appreciated by those skilled in the art that the present invention is applicable to other contexts of communications between multiple users such as users of a main frame computer, and users of other proprietary network systems. As such, the description here of the present invention in this specific context is only by way of example. It should be understood that the processes and method of the present invention are applicable to any relational database being accessed by multiple users.

As shown in the diagram of FIG. 18, a first module 1058 accepts 1802 schema data from OLE DB, ODBC and/or JDBC compliant data sources. These data sources are illustrated by way of example only as Microsoft Access database 1804, SQL Server database 1806, and Oracle database 1808. After the schema is captured 1102, the schema is then encoded in a standard format, such as XML, and stored 1810 in a schema file (as will be described in one embodiment as having a file extension of .orx).

Figure 11:
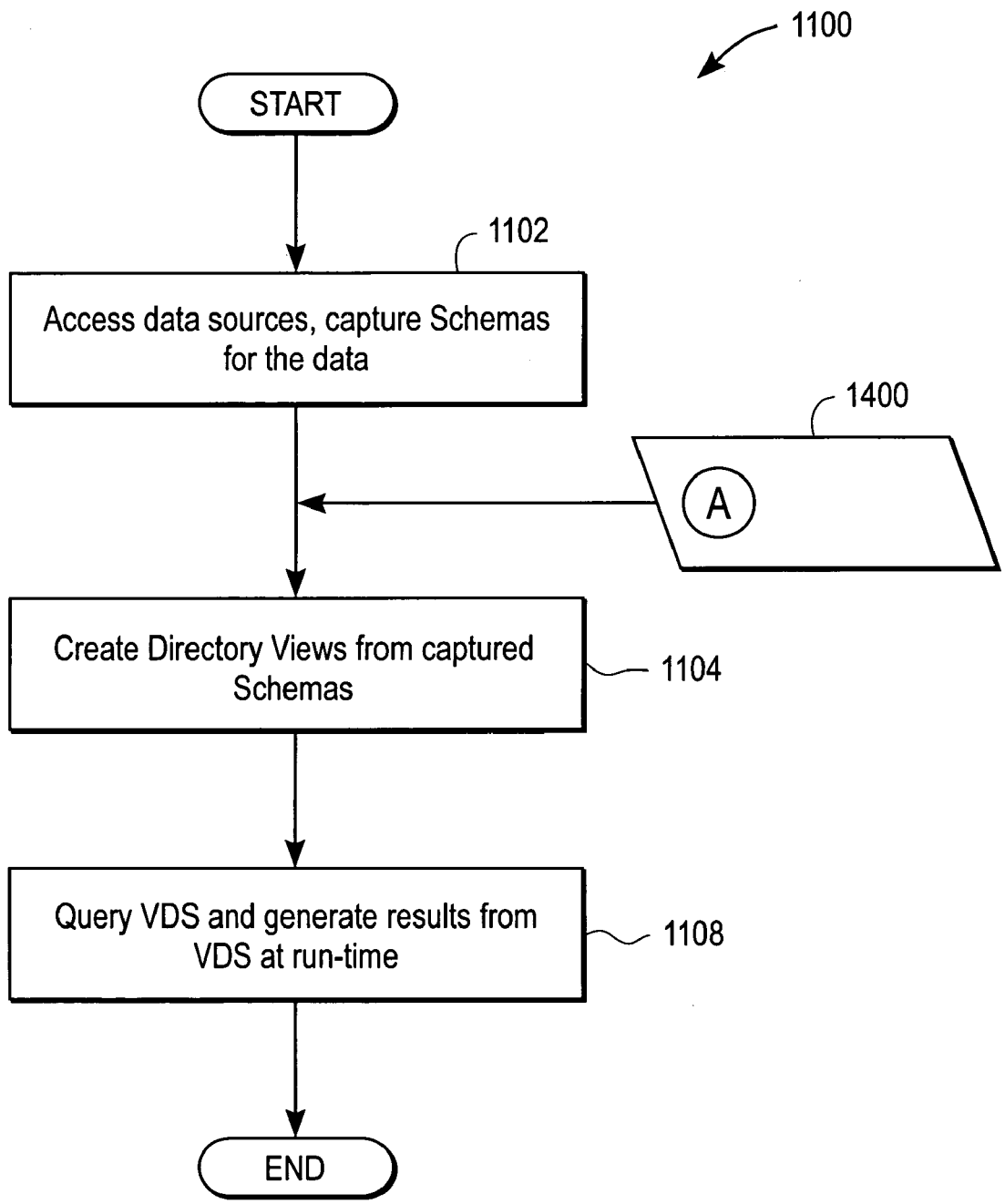
FIG. 11 is a high-level flowchart of a preferred method for creating and deploying a virtual directory system in accordance with the present invention.
Figure 14A:
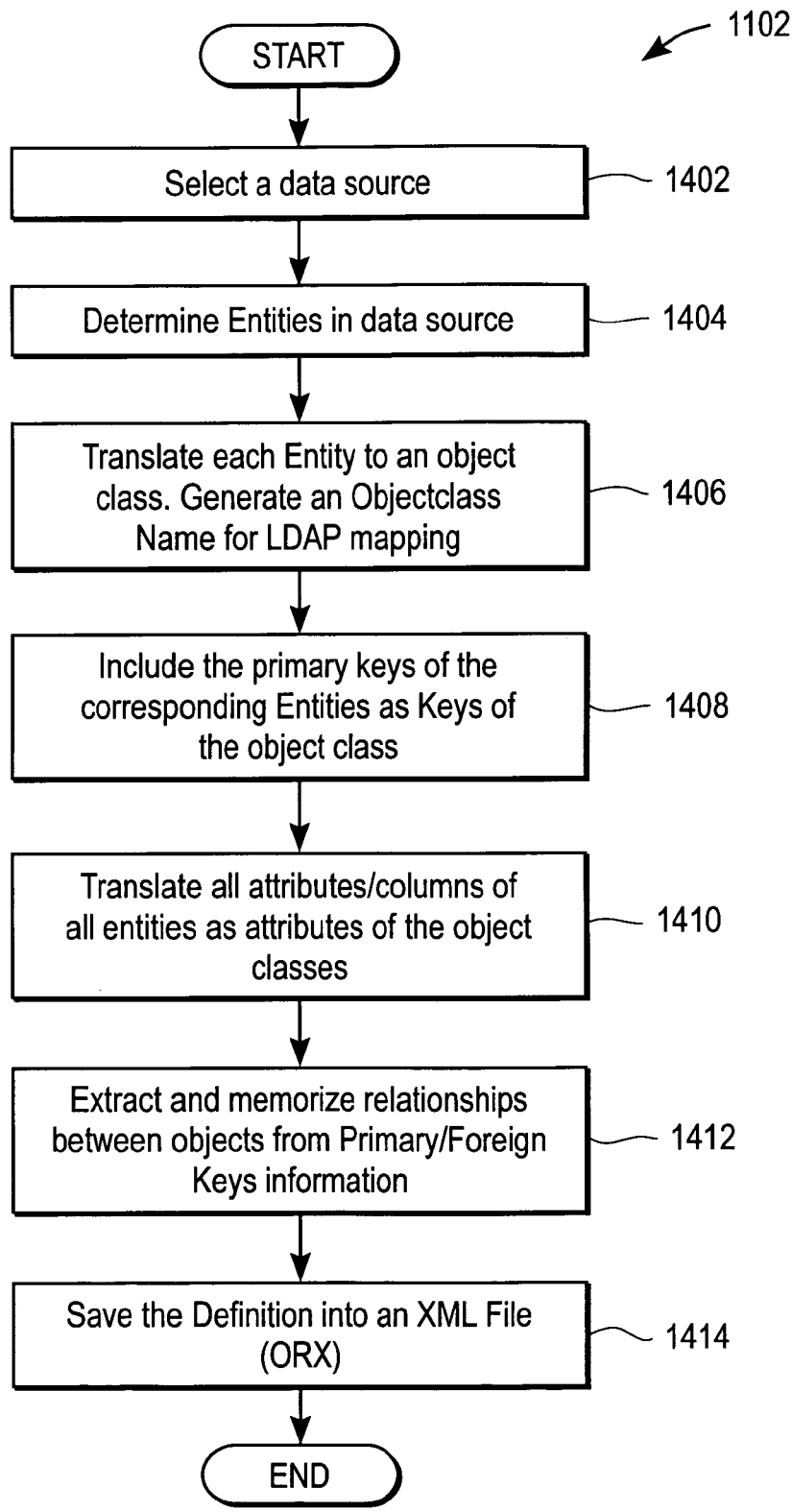
FIGS. 14a–c are flowcharts of preferred methods for schema extraction, for mapping objects to an LDAP schema, and for schema mapping, respectively.

Reference is now made to the flowchart of FIG. 14a to illustrate an example of implementing the accessing of the data sources and the capturing of schema according to step 1102 of FIG. 11. It should be noted that the exact sequence of steps described here are not necessary for the invention to work properly, and that the order of the steps may be modified to produce the equivalent end results and actions. In FIG. 14a, a user working at a client application 402 selects 1402 a relational data source. In response to the selection made, schema extraction of the objects and relationships is made by module 1058. In doing so, the entities in the data source are determined 1404 based upon the selection received. Each entity that is determined is translated 1406 to an object class. For example, step 1406 may in one embodiment generate an Objectclass Name for LDAP mapping. During this process, the primary keys of the corresponding entities are included 1408 as also being the Keys of the object class. Additionally, all attributes and/or columns of all entities selected are translated 1410 into attributes of the object classes. The results of extracting the schema in this example are memorialized 1412, that is for example, by discerning and defining the relationships between objects from the Primary and/or Foreign Keys information. Once this definition is completed, the Definition may be saved 1414, 1810 in the schema file (i.e., the .orx file) in XML format.

Figure 14B:
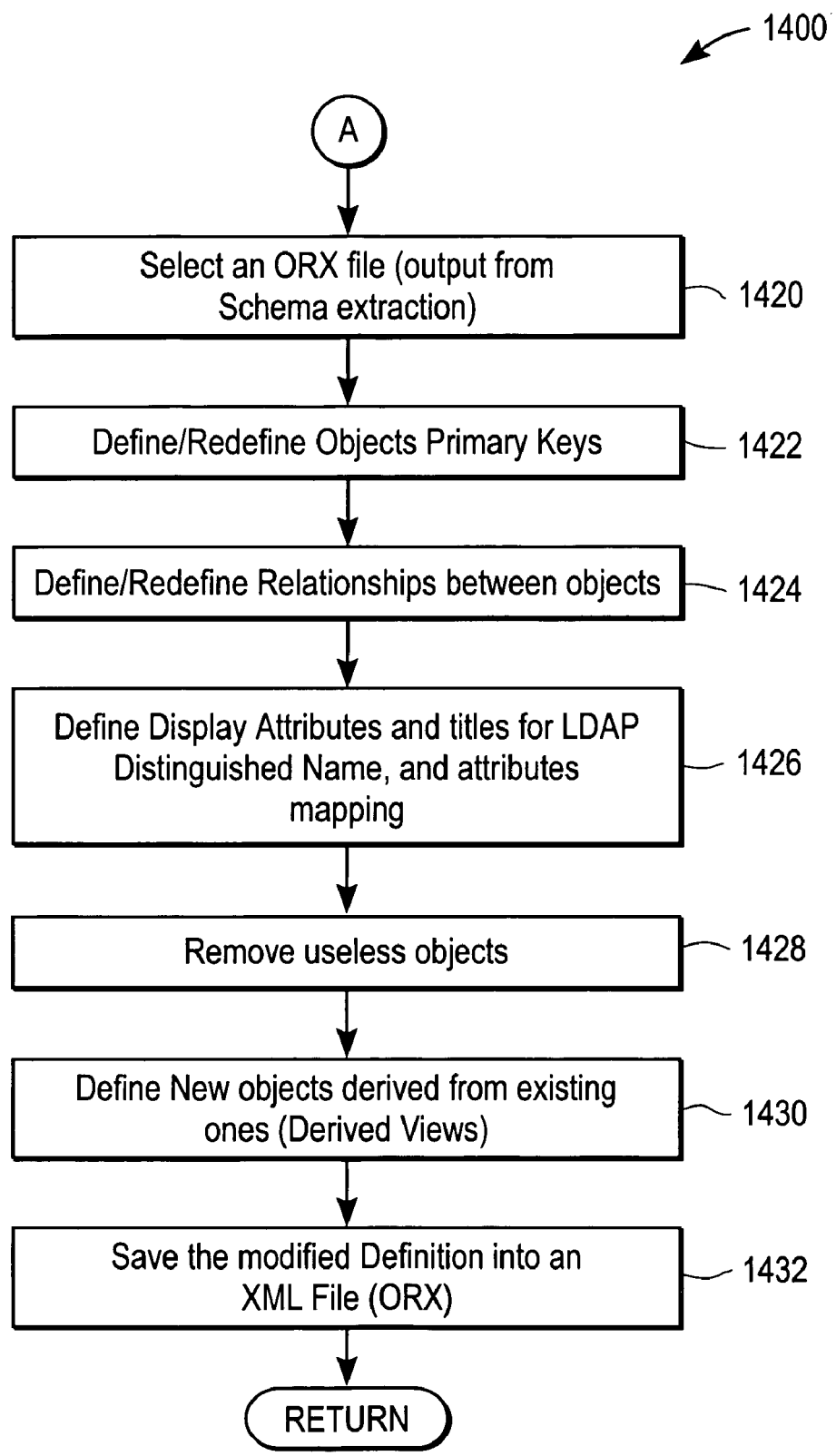

Frequently, there will be situations where the user will want to modify the structure of the schema in the virtual directory. User input module 1400 in FIG. 11 indicates this option, which is further described in one exemplary implementation referenced in FIG. 14b. In the example of FIG. 14b, a user is permitted to select 1420 a schema file (i.e., the .orx file) which has been output from the schema extraction process. As will be illustrated subsequently in the context of a graphical user interface, the user can provide input information so that the first module 1058 modifies the definition of the schema, by having the fourth module 1062 create new schema mapping, that is, where the VDS 408 maps database objects, such as tables, columns, attributes, and other entities into LDAP object classes and attributes. As shown in FIG. 14b, examples of such input information can comprise: (1) defining and redefining 1422 Object primary keys; (2) defining and redefining 1424 relationships between objects; (3) defining 1426 display attributes and titles for LDAP Distinguished Name (DN), and attributes mapped to LDAP; (4) removing 1428 useless objects; and (5) defining 1430 new Objects from existing, for example, as with the "derived views" option to be subsequently discussed in detail. Once these modifications have been accepted and processed by the VDS 408, 1054, the modified definition can be saved 1432 to overwrite the schema file.

Figure 13:
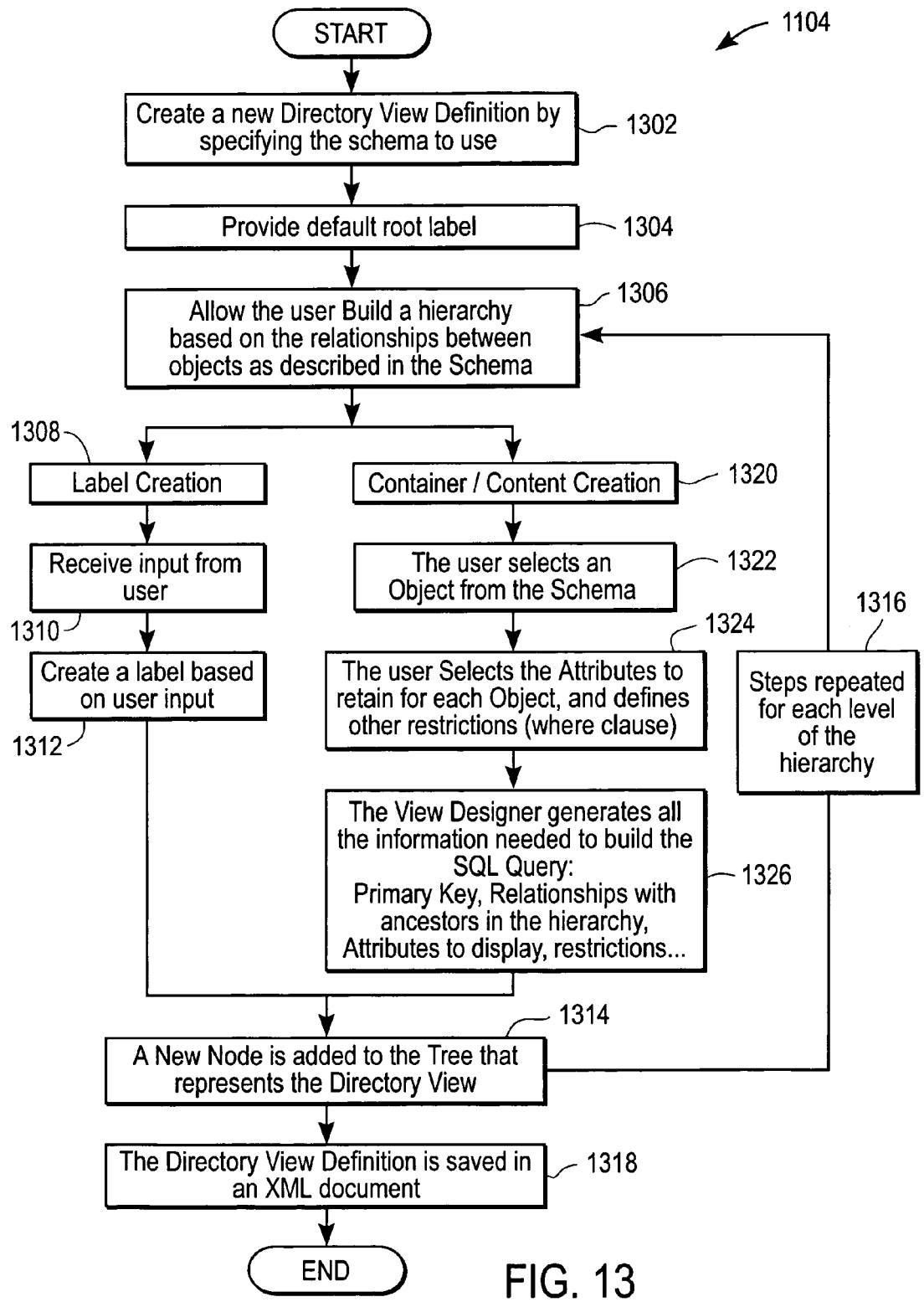
FIG. 13 is a flowchart of a preferred method for creating a directory view from extracted schema data in accordance with the present invention.

Using the schema captured in the schema file, a second module 1060 is used to create 1104 a description 1812 of the directory views saved in another file, described herein as the directory view file having a .dvx file extension. For example, the creation 1104 of directory views from captured schemas indicated FIG. 11 is further described in one embodiment exemplified in the flowchart of FIG. 13. In the example of FIG. 13, a new directory view definition is created 1302 by specifying the schema to use. To do so, a default root label is provided 1304. A specific implementation will later be described in the context of a graphical user interface for clarity of the invention. Based on the relationships between objects as described in the schema specified, the user is allowed to build 1306 a hierarchy. The hierarchy should preferably be referenced, and the creation 1308 of a label is a mechanism that works well for this purpose. Input is then received 1310 from the user in order to provide the name of the label. Once the user input is received, the label is created 1312 based on the user input. In response thereto, a new node is added 1314 to the tree that represents the directory view. If there are further levels of the directory views to be built, then control is passed back to step 1306 as indicated by 1316. Otherwise, the directory view definition is saved 1318 in the directory view file (i.e., the .dvx file).

Referring back to step 1306, instead of a label being created, the user can request that a container or content be created 1320. Accordingly, the first module 1058 accepts 1322 user selection of an Object from the corresponding schema previously selected. Furthermore, the user may select 1324 attributes to retain for each Object, and may define other restrictions. This will be subsequently discussed in further detail for one implementation utilizing the "where" clause. Thereafter, the second module 1060 generates 1326 all the information needed to build the SQL query. For example, such information can include the primary key, relationships with ancestors in the hierarchy, attributes to display, and restrictions, among others, as will be described in more detail later. Control then passes to step 1314, which has already been described.

Figure 15:
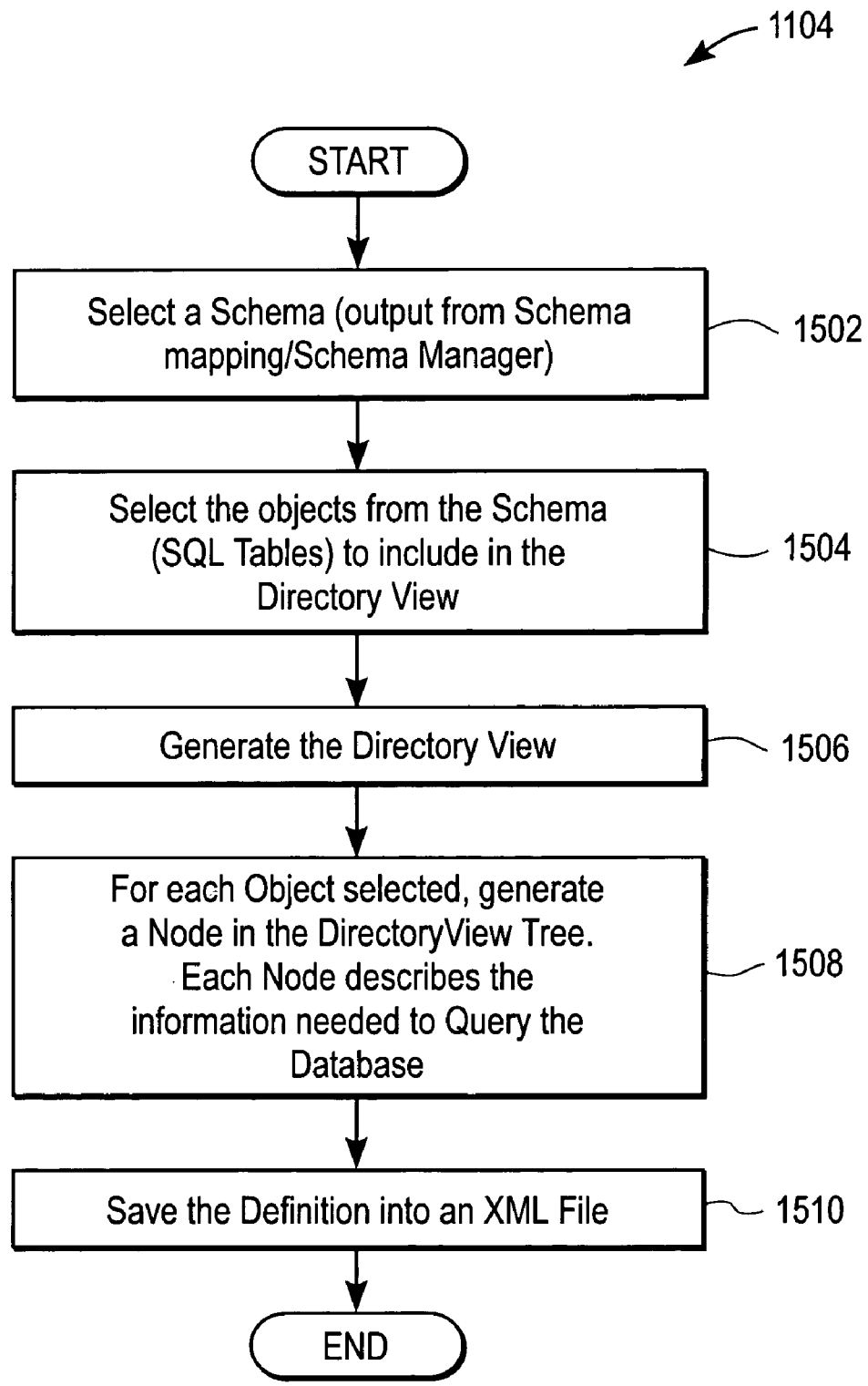
FIG. 15 is a flowchart of a preferred method for generating a default directory view from schema data in accordance with the present invention.

Referring back to step 1104 of FIG. 11, a default directory view may be created automatically, as described in more detail in FIG. 15. As seen in the example of FIG. 15, a schema output as a result of the schema mapping and schema manager modules 1062 and 1058, respectively as discussed in either FIGS. 14a or 14b, can be selected 1502 by the user. User selection of the objects from the schema (e.g., SQL tables) to include in the directory view is accepted 1504 by the Directory View Generator 2200 as will be described in more detail subsequently. At step 1506, the directory view is generated 1506. In doing so, for each Object selected, a node in the DirectoryView Tree is generated 1508. Each node describes the information needed to query the database 106. Thereafter, the definition is saved 1510 in a directory view file (i.e., the dvx file).

Figure 14C:
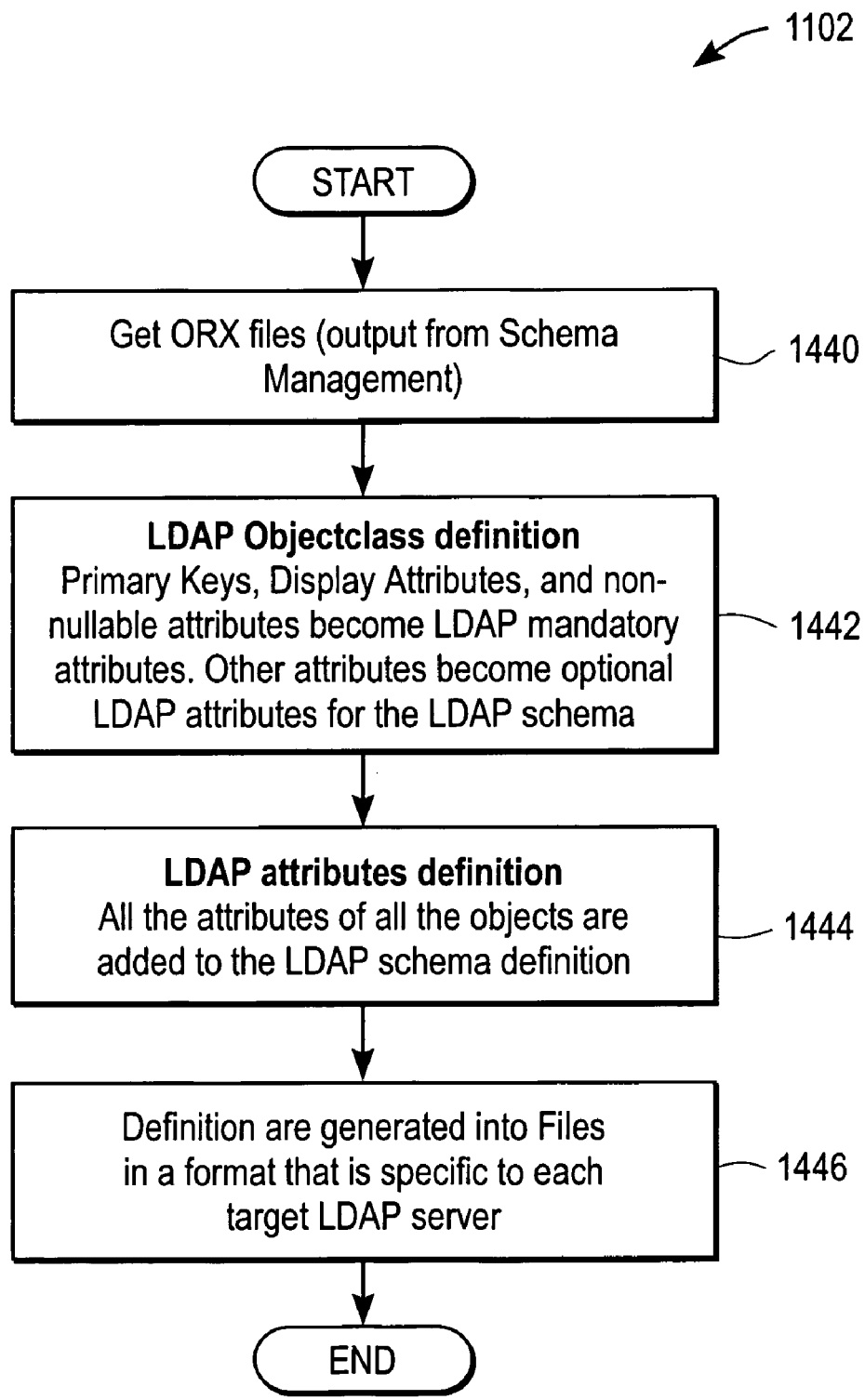

Throughout the process described in FIG. 11, the mapping of Objects from the relational model into LDAP model is performed, for example in steps of schema management as described in FIG. 14b, and using the process shown in FIG. 14c. Reference is now made to FIG. 14c to further describe the Objects mapping to the LDAP schema. As shown in FIG. 14c, the schema file (i.e., the .orx file) output from the first module 1058 is obtained 1440 by module 1062. Part of this process involves establishing definitions 1442 for the LDAP Objectclass. For example, mandatory LDAP attributes are established, like the primary key, display attributes, and non-nullable attributes. Other attributes may be established as optional LDAP attributes for the LDAP schema. More details about this process is explained subsequently in detail. Next, the LDAP attributes are added 1444 to the definition. More particularly, in step 1444, all the attributes of all the objects are added to the LDAP schema definition. The LDAP definitions are generated 1446 into files using a format that is specific to each target LDAP server.

Figure 12:
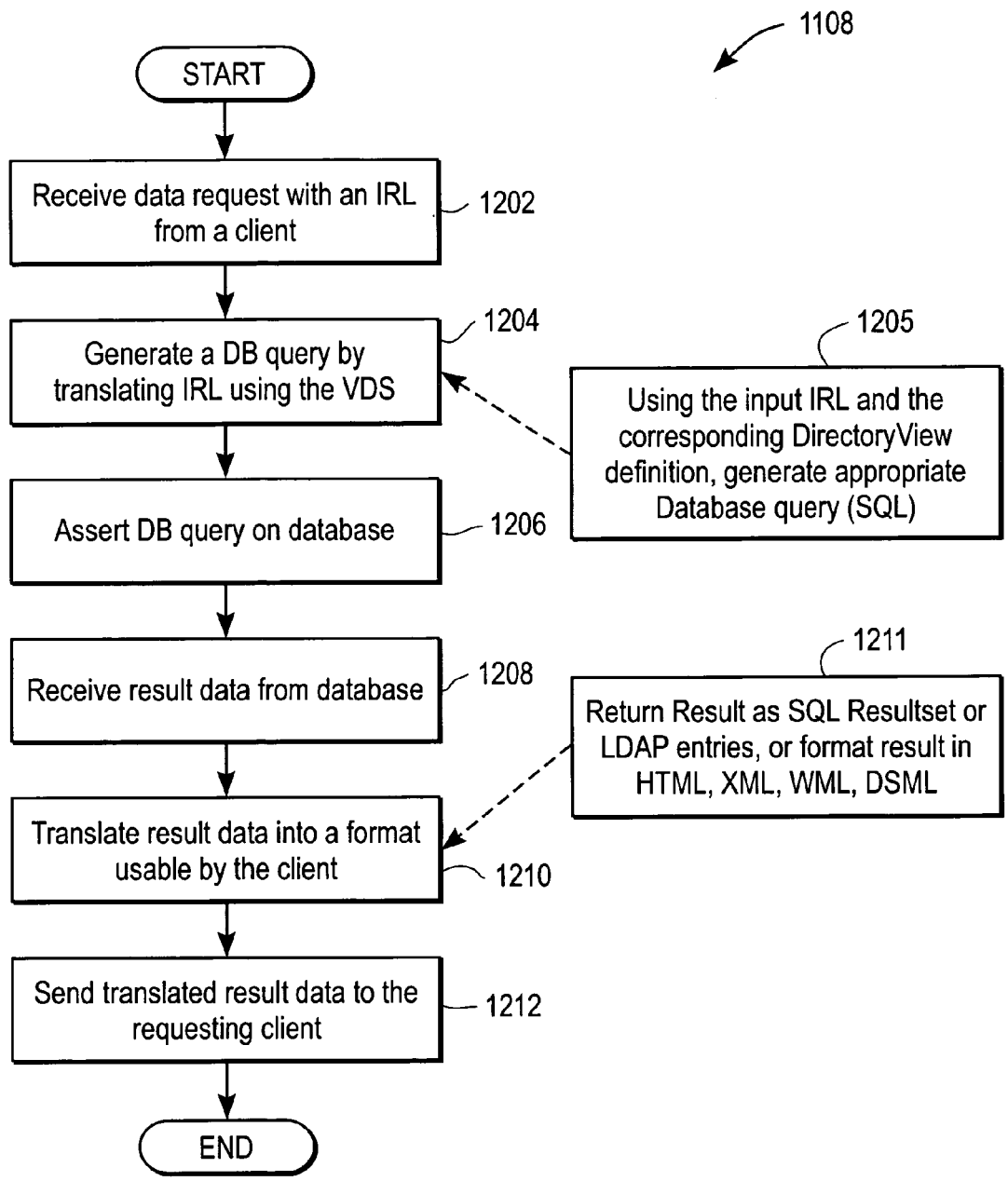
FIG. 12 is a flowchart of a preferred method for operating a virtual directory system at run-time in accordance with the present invention.

At this stage, the directory view is added to the VDS 408 and is accessible under the control of either the third module 1056, or the LDAP server application 1053 (as seen in FIG. 10B). Additionally and as indicated in FIG. 11, the VDS may be queried 1108 and results generated in response from the VDS. More details about this process 1108 is shown in the exemplary flowchart of FIG. 12. In the example of FIG. 12, data requests are received 1202 by the VDS from the client, along with an IRL. Using the IRL received, a database query is generated 1204 by translating the IRL using the VDS.

More specifically, using the input IRL and the corresponding DirectoryView definition, the appropriate database (e.g., SQL) query is generated 1205, for example by mapping generator 304 of FIG. 3A. Thereafter query generator 206 can assert the database query on database 106. In response, the result is received 1208 from database 106, for example at result storage unit 208 in FIG. 2. The data result received is then translated 1210 into a format that is useable by the client 402. In particular, the result is returned 1211, for example, as an SQL result set or LDAP entries. Alternatively, the results can be formatted in HTML, XML, WML, and DSML or other equivalent mark-up language that may be associated with particular client application. The translated data results can then be sent 1212 to the requesting client 402.

B. Schema Manager Application

The concepts and procedures for capturing database schema, and for analyzing and declaring missing attributes will now be discussed with focus being directed to a first module 1058, which is referred to interchangeably herein as the schema manager (application) 1058. The first module 1058 is referred to interchangeably herein as the schema manager 1058 for convenience. The schema manager 1058 is preferably a database schema software tool designed for extracting and capturing relational database metadata from a variety of relational databases 106b that can be accessed with OLE DB, ODBC, and/or JDBC software drivers. One type of configuration that works suitably well with the present invention comprises encoding the captured schema with an Internet markup language like, for example, Extensible Mark-up Language (XML). Once the schema is formatted with XML, the encoded metadata is then stored in a schema file. For example, the schema file may be stored with an .orx file extension representing the Objects and Relationships expressed (e.g., encoded) in XML, primarily for convenience and ease of system administration.

Figure 40:
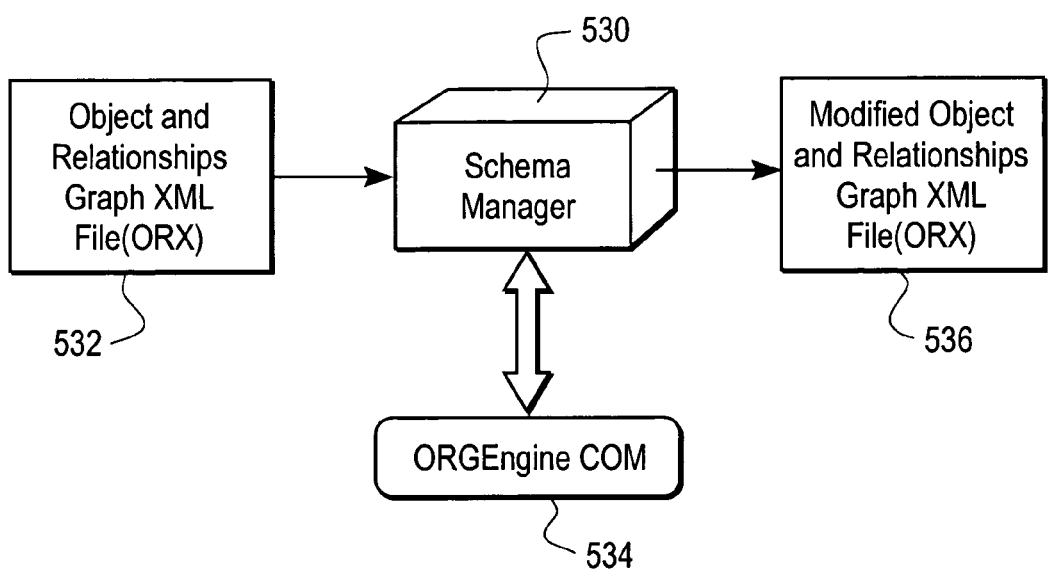
FIG. 40 is a data-flow block diagram of the schema manager application in accordance with the present invention.

Referring to the block diagram of FIG. 40, an aspect of the schema manager module 1058 is shown for the function of managing objects and relationships. In the embodiment of FIG. 40, a schema manager module 530 processes the objects and relationships corresponding to a schema already captured from a database, formatted and saved in the schema file 532. The schema manager module 530 may call upon COM objects associated with the ORGEngine 534 in order to process the contents of the schema file. As will be discussed in more detail subsequently, this processing can include, but is not limited to: (1) adding relationships; (2) defining primary keys; (3) defining those attribute(s) that best describe an object (e.g., a display name); and (4) defining derived views from master objects. Once the original objects and relationships have been modified according to the described processes, the modified objects and relationships can be placed into a modified schema file, as indicated by module 536. As will be described with interface 1900 in FIGS. 19A–C, the modifications made through interface 1900 to effectuate the described processing that produces the modified schema file, may be implemented using functional module of FIG. 40 to enrich the ORG object.

1. The Schema Manager Process

The schema manager application 1058 provides the following functionality: (1) capturing database schema; (2) declaring implicit relationships; and (3) creating default and derived views.

The schema manager 1058 captures 1802, 1102 database schema from multiple relational data sources, such as the Microsoft Access 1804, Microsoft SQL Server 1802, and Oracle 1808 servers, by way of example. Each of these servers is associated with it's own language, and its metadata can be exported 1802 to the schema manager 1058. Upon capturing this metadata, the schema manager 1058 encodes 1810 the database schema in a standard format, for example, XML, which is stored in a schema file with a .orx extension, as described herein. The schema manager also records the different database connections required, and as will be discussed subsequently in detail, manages the mapping of the captured schema to an LDAP schema.

The schema manager 1058 can also declare implicit relationships. After the schema is captured 1802, undocumented primary keys and relationships, that are implicit in the code but not appearing in the data dictionary, can be declared. Since logical relationships between the different tables are the primary support for constructing directory views 1104, it is important to declare any logical relationship not captured by the schema manager 1058.

Additionally, the schema manager 1058 provides the option of using a default view in place of constructing a view by using the second module 1060 (as will be described in the next sub-section). Derived views, which are views based on one attribute in a table (e.g., a postal code) can also be constructed using the schema manager 1058.

2. Using the Schema Manager Interface

Figure 19A:
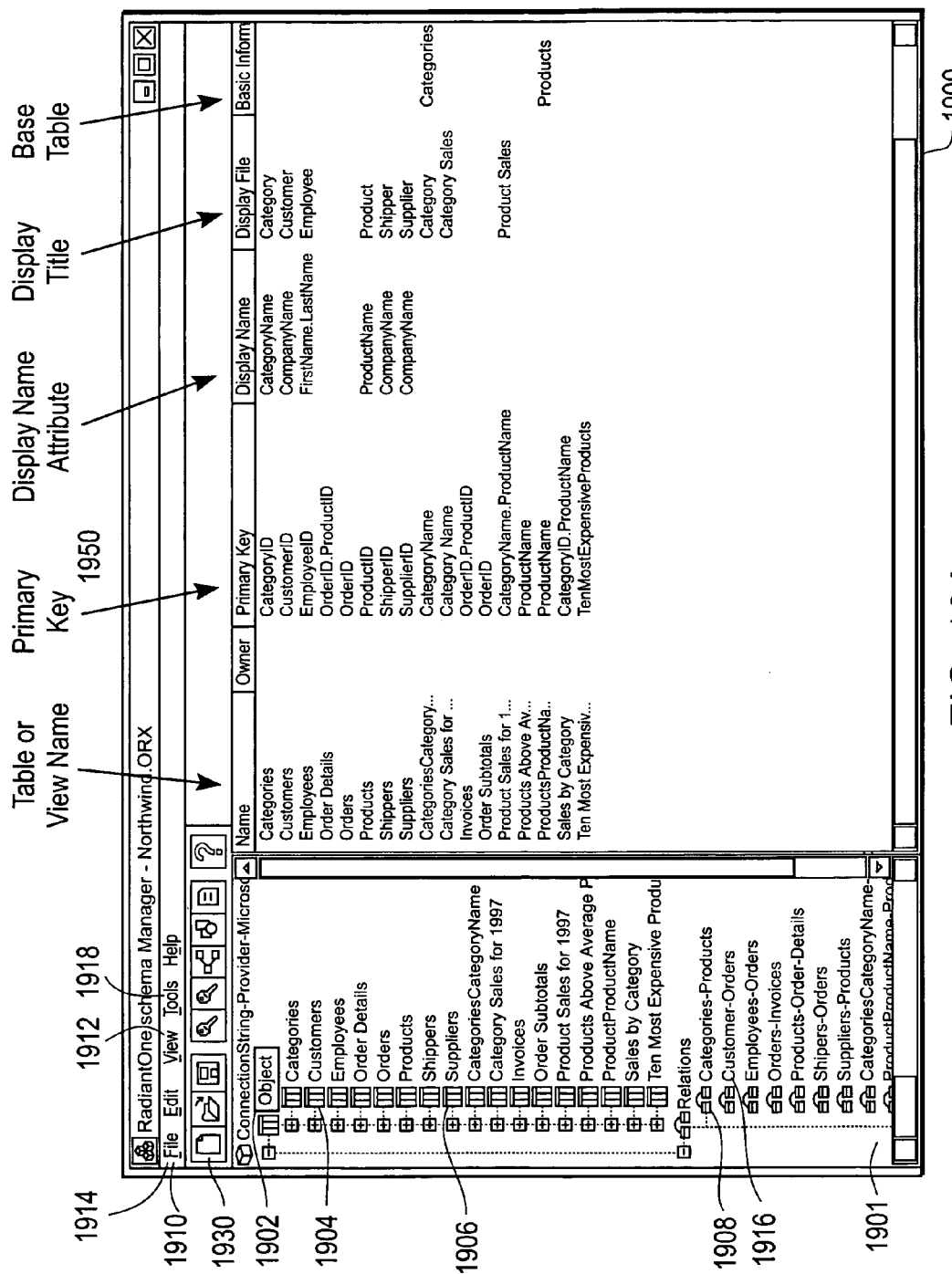
FIG. 19A illustrates an exemplary graphical representation of a user interface for displaying a representation of the objects and relationships resulting from a schema being captured in accordance with the present invention.
Figure 19B:
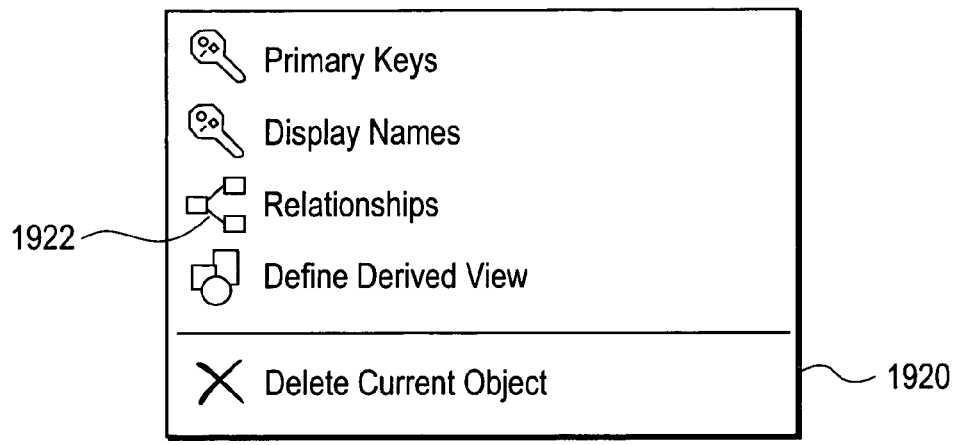
FIG. 19B illustrates an exemplary shortcut menu.

When the schema file is opened, a graphical user interface (GUI) 1900 as shown in FIG. 19A is invoked under the control of the schema manager application 1058. Interface 1900 maybe used in accordance with one embodiment of the present invention to display the database objects, which can include tables, views and relationships, preferably in alphabetical order. When a database object is selected in the interface 1900, information about the object appears in one portion of the interface. For example, in one embodiment of the interface 1900, the information about the selected object can appear on the right-hand side of the interface (as will be discussed with respect to FIG. 19A). It will be appreciated by those skilled in the art that a user interface, like for example the interface 1900, includes functionality common to conventional database schema managers. For example, such functionality comprises enabling the user to view, browse through, and edit the information.

The schema manager 1058 provides the information and resources to identify and to declare any relationships and primary keys that are not explicit in the database definition. The declaration process is a significant step because the declaration affects the quality of the directory views that will be created using the second module 1060. Any undeclared relationships or primary keys can result in a meaningless path or IRL, the consequence of which directly affects the quality or availability of information displayed using the third module 1056.

For example, FIG. 19A shows one embodiment of a user interface 1900, which illustrates summary information of all of the objects and relationships contained in a sample file, entitled Northwind.orx, having been extracted using the schema manager 1058 of the present invention. As shown in the example of FIG. 19A, a top-level name Objects 1902 is selected, and correspondingly, important summary information is displayed for each of the tables, views and relationships within the virtual directory 1901. A first type of icon 1904 identifies tables, a second type of icon 1906 indicates a view, and third type of icon 1908 identifies a relationship. Those skilled in the art will recognize that such distinctive icons are described by way of example, and that the present invention may be practiced with a variety of distinctive identifiers used for clarifying certain features of the present invention.

Figure 19C:
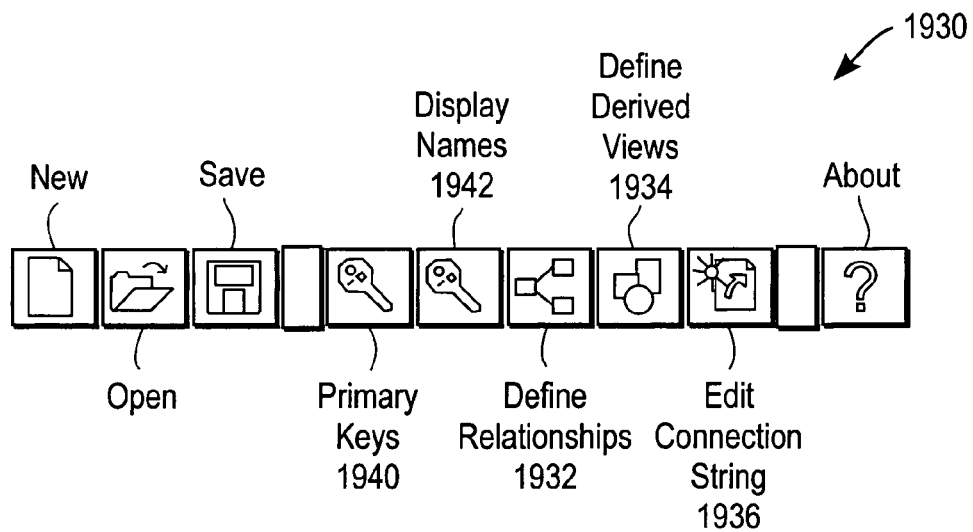
FIG. 19C illustrates an exemplary toolbar, both of which can be used to provide command selection to the user interface of FIG. 19A.

Commands available within the schema manager 1058 can be accessed in a variety of ways. For example, pull-down menus are available from the menu bar 1910 at the top of the interface 1900. After using a control input device to direct a cursor to click on a drop-down menu name, e.g., View 1912, a list of commands is displayed from which a selection can be made. Alternatively, schema manager 1058 can also provide command selection through the use of short-cut menus which are provided by the interface 1900. Referring to the particular embodiment of a user interface shown FIG. 19B, by performing a right-click command on an object (e.g., table, view or relationship) using a mouse, a shortcut menu 1920 appears, from which a command can be selected. Still further, schema manager 1058 can provide further command selection through the use of a toolbar 1930 as shown in the embodiment of FIG. 19A. FIG. 19C illustrates an exemplary toolbar 1930, which those of skill in the art will recognize may be programmed accordingly to conventional techniques. It will also be appreciated that menu bar 1910, shortcut menu 1920, and toolbar 1930 may be used with the present invention either by itself, or in combination with each other, and that command selection is not limited to any of these techniques.

3. The Schema Manager Basic Terms

Several definitions are introduced as follows to provide clarity and a foundation for the terms used and features described herein.

In a relational database, every table has a column or a combination of columns, known as the primary key of the table. These values uniquely identify each row in a table. At times, tables that were created in the database are found, but whose uniquely is identifying column(s) were not documented in the system catalog as the primary key. Declaring implicit primary keys is one of the database refining processes that can be performed with the second module 1058. As seen in the interface of FIG. 19A, a column indicator 1950 identifies those columns being primary keys. Additional details of the primary key are discussed in the section entitled Declaring Primary Keys.

Figure 20:
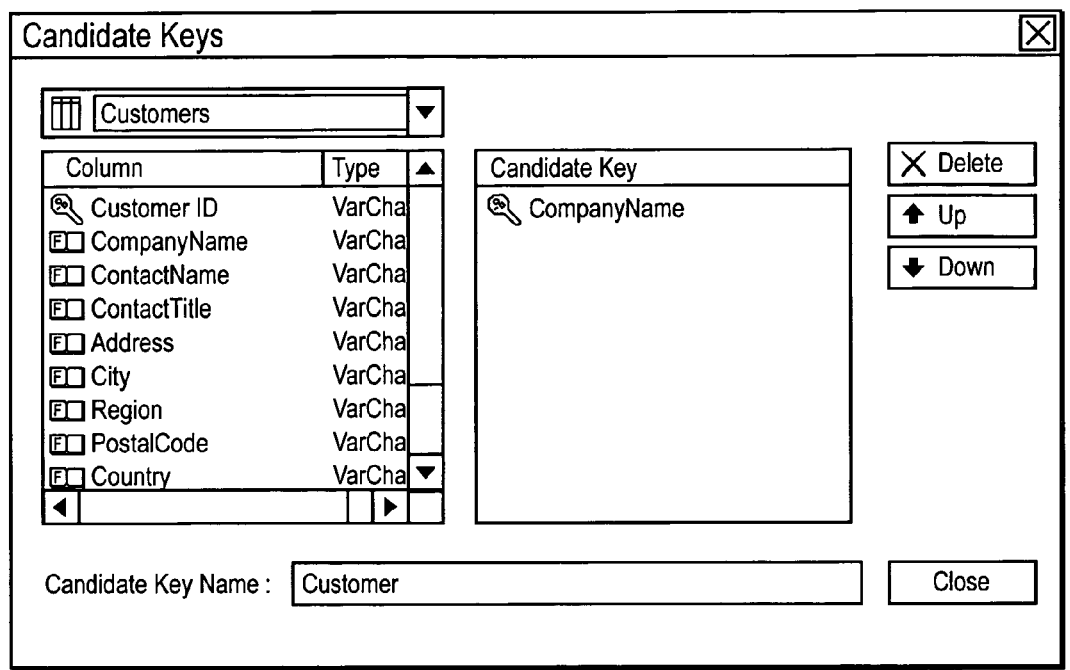
FIG. 20 illustrates an exemplary graphical representation of a user interface for selecting a candidate key name in accordance with the present invention.

By using the schema manager 1058, a display name, or alias, can be created for a the primary key. The display name allows the user browsing the directory to be shown more useful information. For example, if the primary key of the Customer table is CustID with an integer attribute type, then a list of numbers will be displayed in the directory tree at run time. Frequently, the user who created the directory will be the only person for whom those "numbers" have meaning. To avoid this situation, a display name could be created with the user's first name and last name in accordance with the present invention. Instead of the user seeing a "meaningless" number, the user will be able to discern a customer name that may suggest context and be significant to a larger audience. The display name is typically a combination of the primary key and one or more attributes. For example, the added attributes may be a user's first and last names. An example of a user interface 2000 is shown in FIG. 20 for selecting a display name. Additional details of the display name are discussed in the section entitled Declaring Display Names.

In order to evaluate missing relationships in the schema manager 1058, having a working knowledge of the underlying database application on which the schema is based is essential. Occasionally, the relationships between objects are not captured in the schema, for example, when some links are created implicitly. This means that the logical relationships may be present in the application, but are not recorded within the database dictionary (i.e., system catalog). Once relationships have been determined to be missing, these relationships can be declared from the schema manager 1058. One manner for doing so, for example, is with the Define Relationships command (i.e., button) 1932 of FIG. 19C. Additional details of relationships are discussed in the section entitled Setting Relationships.

Figure 21:
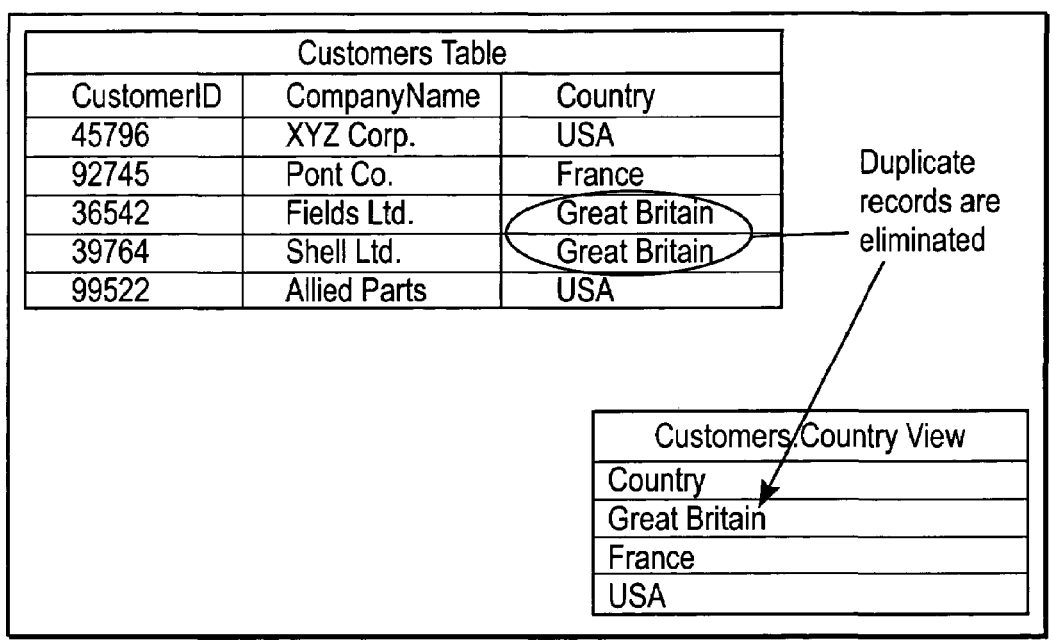
FIG. 21 illustrates an exemplary graphical representation of a user interface for a derived view according to one example of the present invention.

A derived view results from queries made to the base table and/or VDS as discussed in the flowchart of FIG. 14b. The derived views are built by promoting one of the attributes of the base table to the entity level. Once the view is created, it can be added to the schema, after which the new relationship can be used to create more detailed and flexible views of information. Referring to the example of FIG. 21, a database includes a table that lists Customers and related attributes, including the attribute for Country. In order to determine a list of all countries having associated customers, the derived view feature of the present invention enables the creation of a view that lists all applicable countries. One advantage of having a derived view is the provision of summary data. For example, as shown in FIG. 21, all occurrences of a particular country is summarized in the derived view, that is, combined into one record for viewing. A derived view can be declared from the schema manager 1058. One manner for doing so, for example, is with the Define Derived Views command (i.e., button) 1934 of FIG. 19C. Additional details of derived views are discussed in the section entitled Creating Derived Views.

In FIG. 19C, the Edit Connection String command (i.e., button) 1936 found in interface 1900 can be defined to provide the function of changing the path to a database. The path is defined by OLE DB, ODBC, or JDBC whichever is applicable. Additional details on editing connection strings are discussed in the section entitled Editing Connection Strings.

Figure 22:
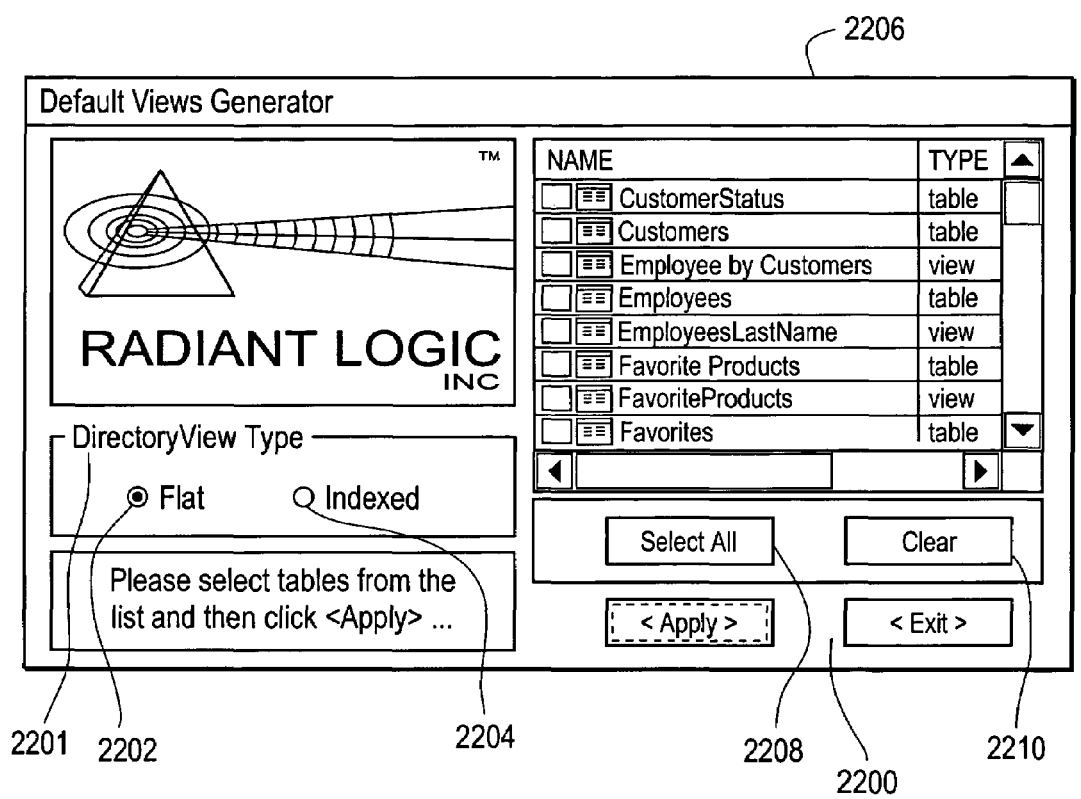
FIG. 22 illustrates an exemplary graphical representation of a user interface for enabling a user to select a directory view type in accordance with the present invention.
Figure 23A:
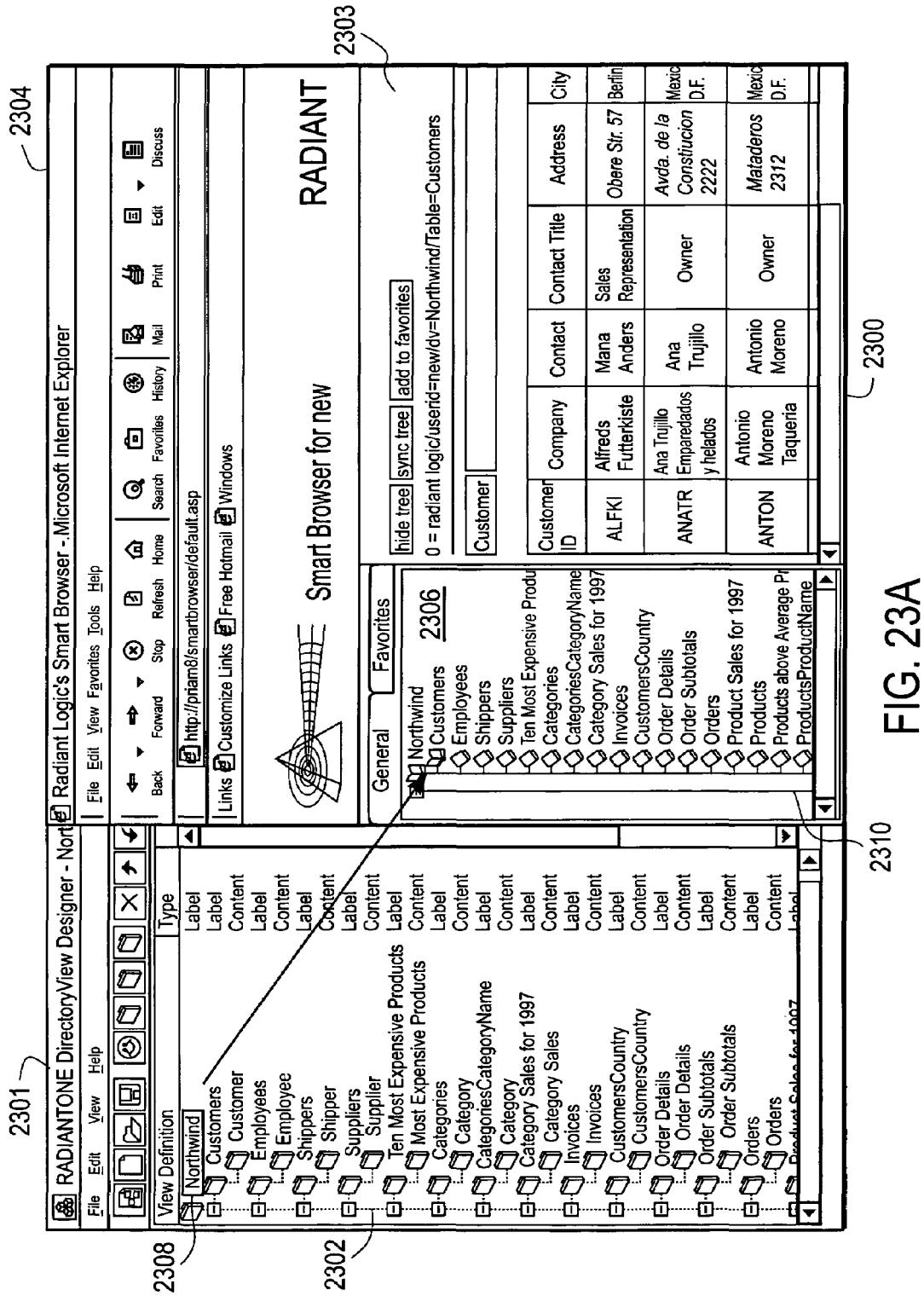
FIG. 23A illustrates an exemplary graphical representation of a user interface for displaying a default flat view in accordance with the present invention.

A default view represents a default namespace, and can be created to either be a flat or indexed namespace. An example of a user interface referred to herein as the Default Views (DVX) Generator 2200 shown in FIG. 22 allows a user to select a directory view type 2201. For example, if a flat namespace with a simple short Distinguished Name (DN) is desired, the DVX Generator 2200 can be used to select the flat directory view type 2202. As is known in the art, a DN is a compound name that uniquely identifies an entry in an LDAP or X.500 directory. Thereafter, referring to FIG. 23A, the second module 1060 can be used to generate, by way of example, a user interface 2301 to display a DIT 2302 and a corresponding flat default view 2303 corresponding to a DN for the information displayed 2304 using the third module 1056. In the example of FIG. 23A, the DN is comprised of table=Customers 2306, dv=Northwind 2308, and o=radiantlogic. Upon selecting the flat directory view type 2202 from the DVX generator 2200, all of the tables 2310 that are selected are shown in the user interface 2300 of FIG. 23A. In particular, a flat default view 2303 enables a large amount of information to be displayed in view form. Accordingly, it will be appreciated by those skilled in the art that, in general, the flat namespace is well-suited to views that are not complex nor have a customized DIT. Additional details of default views are discussed in the section entitled Creating Default Views.

Figure 23B:
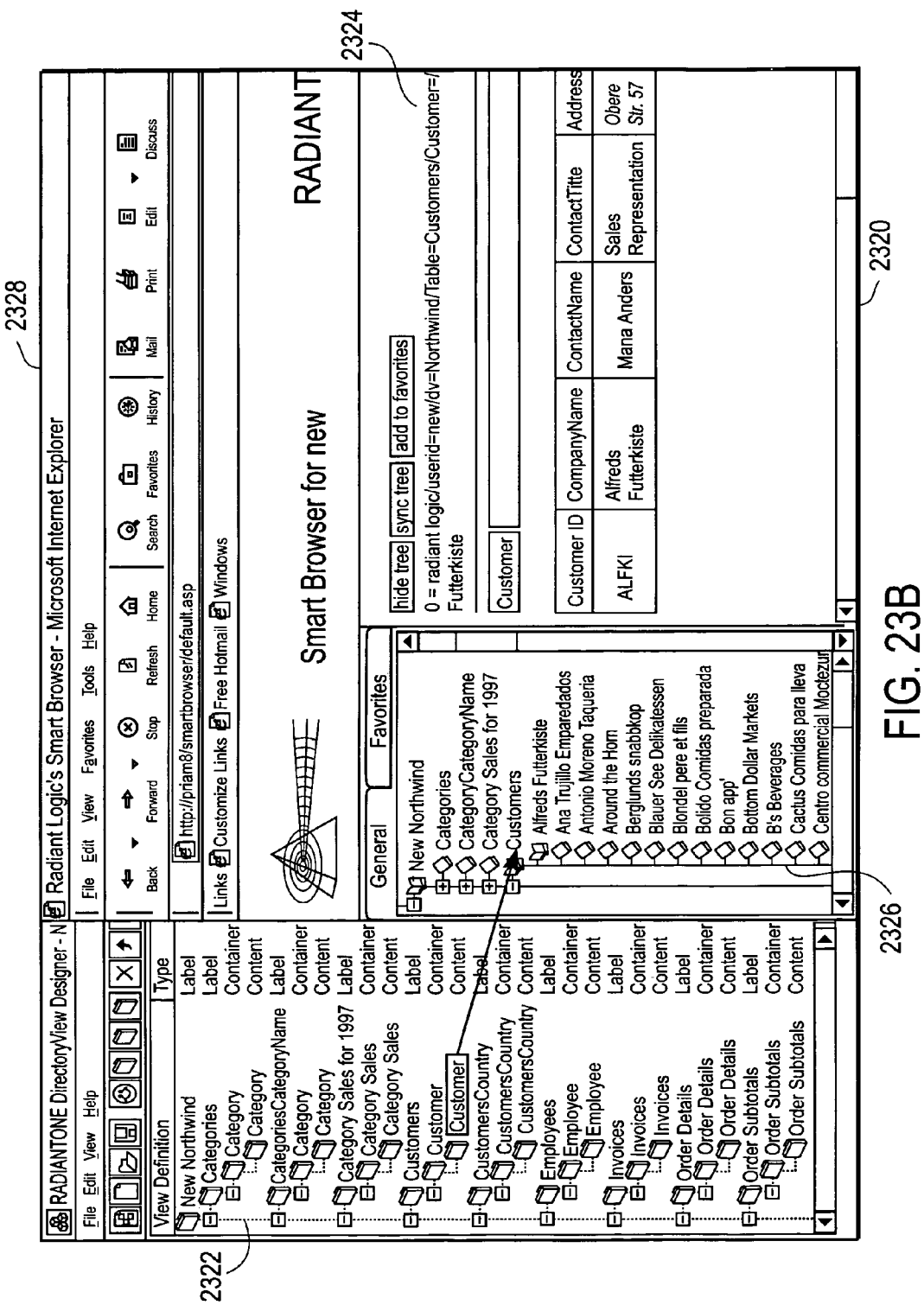
FIG. 23B illustrates an exemplary graphical representation of a user interface for displaying a default indexed view in accordance with the present invention.

By contrast, indexed views permit each record of the table to be an entry in the DIT. Referring to the user interface for the DVX Generator 2200 shown in FIG. 22, if the indexed directory view type 2204 is selected, then in response and referring to FIG. 23B, the second module 1060 is used to generate, by way of example, a user interface 2320 to display attributes of a DIT 2322 in a corresponding default indexed directory view 2324. As seen in FIG. 23B, each customer is an entry in the tree 2326 on the left-hand side of interface 2328 as generated by the third module 1056. Although a longer DN is needed to retrieve the information using the indexed directory view, a comprehensive presentation is made available to users upon browsing the directory view.

4. Using the Schema Manager

In accordance with the particular embodiment described, the discussion will now focus on the process for capturing the database schema, determining the validity of the schema captured, and creating default and derived views.

(a) Capture the Database Schema

Figure 24:
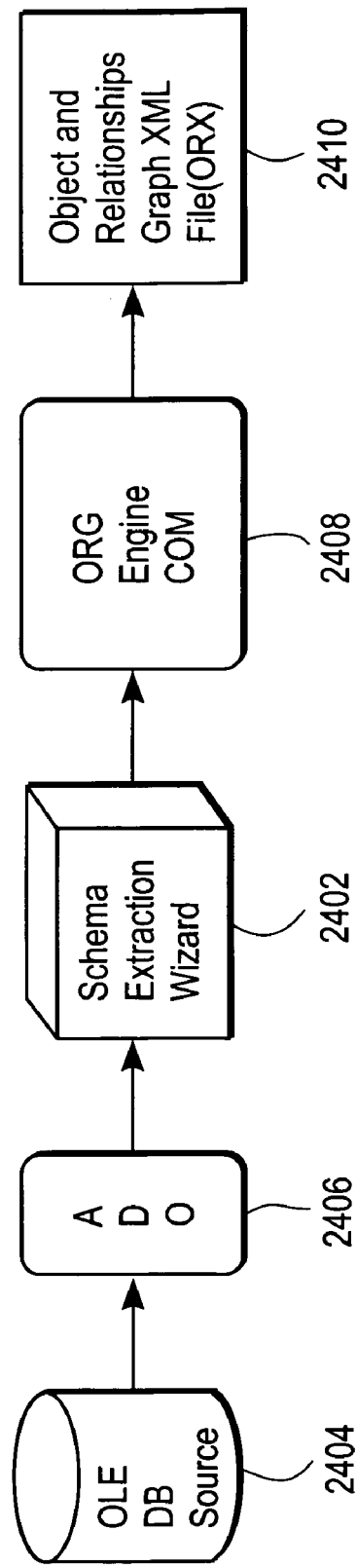
FIG. 24 is a block diagram of one embodiment for extracting information from a relational database in accordance with the present invention.

A key function of the schema manager 1058 comprises capturing database schema. To describe one manner for performing this function, reference is now made to a block diagram of FIG. 24 having a module 2402 for capturing the database schema. To provide added clarity of the present invention, reference will contemporaneously be made to FIG. 18. Module 2402 is interchangeably referred to as the Schema Extraction Wizard. The primary function of module 2402 is to select 1402 an OLE DB data source 2404 using the Datalink object for dialogs. OLE DB source 2404 can be any OLE DB or ODBC compliant databases known in the art. Several examples of such compliant databases include the Microsoft Access Jet, SQL, Oracle 8, and IBM DB2 databases. The database schema, which may comprise tables, views fields and logical relationships, is extracted from DB source 2404 with the use of database objects abstraction, such as Active Data Object (ADO) 2406 or JDBC objects. ADO 2406 is a programming interface from Microsoft that is designed to facilitate data access. Typically, an ADO is embodied as a Component Object Model (COM) object, which is called whenever the data access functionality programmed into the object is needed. The database schema extracted 1802 is then stored as an Object and Relationships Graph (ORG) object using an ORG engine COM object 2408. The ORG object 2408 is then serialized and transformed 1404 into an XML format 1810 and saved in a file with a .orx extension as indicated by 2410.

Figure 25:
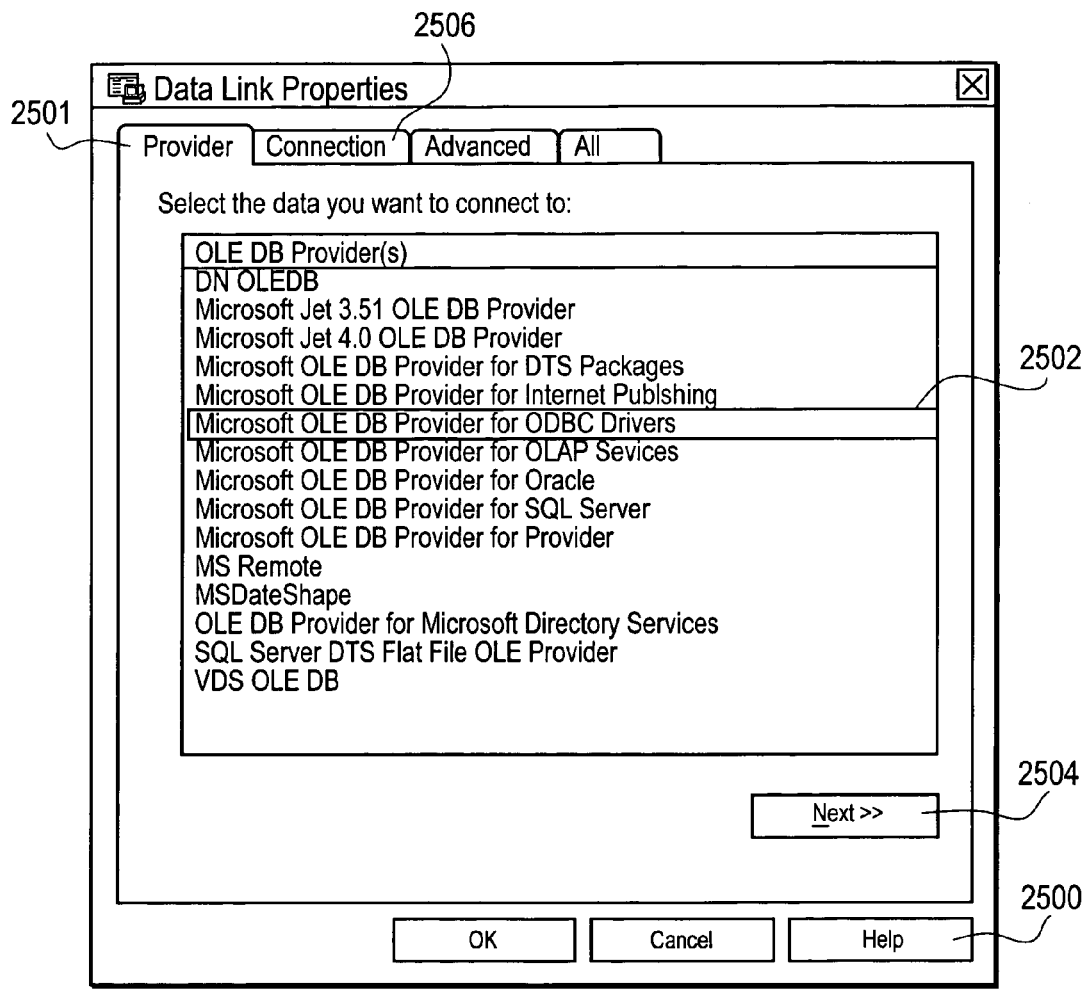
FIG. 25 illustrates an exemplary graphical representation of a user interface for selecting data link properties in accordance with the present invention.

To further illustrate the process of connecting the virtual directory server 408 to a database 1066 and selecting the database from which to capture schema from, reference will now be made to a user interface 2500 shown in FIG. 25. The Schema Extraction Wizard 2402 may be stored on server 406 and invoked by the schema manager application 1058. For example, a user at client 402 may invoke the Schema Extraction Wizard 2402 from the desktop application of the Microsoft Windows operating system by selecting from the Start menu, the Programs command, and an application directed to execute the schema manager module 1058. The schema extraction wizard 2402 may be programmed to start upon selecting the New command from the File drop-down menu 1914 in the menu bar 1910 of FIG. 19A. After the schema extraction wizard 2402 is invoked, a user interface in the nature of a Data Link Properties dialog box 2500 is presented to the user. Under the tab labeled Provider 2501, the user selects an OLE DB Provider, like for example, Microsoft OLE DB Provider for ODBC Drivers 2502 (and clicks the Next button 2504). Under the tab labeled Connection 2506 (and shown in more detail in FIG. 31 described subsequently), the appropriate fields are displayed for the OLE DB (ODBC) provider, and the user inputs additional entries into required fields to select the name of the database 2404. An indicator, for example a Test Connection command (i.e., button) can be selected in order to obtain a message as to whether or not the testing of the connection to the database indicated succeeded. Assuming that the test connection succeeded, another selection can be made to invoke the schema extraction process, whereby the schema (.orx) file is generated to hold an XML representation of the schema extracted from the database 2404. The schema extraction wizard preferably allows the user to name and save the schema (.orx) file before completing.

(b) Determining the Validity of the Schema Captured

Figure 26:
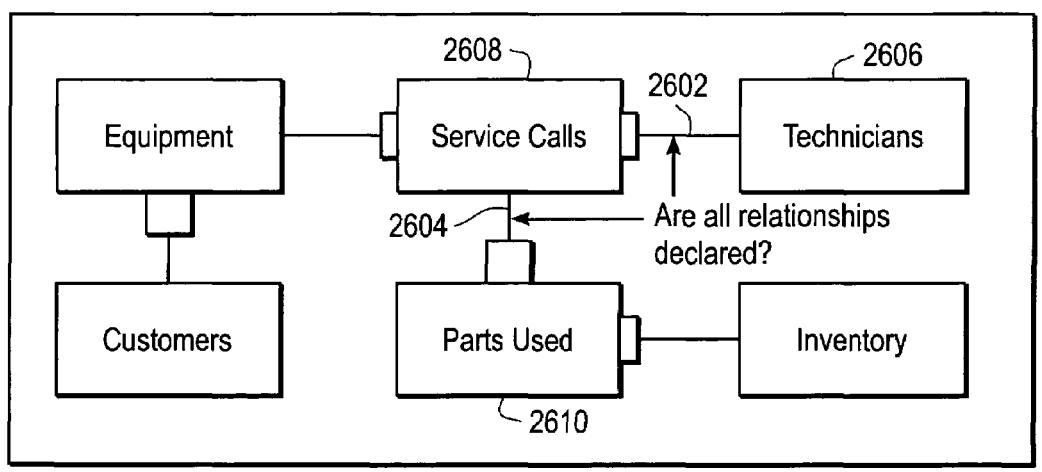
FIG. 26 is a high-level block diagram of a schema showing entities and relationships that have been defined when the schema is captured in accordance with one example of the present invention.

Once the schema is captured preferably using the described process, the captured schema should be validated. Referring now to FIG. 26, one example of implementing the validation of the captured schema is illustrated in the block diagram shown. In the example shown FIG. 26, the validity of the schema is evaluated by verifying that all the relationships and primary keys are defined in the schema (.orx) file that was created. In order to complete this process, the application or schema logic must be known in advance because some relationships or primary keys may be implicit in the code, that is, not appearing in the data dictionary. For example, FIG. 26 shows the relationships 2602, 2604 that have been already defined between the different entities, like technicians 2606, service calls 2608, and parts used 2610. Those relationships or primary keys that are intended to be represented in the directory view files (e.g., having a file extension of .dvx primarily for convenience and ease of system file administration) should preferably be declared and captured by the schema manager 1058. Accordingly, it is implicit that for this example, the schema manager 1058 does not capture objects that are undeclared in the database catalog or dictionary.

To further illustrate the process of validating the schema that has been captured by the schema manager 1058, reference will now be made to an example of a user interface 1900 of FIG. 19A to focus upon how declared and undeclared relationships may be verified. Referring to the example of FIG. 19A, when the File drop-down menu 1914 is selected in interface 1900, a command can be selected to open a particular schema (.orx) file of interest. Thereafter, when selecting a command corresponding to Relationships 1922 from the shortcut menu in FIG. 19B, a user can review a list of relationships associated with the particular schema (.orx) file opened. In order to declare any relationships that are missing (i.e., undeclared), the procedures outlined in the section entitled Setting Relationships can be invoked. To assist the user in ascertaining relationships that have been declared, particular nomenclature can be selected accordingly. For example and as indicated in FIG. 19A, declared relationships may be designated by the nomenclature comprising a single dash between two table names, like Customers-Orders 1916. Doing so provides a visual indicator to a user that there exists a relationship between the Customers table and the Orders table.

Still referring to FIG. 19A, to determine whether undeclared primary keys exist, a user may click upon the top-level named Objects 1902, so that the interface displays summary information for all of the tables and views displayed in the interface 1900. It is also noted that a review of the summary information can also be undertaken to determine whether other display names should be created as aliases for the primary keys. The primary keys 1950 may then be reviewed to ascertain whether undeclared primary keys exist. Upon discovering that an undeclared primary key exists, the process outlined in the section entitled Declaring Primary Keys may be invoked to declare the primary key.

(i) Setting Relationships

Figure 27:
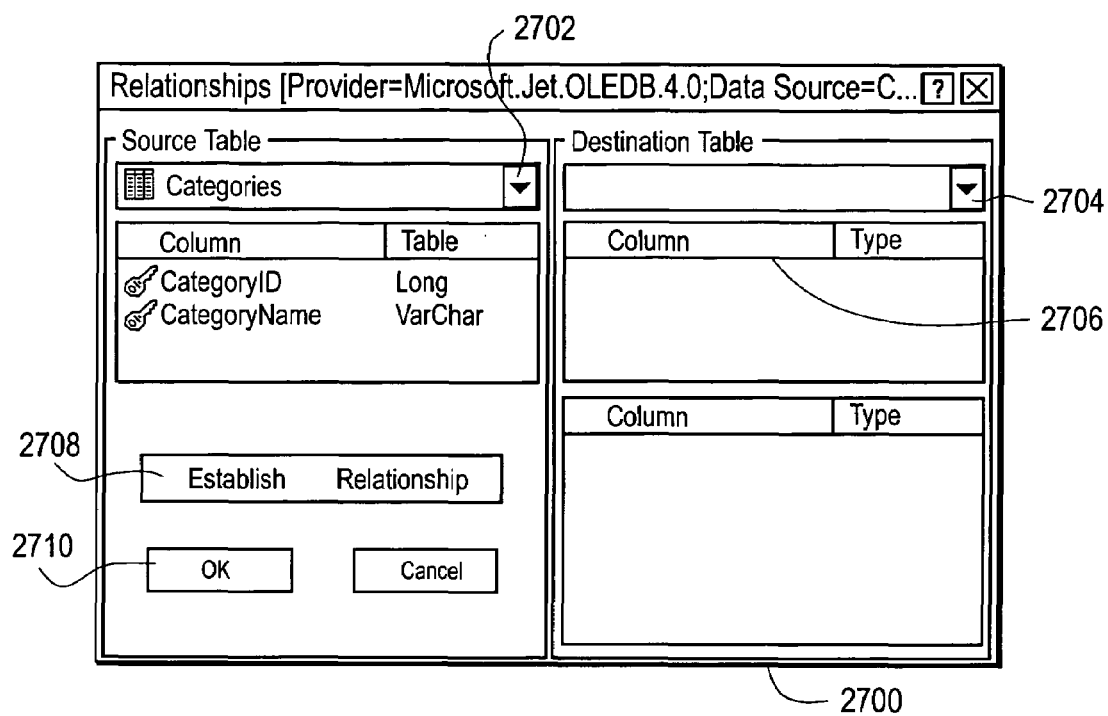
FIG. 27 illustrates an exemplary graphical representation of a user interface for defining relationships in accordance with the present invention.

Referring now to FIG. 27, one exemplary implementation for setting relationships is illustrated in the user interface 2700 shown. In FIG. 27, user interface 2700 may be embodied as a dialog box 2700 for defining relationships and can be invoked from the user interface 1900 of FIG. 19A. The relationship dialog box 2700 generally requires the source and destination tables or views to be identified. When creating relationships according to one embodiment in accordance with the present invention, it is typically unnecessary to specify which entity is the source and destination because the relationship represents a combination of the two entities and not necessarily any priority associated therewith.

To further illustrate the process of setting relationships by the schema manager 1058, reference will now be made to the particular embodiment of the user interface 2700 of FIG. 27 with occasional reference to FIG. 19A, by way of example. To establish a relationship between two entities, the Define Relationships command (e.g., button) 1932 may be selected from the toolbar 1930 shown in FIG. 19C in order to invoke the user interface 2700 as shown in FIG. 27. Drop down menus 2702, 2704 may be used to select source and destination tables, respectively. In the column field 2706, the column from the destination table may be selected, and the relation is established by clicking on the Establish Relationship command (button) 2708, and the OK button 2710.

(ii) Declaring Primary Keys

Primary keys that are implicit, that is having not been captured in the schema, and undeclared in the data dictionary, will not be included in the directory view file (i.e., dvx file) unless specifically declared. It should be noted that primary keys should be declared before display names can be created.

To further illustrate the process of declaring and modifying primary keys using the schema manager 1058, reference will now be made to the particular embodiment of the user interface 2800 of FIG. 28 with occasional reference to FIG. 19A, by way of example.

Figure 28:
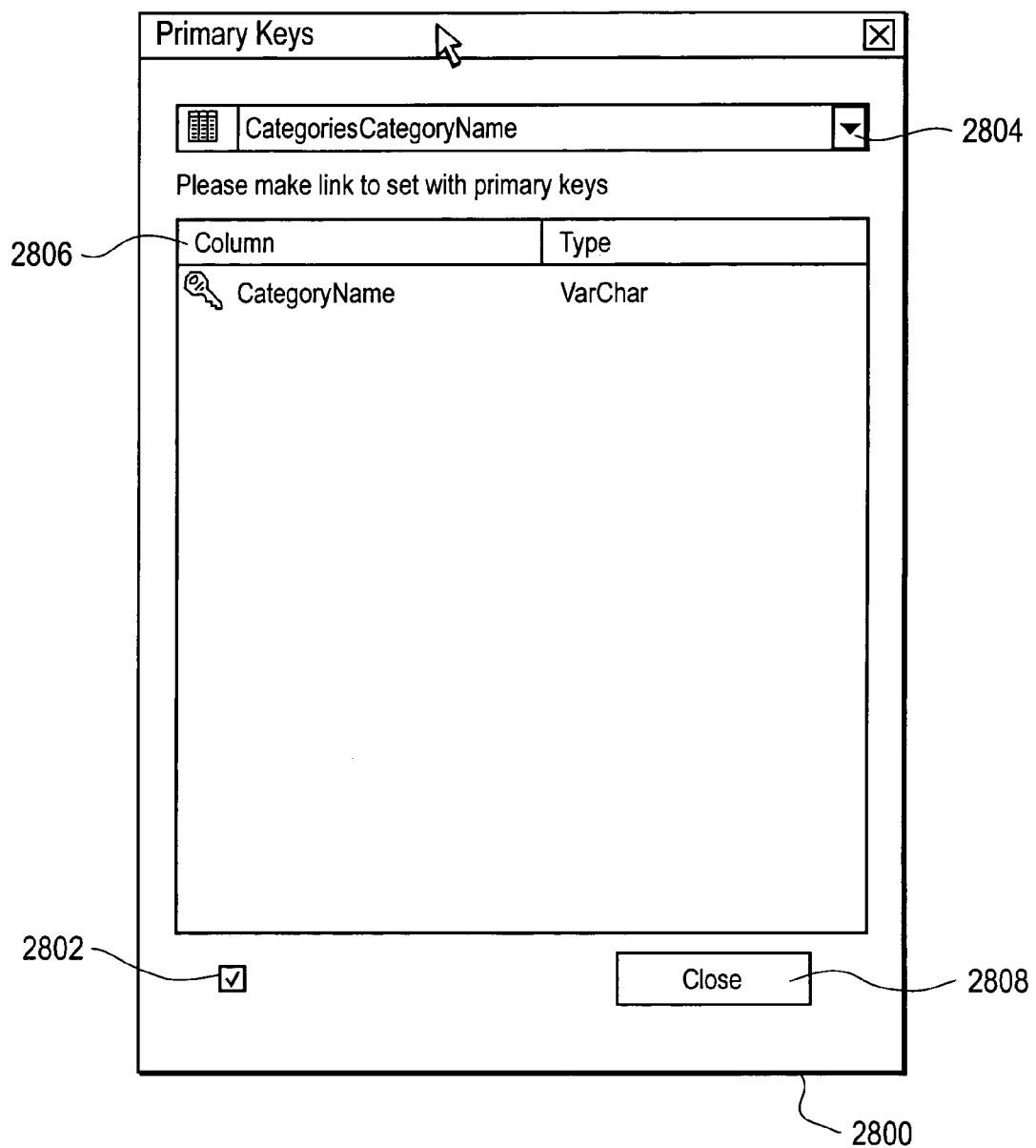
FIG. 28 illustrates an exemplary graphical representation of a user interface for determining the primary keys in accordance with the present invention.

One exemplary process for declaring primary keys 1408 begins with selecting the Primary Keys command (i.e., button) 1940 from the toolbar 1930 shown in FIG. 19C in order to invoke the user interface 2800 as shown in FIG. 28. In the example of FIG. 28, an option to deselect the Views Only representation is provided for those situations where the user is working with a table. For example, the Views Only representation may be deselected by removing the check from box 2802, otherwise the Views Only representation remains selected. Drop down menu 2804 may be used to select the desired table or view. By selecting the column name field 2806 from the list of displayed attributes, the primary key may be declared or modified. The process is completed by selecting the Close command (e.g., button) 2808.

(iii) Declaring Display Names

To further illustrate the process of declaring display names using the schema manager 1058, reference will now be made to the particular embodiment of the user interface 2900 of FIG. 29A with occasional reference to FIG. 19A, by way of example. As already indicated, display names are a combination of the primary key and at least one other attribute. In general, primary keys that are not implicit in an implementation of the present invention should not be allowed to be declared. It is noted, however, that new display names, which are aliases to the primary key should be permitted to be declared.

Figure 29A:
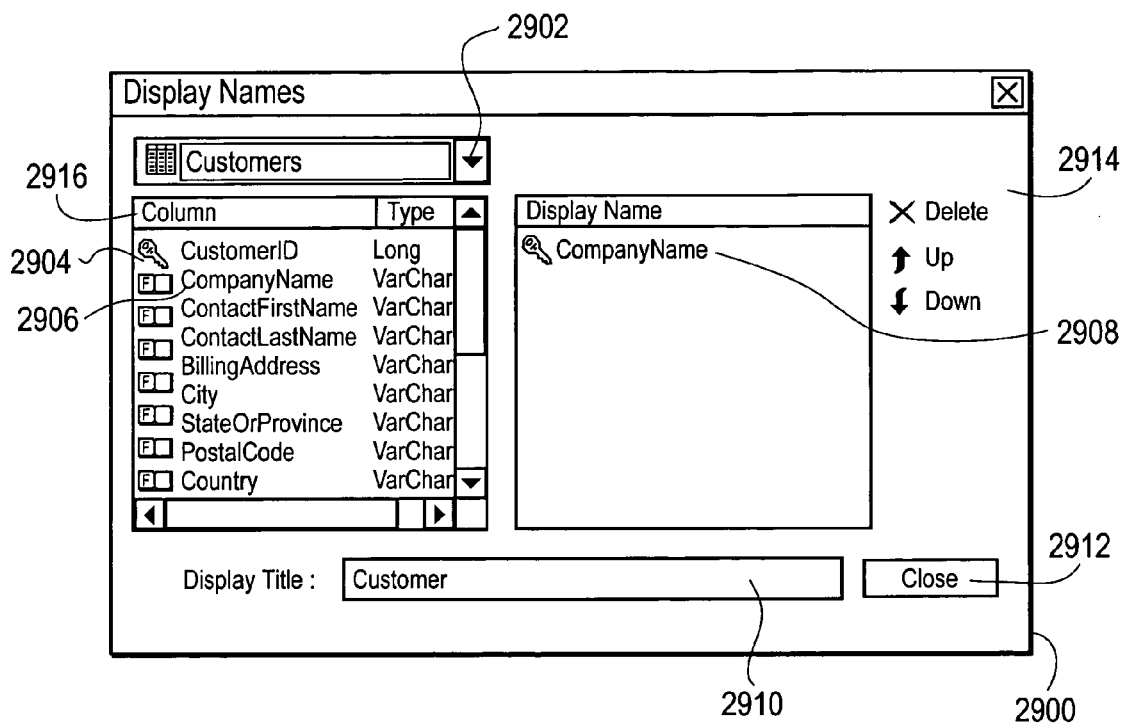
FIG. 29A illustrates an exemplary graphical representation of a user interface for declaring display names; FIG.
Figure 29B:
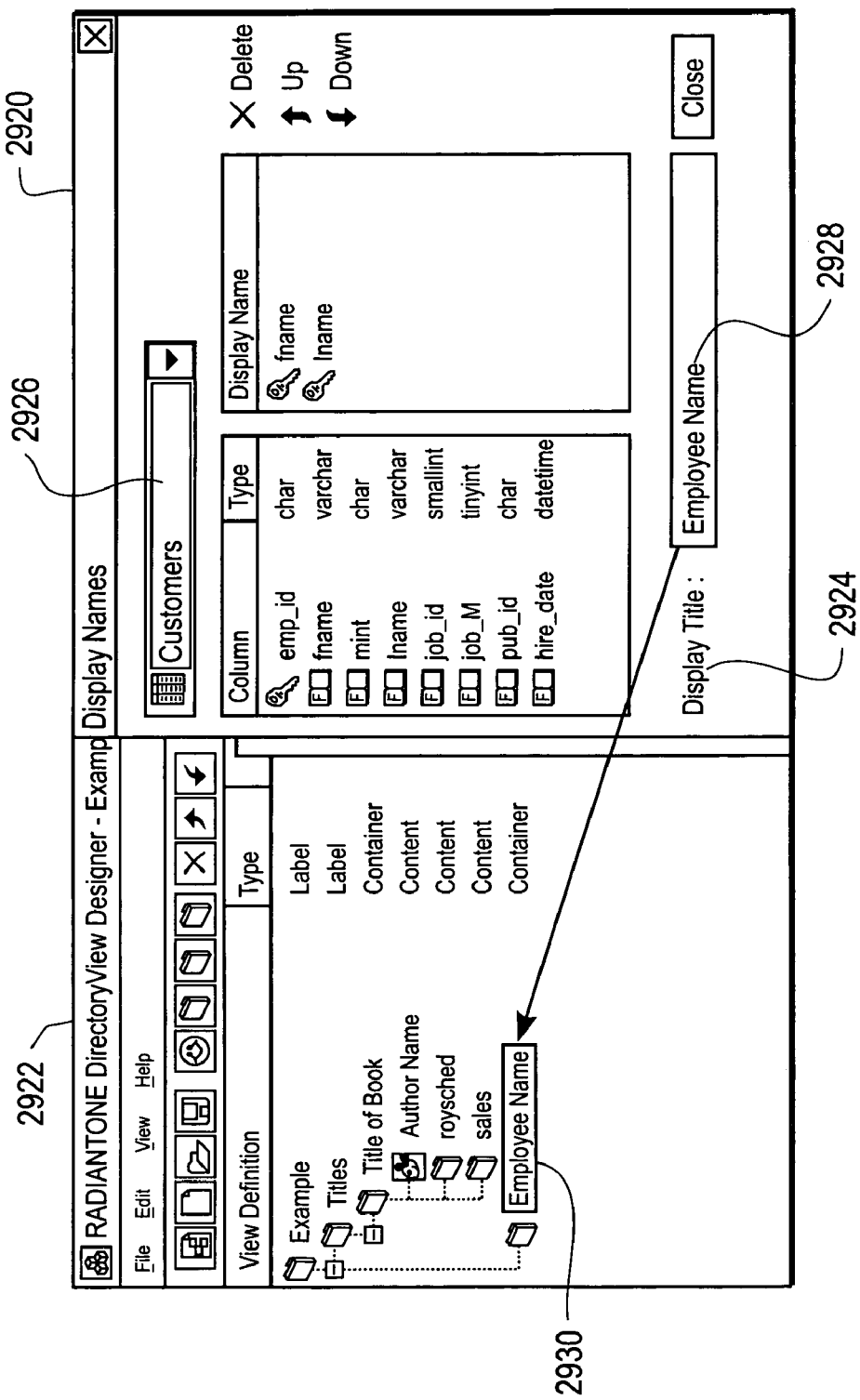
FIG. 29C illustrates an example of another interface for declaring the display names.
Figure 29C:
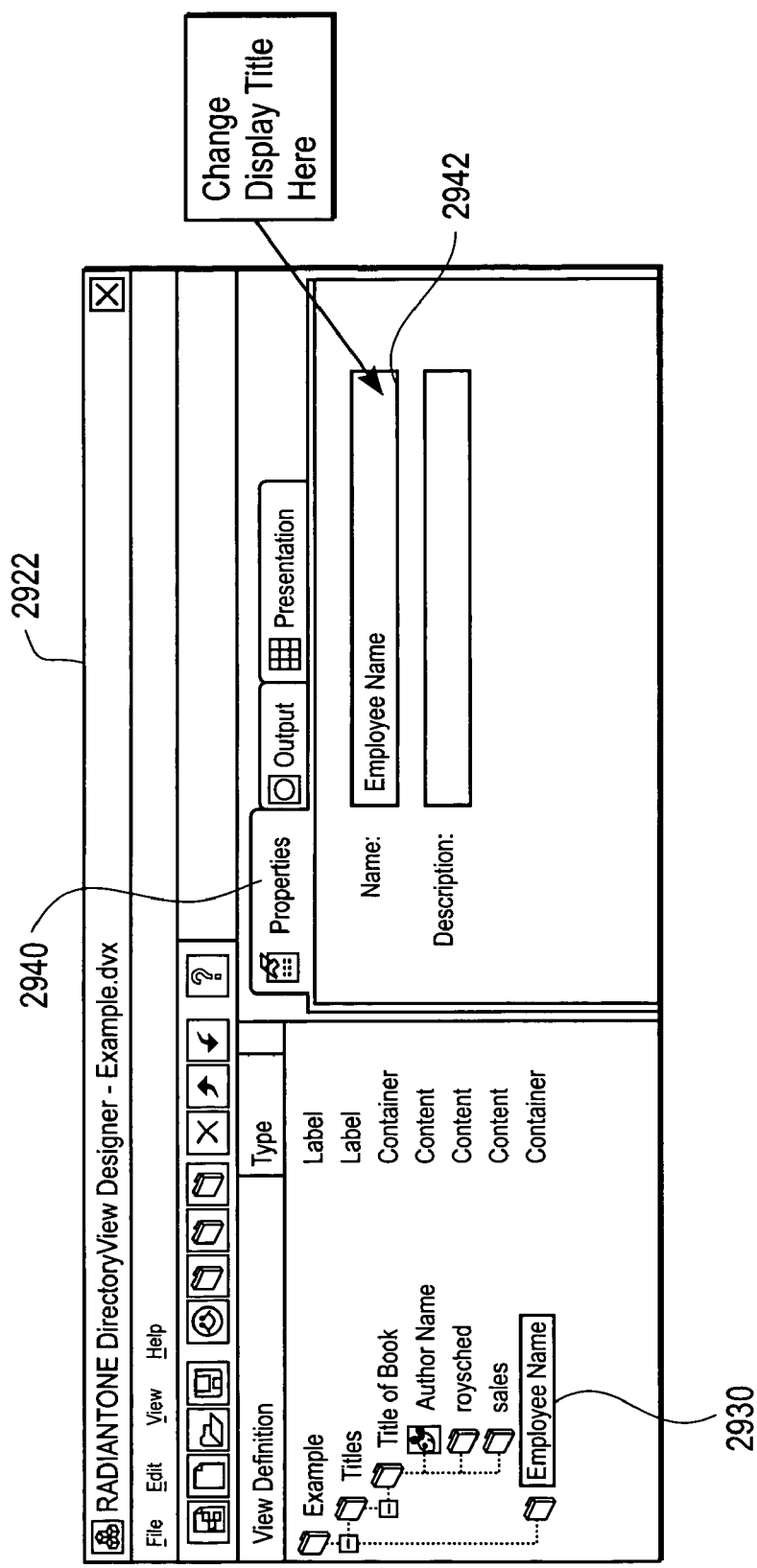

One exemplary process for declaring display names begins with selecting the Display Name command (i.e., button) 1942 from the toolbar 1930 shown in FIG. 19C in order to invoke the user interface 2900 as shown in FIG. 29A. In the example of FIG. 29, user interface 2900 is a Display Name dialog box, which includes a drop down menu 2902 that may be used to select the desired table or view. By selecting any of the attributes 2904 listed, the attribute can be set as a display name. For example, by clicking on the attribute referenced as CompanyName 2906, a display name CompanyName 2908 is established. Having selected the attribute to be combined with the primary key, a title may be input into the related text field 2910 labeled Display Title. The process is completed by selecting the Close command (e.g., button) 2912.

In this example, the Display Title will automatically become the default name for a container or content object when the corresponding table is accessed by the second module 1060. The Display Title will also appear as the name of the attribute to the left of the equal (=) symbol in the RDN. Referring to the example of FIG. 29B, there is shown a Display Title textbox 2924 generated by the schema manager 1058, and a default container referenced as Employee Name 2930 in the user interface 2922 generated by the second module 1060. When the Display Title 2924 in the Display Name dialog box 2920 for the Employee table 2926 is set to be equal to the Employee Name 2928, then when the Employee table 2926 is accessed to create a container or content level by the second module 1060, the default name for that specific level will be the Employee Name 2930. In this example, the RDN is Employee Name=Employee Primary Key value.

Alternatively, display names can be declared in the second module 1060. For example, when the display name "Employee Name" 2930 is selected using a control input cursor device as in FIG. 29C, a Properties tab 2940 found within the user interface 2922 may be selected. Within the Properties tab 2940, changes to the "Display Title" may be made within the "Name" textbox 2942. Additional details of declaring display names are discussed subsequently.

One exemplary process for deleting a display name will now be discussed. Referring back to FIG. 19C, when the Display Name command (i.e., button) 1942 from the toolbar 1930 is selected, the Display Name user interface 2900 is invoked as shown in FIG. 29A. Drop down menu 2902 may be used to select the desired table or view from which a display name is to be deleted. The intended attributes 2904 listed in the Column name field 2916 can be selected, and the Delete command 2914 invoked to delete the display name. The process is completed by selecting the Close command 2912 (e.g., button).

(iv) Editing Connection Strings

In order to further illustrate one exemplary process of editing connection strings using the schema manager 1058, reference will now be made to the particular embodiment of the user interface 3100 of FIG. 31 with occasional reference to FIG. 19A, by way of example. The feature of editing connection strings is useful for changing the path to the OLE DB (ODBC) database.

Figure 31:
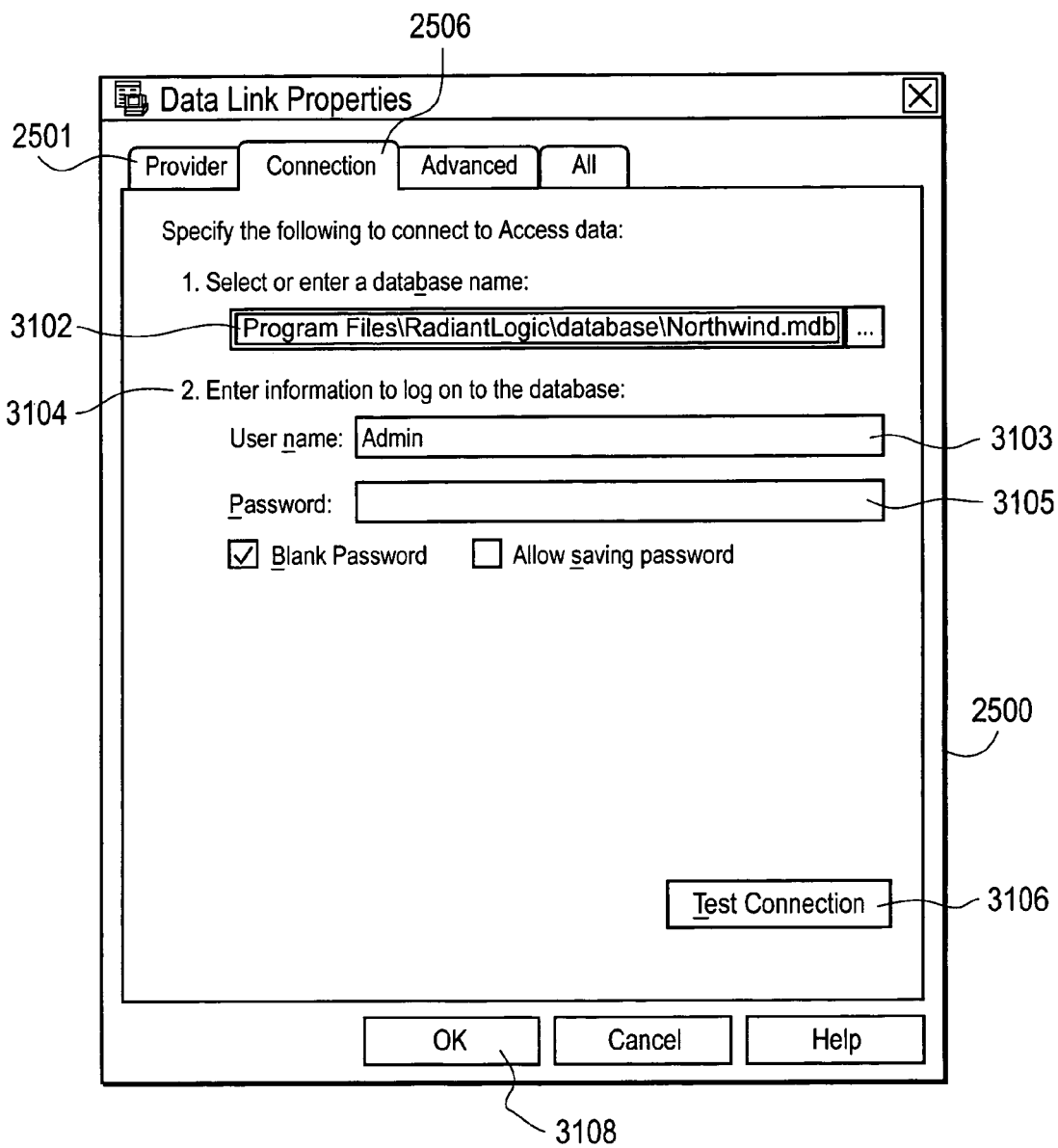
FIG. 31 illustrates an exemplary graphical representation of a user interface for editing connection strings in accordance with the present invention.

One exemplary process of editing connection strings begins with selecting the Edit the Connection String 1936 command (e.g., button) 1936 from the toolbar 1930 shown in FIG. 19C in order to invoke the user interface 2500 as shown in FIG. 31. In the example of FIG. 31, user interface 2500 is the Data Links Properties dialog box of FIG. 25, but with the Connection tab 2506 selected. In the example of FIG. 31, a user modifies the database name by entering the database name in the textbox 3102. User identification features may be associated with the particular database. For example, a User Name 3103 and password 3105 may be input by a user in the section 3104 (i.e., "Enter information to log on to the database:"). A command for testing the connection of the user access information with the database indicated in textbox 3102 may be invoked with the Test Connection command (e.g., button) 3106. The process is completed by selecting the OK command (e.g., button) 3108.

(c) Creating Derived and Default Views (i) Creating Derived Views

To further illustrate the process of creating derived views using the schema manager 1058, reference will now be made to the particular embodiment of the user interface 3000 of FIG. 30 with occasional reference to FIG. 19A, by way of example. Derived views are created from a base table and comprise one attribute that contains normalized data, such as a single column table for countries, postal codes, city names, by way of example.

Figure 30:
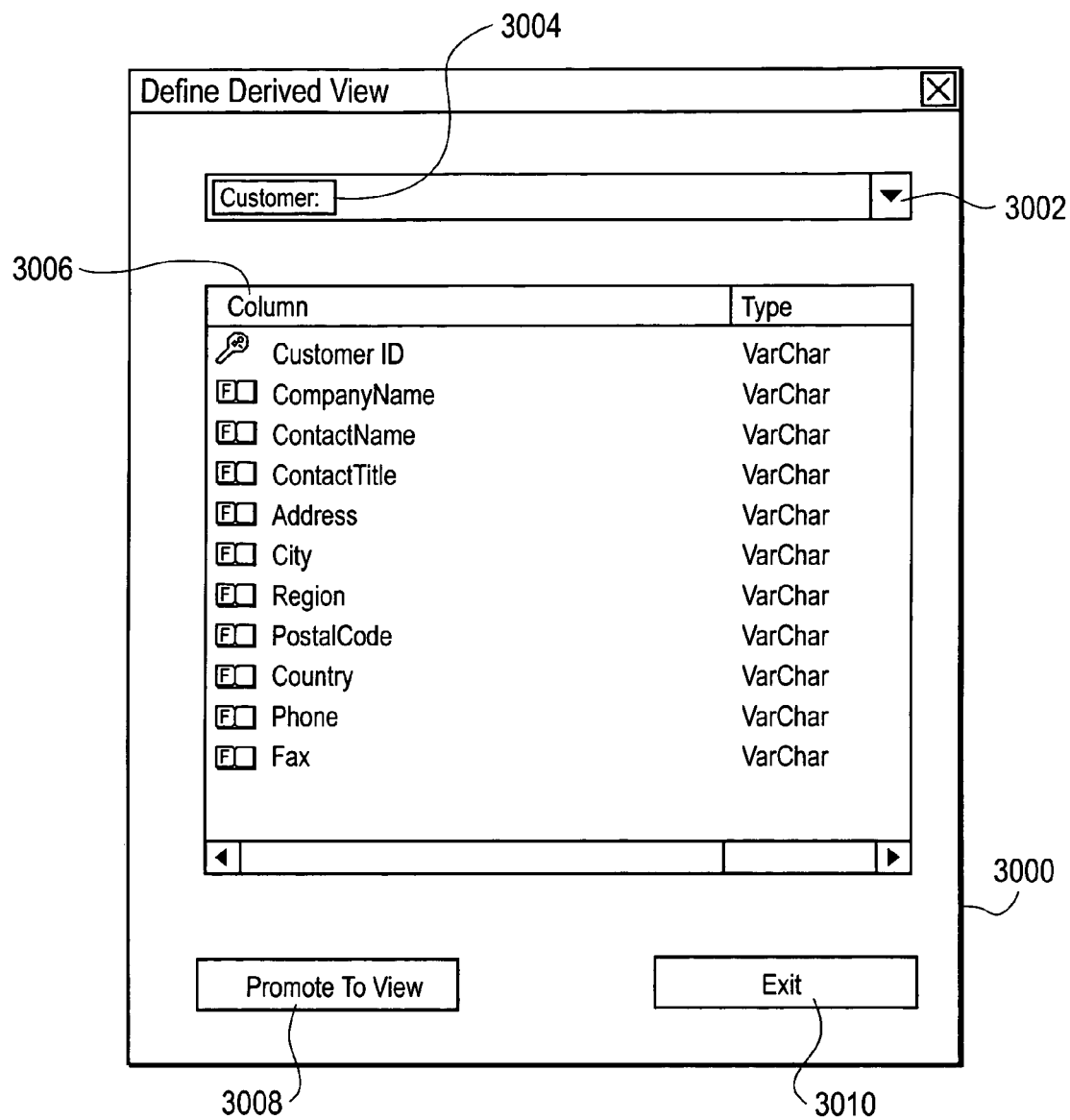
FIG. 30 illustrates an exemplary graphical representation of a user interface for creating derived views in accordance with the present invention.

One exemplary process of creating derived views begins with selecting the Define Derived Views command (e.g., button) 1934 from the toolbar 1930 shown in FIG. 19C in order to invoke the user interface 3000 as shown in FIG. 30. In the example of FIG. 30, user interface 3000 is a Defined Derived View dialog box, which includes a drop down menu 3002 that may be used to select the desired table, like the Customers table 3004 shown. By selecting an entry in the Column field 3006 and the Promote To View command (e.g., button) 3008, the new derived view appears in the list of views in the interface 1900. The process is completed by selecting the Exit command (e.g., button) 3010.

(ii) Creating Default Views

Figure 41:
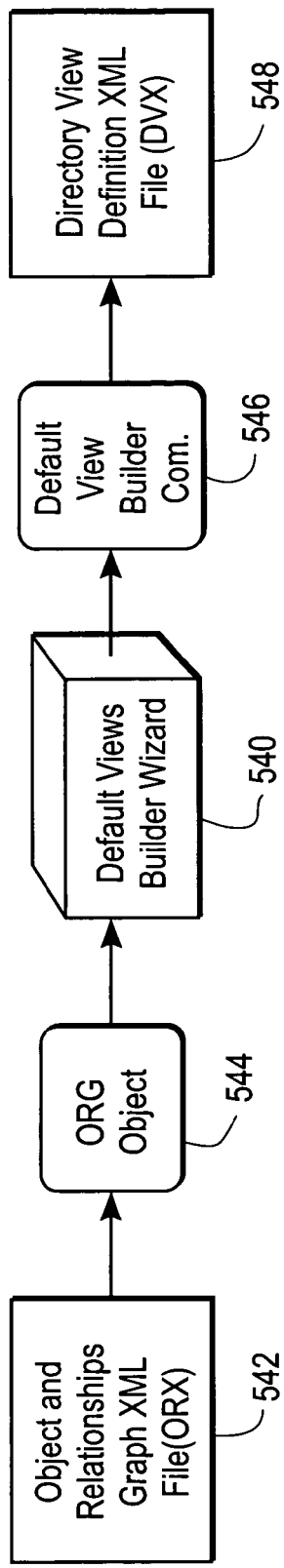
FIG. 41 is a data-flow block diagram of the default view builder wizard in accordance with the present invention.

Referring to the block diagram of FIG. 41, an aspect of the first module 1058 is shown to illustrate the general function of creating default directory views from a selected schema file. In the embodiment of FIG. 41, a schema file 542 is selected and loaded into a default views builder 540. In particular, the default view builder 540 receives the objects and relationships from a schema file 542 and which have been stored as an ORG object using the ORG engine COM, as represented by 544. After a selection of those tables and/or views that are desired to be published in a virtual directory view is made, builder 540 may call upon a set of COM objects 546 to facilitate the generation of a definition file (i.e., the directory view file having the .dvx file extension). The resulting directory views file is saved as indicated by module 548; this event is also shown as 1812 in FIG. 18. More details about a particular implementation of the functions of FIG. 41 will be described with respect to FIG. 22 below, where the functions of FIG. 41 can be invoked from the Tools drop-down menu 1918 of FIG. 19.

In order to further illustrate an exemplary process for creating a default view using the schema manager 1058, reference will now be made to the particular embodiment of the user interface 2200 (DVX Generator dialog box) of FIG. 22 with occasional reference to FIG. 19A, by way of example. In the example of FIG. 22, a user selects a directory view type 2201.

An exemplary process of creating default views begins with selecting the Tools drop-down menu 1918 and a command to Create Default View (not explicitly shown) nested therein. In response, the DVX Generator 2200 is invoked. To obtain the DVX generator dialog box 2200, several steps may need to be taken, including selecting the particular schema file (i.e., with the .orx extension) to be opened. But, once dialog box 2200 appears as shown in FIG. 22, a DirectoryView Type 2201 can be selected to be either flat 2202 or indexed 2204. Furthermore, a user can select one or more tables by clicking on the entries in the NAME field 2206 that is to appear in the directory view file (i.e., with the .dvx extension). If a determination is made that all tables should appear in the directory view (.dvx) file, then a Select All command (e.g., button) 2208 can be selected. In response, the DVX Generator dialog box 2200 displays a message that the file has been generated and displays the directory where the directory view (.dvx) file is stored. The process is completed by selecting the Exit command (e.g., button) 2210.

C. DirectoryView Designer Application

Using the metadata from the schema manager application 1058, the second module 1060 (also referred to interchangeably herein as the DirectoryView Designer application 1060) builds the virtual directory definitions, which are useful for enterprises. The second module 1060 uses an oriented path derived from a database schema and represented by a hierarchical view of definition objects in a tree structure. The view definitions are stored in a directory view database, which is accessed and managed by the VDS. In accordance with the present invention, under the control of the second module 1060, a flat namespace can be deployed based on the existing tables, entities, objects and views. Additionally, more complex hierarchy definitions ("hierarchical namespaces") can also be built based on the relationships that can exist between the different entities in a given database. These hierarchies can also be tied together through "ad hoc" links, as will be described later.

In addition to describing how to plan and map meaningful views with LDAP rules, the feature of defining access rights for different "virtual" entities will also be discussed with respect to the second module 1060. Also, a Membership Management tool and security parameters (e.g., access rights) for configuring the second module 1060 are provided to enable easy management of users, groups, and access rights for the virtual directories. Not only does the security parameters enable the addition and modification of user and group information, but also the importing of information from an existing LDAP server.

1. The DirectoryView Designer Process and Interface

Under the control of the second module 1060, virtual LDAP directories may be created. Referring to a particular embodiment shown FIG. 34A, a DirectoryView Designer interface 3400 presents a directory view of objects and relationships for the directory views file entitled Northwind 2000.dvx. Interface 3400 is similar to interface 2301 in that a DIT 3402 displays the database object types in hierarchical order in the left-portion of the interface 3400. Each hierarchy shown represents an LDAP path. As the option tabs 3404 are selected, the Properties tab 3406 appears on the right-side of interface 3400, along with other option tabs that are available for that object. For example, an Output tab 3408 and a Presentation tab 3410 are depicted.

Command selection available within the DirectoryView Designer interface 3400 can be accessed in a variety of ways. For example, pull-down menus are available from the menu bar 3412 at the top of the interface 3400. Alternatively, interface 3400 can also provide command selection through the use of a short-cut menu 3420 as shown in FIG. 34B, and through a toolbar 3440 as shown in FIG. 34C. Implementation of short-cut menus and toolbars are known in the art. It will be appreciated that each and any combination of these techniques for providing command selection may work suitably well with the present invention.

Referring back to FIG. 34A, the object option tabs 3404 will now be discussed. The Properties tab 3406 may be invoked by any of the following commands (e.g., button) on the toolbar 3440, namely Label 3442, Content 3444, and Container 3446. Although the available fields in the Properties tab 3406 vary depending upon the type of object selected, the general purpose of the Properties tab 3406 is to identify the directory tree 3402 with the property directory view file 3414.

The Output tab 3408 becomes available when the Content 3444 or Container 3446 commands are selected for those corresponding objects. The Output tab 3408 enables the selection and modification of the visual output of the DIT 3402. Additionally and as will be discussed in FIGS. 37–38, the Output Tab 3408 contains the Add Where Clause and Join features. The Output Tab 3408 includes options for display in the user's web browser. More details will be discussed regarding the procedures for defining output, searching and creating filters, combining tables, and creating an alias for the primary key.

The Presentation tab 3410 is preferably available for the Content 3444 command and corresponding object. The general purpose of the Presentation tab 3410 is to show how the information will be displayed on the user's web browser. For example, FIG. 35 shows how display records may be presented in either "1×n" default format or "n×1" default format, where n=3 in this particular example.

Figure 36:
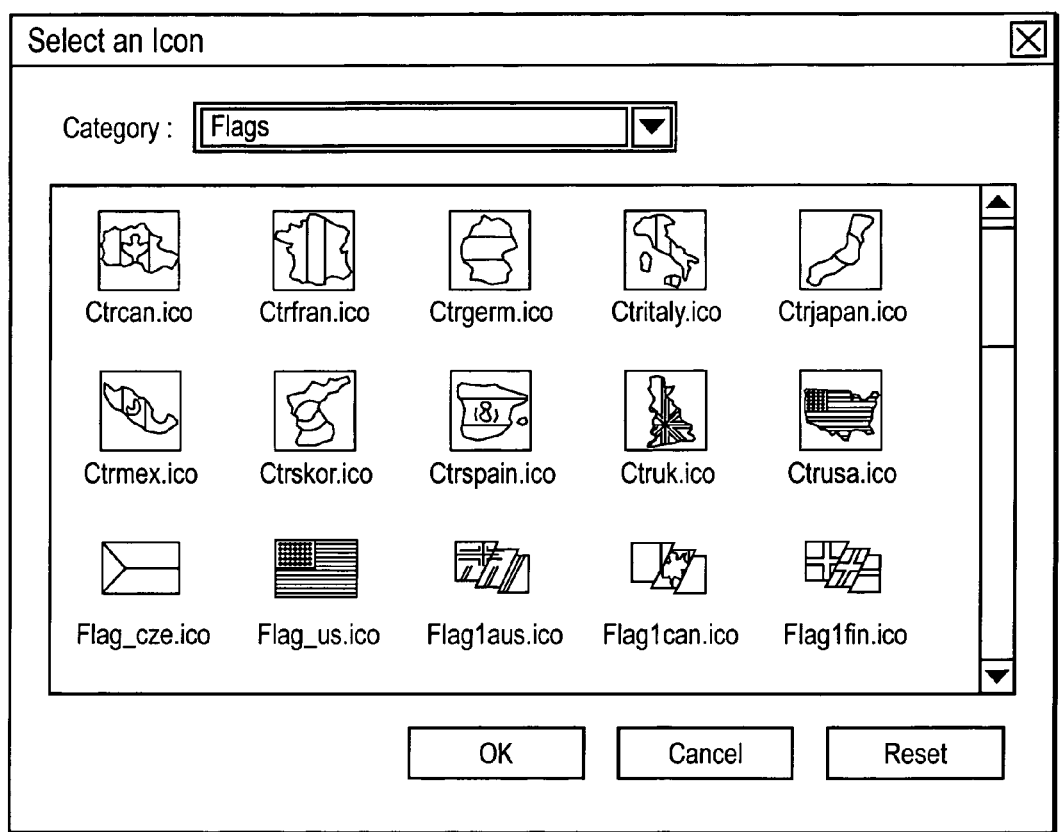
FIG. 36 illustrates an exemplary graphical representation of a user interface for changing a selected icon.

FIG. 36 illustrates an interface 3600 used for customizing the DirectoryView Designer interface 3400. In particular, default folders for the Label 3442, Content 3444, and Container 3446 can be customized with any of the icons shown in FIG. 36. Additionally, the color of the option tabs 3404 may also be change as will be familiar to those skilled in the art.

2. The DirectoryView Designer Basic Concepts

The process of building a tree will now be discussed, focusing upon the different types of nodes used to build the DIT. Exemplary nodes include the following: container, label, content, link, and global catalog. Each of these nodes will be further described below.

A Container object is a node that can have descendants. A Container can include other Containers or Content objects. A Content object is a node that has no descendants. As such, a Content object is referred to as a "leaf" or "terminal" node in the DIT. The concept of a Container can be compared with a "directory inside a file system," wherein a directory can contain other directories or files. The comparison should stop there because a Container functions as a "proxy" for an object represented in a virtual directory tree. To this end, Containers and Contents are proxy objects. They represent views of the objects. When a Container is created, an object class that has been declared by the first module 1058 is mapped to a Directory Node. The Container automatically inherits the primary key attribute of the underlying objects. Additional attributes that belong to the underlying object may also be mapped to the Container node. In general, Containers bring and hold one or more collections of information at run-time.

A Label node is a Container node whose only attribute is a text label. A Label node names categories of information in the directory and views (.dvx) file in a hierarchical view. For example, by default, the name of the attribute is Category, however, this attribute may be over-written with another attribute. When it is desirable to display separate different types of information, Labels are a useful mechanism. Accordingly, a Label functions as an "ad hoc" way to aggregate objects from the same database schema. Combined with links, Label objects associated with different schemas may be aggregated for the entire subtrees made of virtual directory views from the directory views file. When a Label is used as an intermediate link between two objects, the Label acts as a "pass-through" for the underlying relationship. The Label does not affect the value of the keys that are propagated from the parent to the descendant. The objects are still linked by the same relationships.

For example, if the configuration of the directory tree at run-time is

Customer=X
      Product=Y, meaning that Customer X has purchased Product Y, and a Label such as Category=Repeated Buyer is introduced, then Product Y under Customer X still results at run-time, as follows:

Customer=X
      Category (label)=Repeated Buyer
      Product=Y, where Key X is passed to Product Y and the Label acts as a bridge. Additionally, when it is desired to categorize a collection of data from within a table or resulting from a combination of tables, Labels can be used to categorize these sub-levels of information. This indicates that each sub-level of information will reside under a particular category. In general, an unlimited number of labels can be created, depending upon how many categories of information are defined.

A Content object is a node that does not have a descendant, rather, the Content object is a "leaf" or "terminal" node in the directory tree. A Content is a "proxy" for an object represented into a virtual directory tree. When a Content object is created, an Object class that has been declared in the first module 1058 is mapped to the Directory Node. The Content will automatically inherit the primary key attribute of the underlying object. Other attributes that belong to the underlying object may be mapped into the Content node. A Content is the only object that has availability to the Presentation tab 3410. The Presentation tab 3410 includes the template for the information that will be published by the directory view. This information is used by the first module 1058 for managing the display of Content objects at run-time.

Links are a special type of node that points to a specific subtree defined by a directory view (definition .dvx) file. Using the link mechanism 3426 in FIG. 34B in conjunction with a Label allows the aggregation of information from different schemas (e.g., simple objects or whole subtrees). Links enable the navigation from schema to schema in an "ad hoc" manner. As such, a link may be implemented as an "ad hoc" join between two objects belonging to two different schemas. It is noted that a link does not propagate values from parents to their descendants.

A Global Catalog is the root, which aggregates all directory views created. After designing and saving a view in the DirectoryView Designer interface 3400, a command to add a Global Catalog may be selected. By doing so, the directory view file that was created as a branch in the DIT will be added. Preferably, if a default view is created for the directory using the DVX Generator 2200 controlled by the first module 1058, then the directory views should automatically be saved in the Global Catalog.

3. Defining the View Structure

Figure 32A:
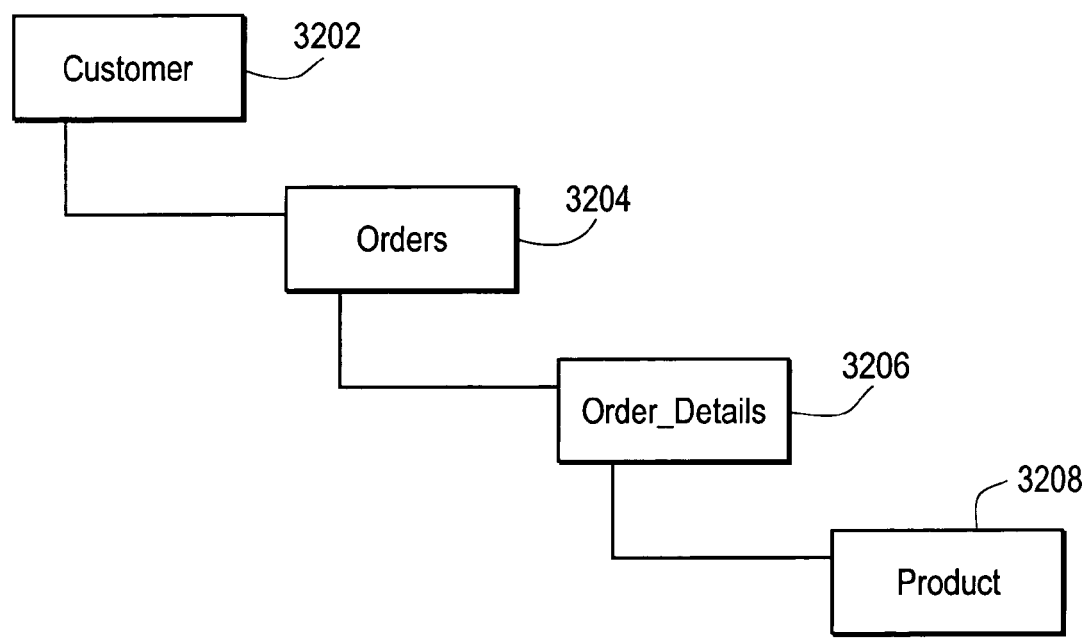
FIG. 32A is a block diagram indicating an example of the relationships between four entities.

There are two basic types of hierarchies that may be constructed, namely, a relationship-driven hierarchy, and an "ad hoc" hierarchy. Relationship-driven hierarchies use the underlying schema to build the hierarchy. The relationship between the existing objects drives the structure. Relationship-driven hierarchies can comprise Container objects, and optionally Content objects. FIG. 32A illustrates an example of a relationship-driven hierarcky composed of he Containers in the AdvWorks database. Further details of the relationship-driven hierarchy are shown in the directory view definition of FIG. 9.

By contrast, "ad hoc" directories do not use relationships between objects to build the hierarchy. Rather, they use Labels and Content objects to build the hierarchy. To some degree, the Label is serving as the relationship. Examples of "ad hoc" hierarchies are the flat and indexed default views as described with the DVX Generator 2200 of FIG. 22.

The Indexed views include Containers that create at least one additional level in the view definition hierarchy. Containers are useful for defining the information intended to be displayed into a single record. Containers may also be used to display categories of information, if defined. A Category works like an empty folder that is filled with the Content information about a specific order. Alternatively, the Content information may include multiple records of a category of orders.

Figure 37:
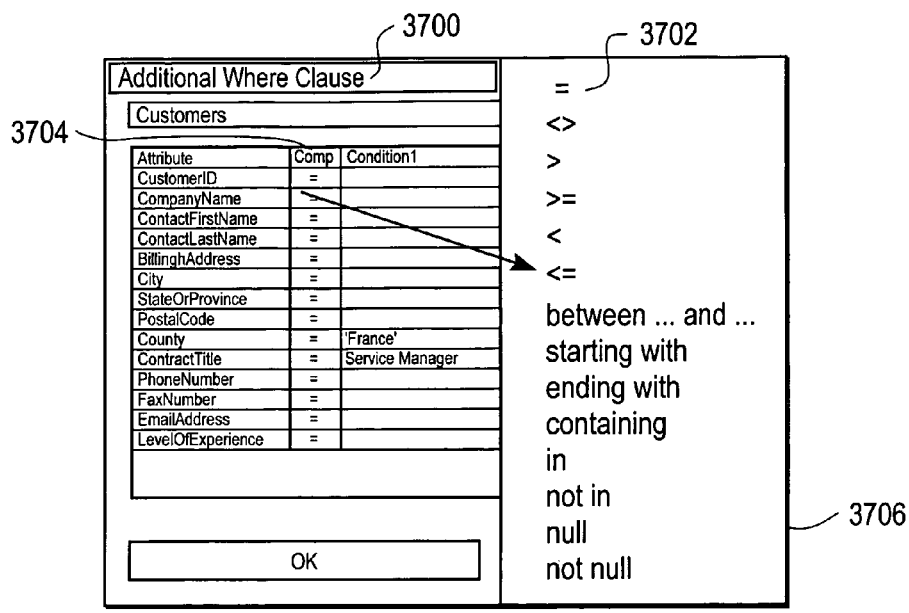
FIG. 37 illustrates an exemplary graphical representation of a user interface for indicating a default comparison operator in accordance with the present invention.

The Add Where Clause allows a search for and display of rows that contain specific information. Filtering criteria for the Add Where Clause can be set at both the Container and the Content levels. As shown in FIG. 37, user interface 3700 includes a default comparison operator 3702 being "=". By selecting the Comp 3704 column that needs to be modified, the operator menu window 3706 will open to allow changes to be made.

Figure 38:
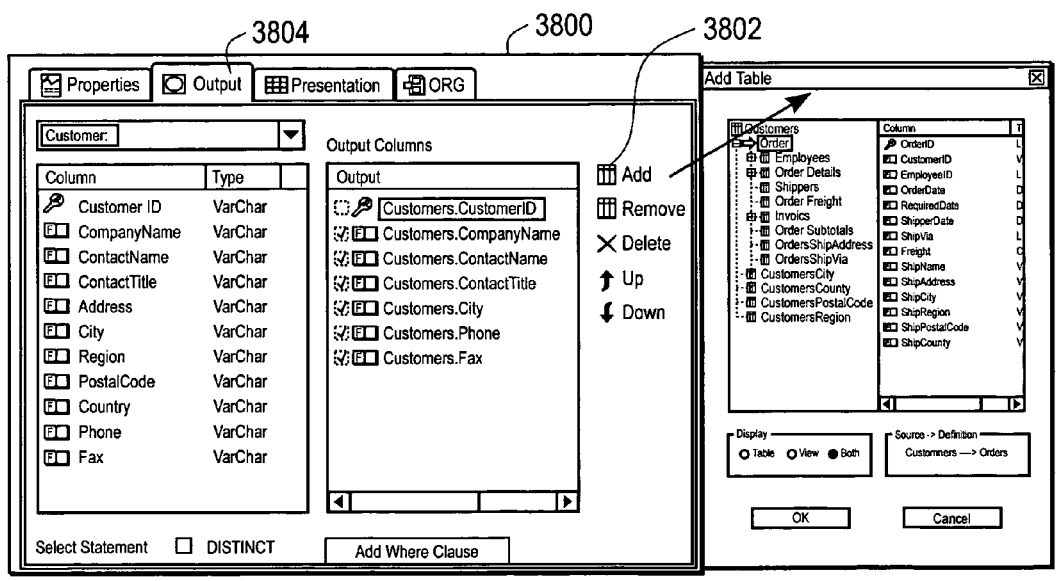
FIG. 38 illustrates an exemplary graphical representation of a user interface for selecting the join feature in accordance with the present invention.

Referring to FIG. 38, the join feature is illustrated in the user interface 3800. In particular, by using the Add command (e.g., button) 3802 on the Output tab 3804 of the DirectoryView Designer interface (as previously introduced as interface 2922 in FIG. 29C), tables may be joined to create multi-table queries.

Figure 42:
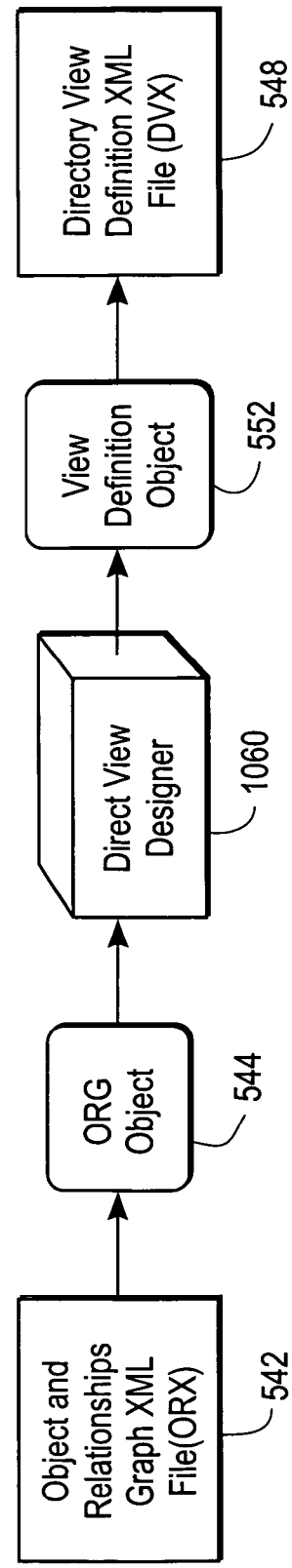
FIG. 42 is a data-flow block diagram of the Directory-View Designer for enabling hierarchical views to be built and managed in accordance with the present invention.

Reference is made to the block diagram of FIG. 42, illustrating one example for implementing the second module 1060 for providing a graphical user interface that enables an end-user to build and manage hierarchical views defined out of an ORG. In the example shown in FIG. 42, for convenience and ease of understanding, like-reference numerals have been used for similar components as in FIG. 41. As shown in FIG. 42, the second module 1060 receives the objects and relationships from a schema file 542 and that have been stored as an ORG object using the ORG engine COM, as represented by 544. One function performed by the second module 1060 is the construction of new virtual directory views. In doing so, the second module 1060 performs various sub-processes the functions of which include, but are not limited to: (1) defining and managing hierarchical paths and views derived from the ORG object; (2) assigning access security control to certain directory views; and (3) defining an HTML presentation template for run-time display of information on the client computer 402. To facilitate the construction of the new directory view under the control of such sub-processes, a View Definition object 552 helps facilitate the generation of the definition file having the results of these sub-processes. The view definition object is memory-representation of the directory view definition. The resulting directory view file 548 is saved; this event is also shown as 1812 in FIG. 18.

Figure 43:
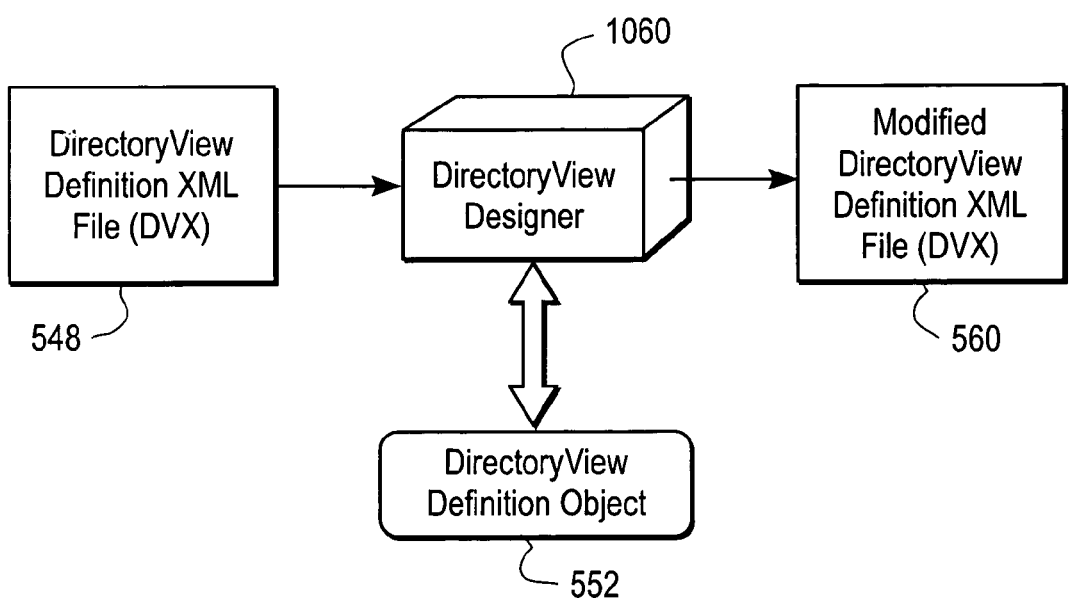
FIG. 43 is a data-flow block diagram of the Directory-View Designer for managing an existing directory view that has been modified in accordance with the present invention.

By comparison, reference is made to the block diagram of FIG. 43, which illustrates the function for managing an existing directory view in order to modify it. As shown in FIG. 43, the relationships and objects within the directory view file 548 are received by the second module 1060. Module 1060 will call upon View Definition objects 552 as needed for predefined profiles and definitions, so as to facilitate a new virtual directory view. The resulting modified directory view is saved in the directory view file as indicated in 560.

4. Using the DirectoryView Designer

The process steps for creating Labels, Content, and Container objects will now be described, as well as the process for joining tables and performing queries using the Add Where Clauses.

Figure 34A:
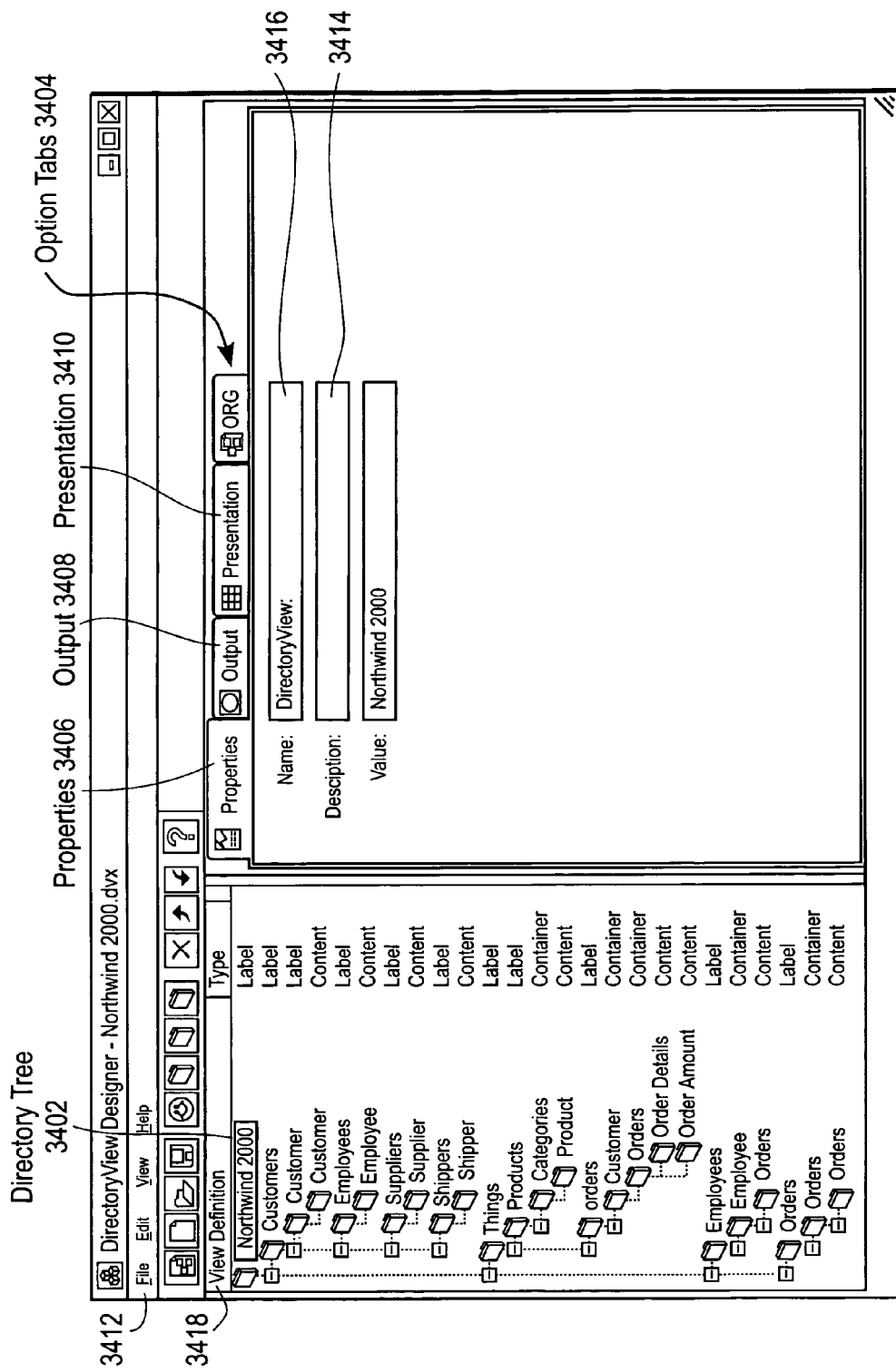
FIG. 34A illustrates an exemplary graphical presentation of a user interface for determining the options to be selected for objects in accordance with the present invention.
Figure 34B:
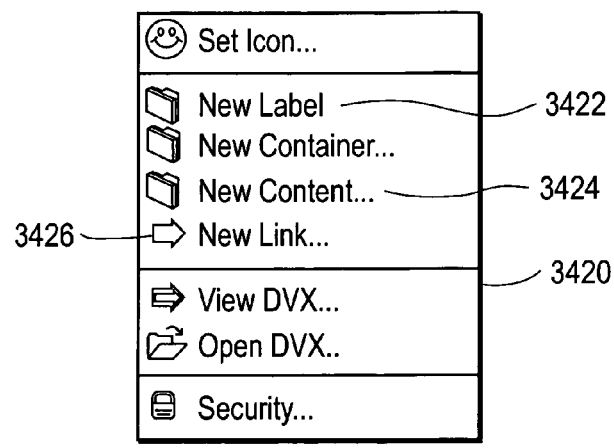
FIG. 34B illustrates an exemplary shortcut menu.
Figure 34C:
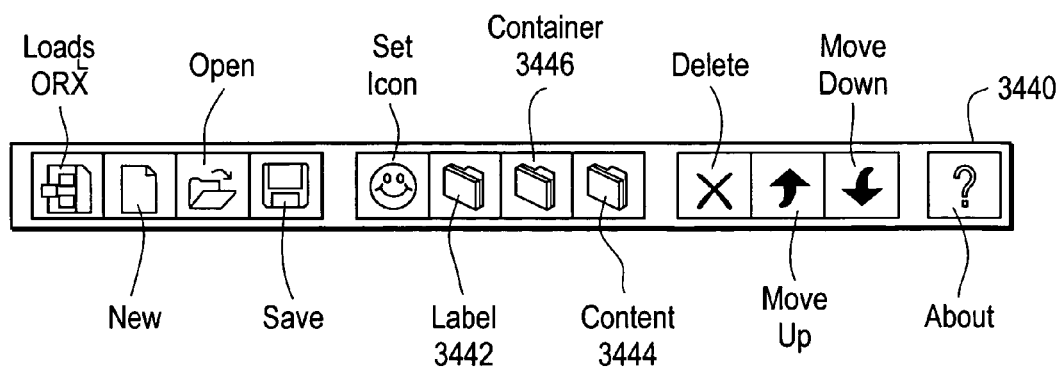
FIG. 34C illustrates an exemplary toolbar which can be used for command selection within the user interface of FIG. 34A.

When working with Labels, the Output 3408 and Presentation 3406 tabs shown in FIG. 34A are unavailable because Labels comprise only a name. Labels are created from an existing Label or Container. For example, to create a Label, the Label 3442 or Container 3446 object is selected, as shown in FIG. 34C. Thereafter, by invoking the shortcut menu 3420 as shown in FIG. 34B, the New Label command 3422 may be selected. This places a new, untitled Label under the selected Label or Container. One way to name or rename the Label is to type in the new name in the Name field 3416 of the Properties tab 3406 as shown in FIG. 34A. An alternative way to name or rename the Label is to retype over the highlighted untitled label in the DirectoryView Designer interface.

Figure 44:
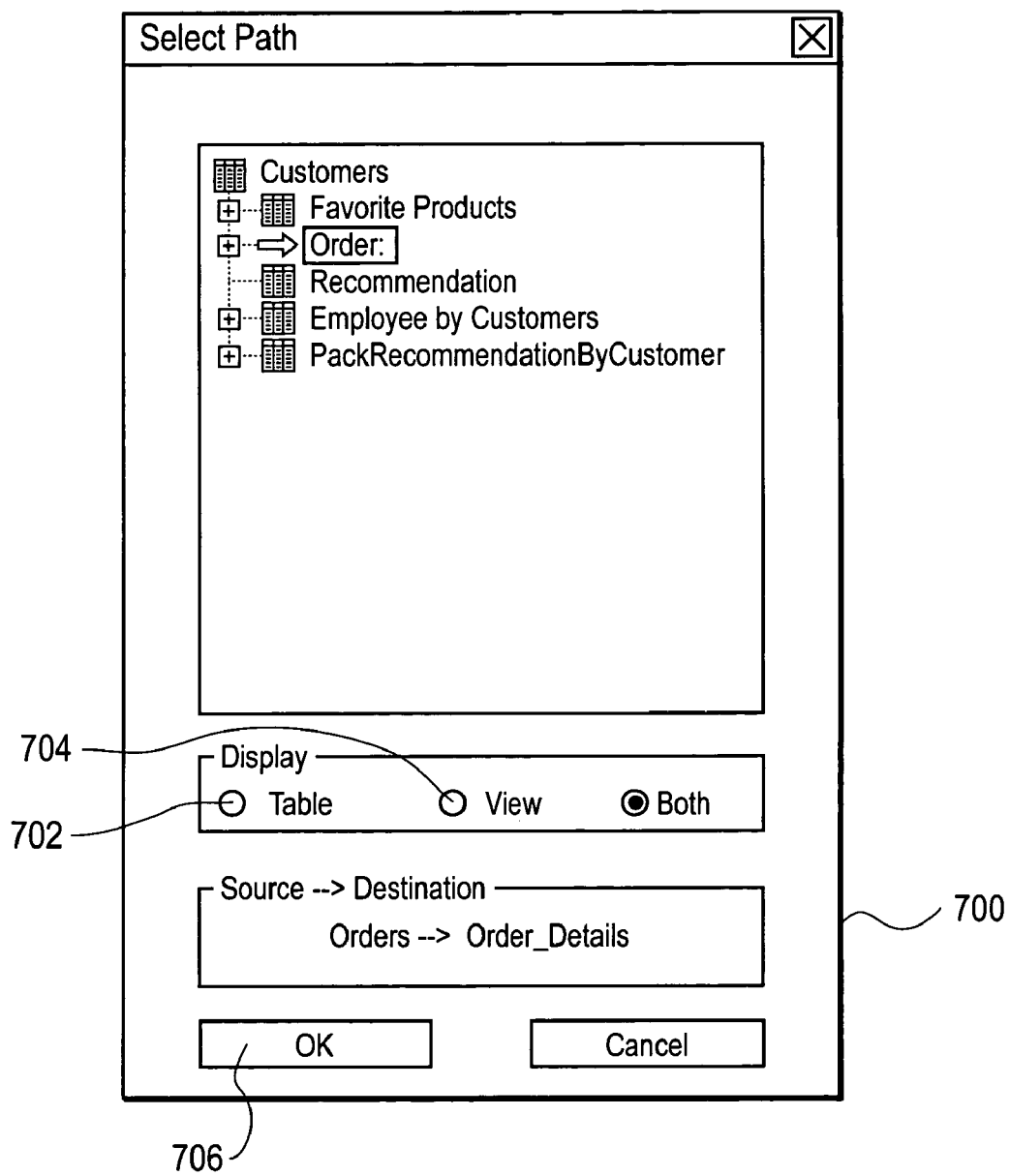
FIG. 44 illustrates an exemplary graphical representation of a user interface for selecting paths in accordance with the present invention.

When working with Content objects, it is desirable to create flat views having Labels and Contents, so that information may be published on a web browser. Referring back to FIG. 34C, to create a Content object, the Label 3442 or Container 3446 object is selected. Upon invoking the shortcut menu 3420 of FIG. 34B, the New Content command 3424 should be selected. In the Select Path dialog box 700 of FIG. 44, either display option Table 702 or View 704 can be selected. After selecting the OK command 706, the new Content object is placed under the selected Label or Container object. The name of the Content object appears in the Name field 3416 on the Properties tab 3406 in FIG. 34A.

Figure 39:
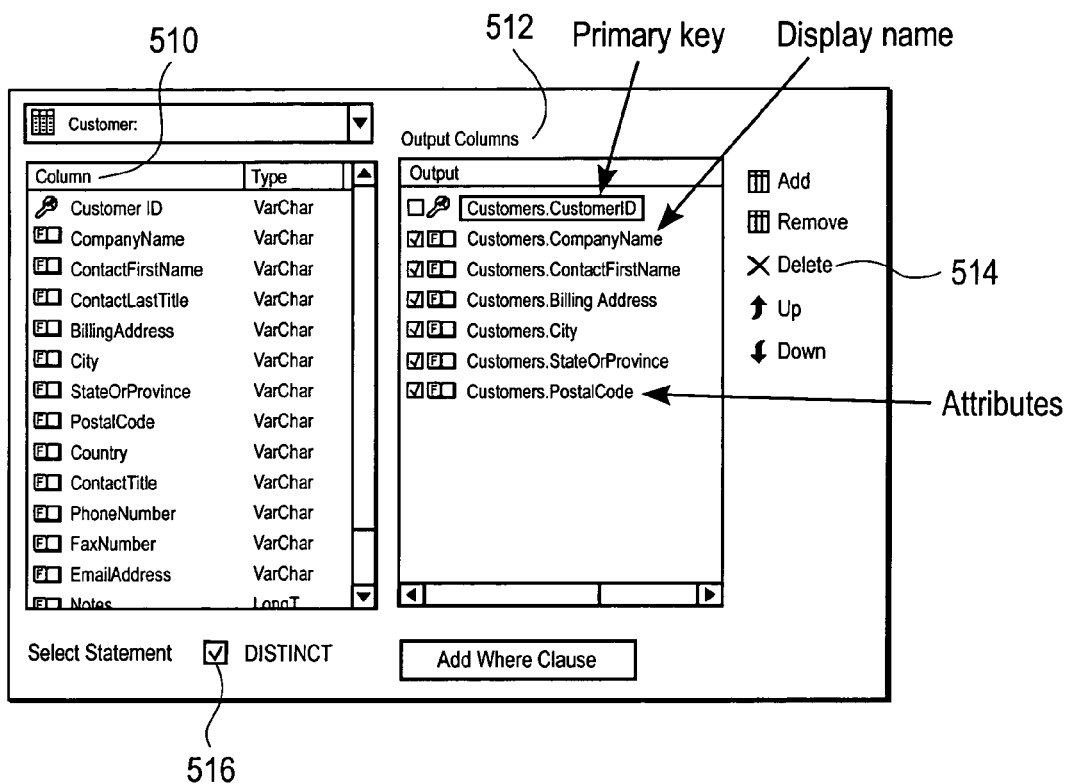
FIG. 39 illustrates an exemplary graphical representation of a user interface for selective adding, deleting or removing columns in accordance with the present invention.
Figure 45:
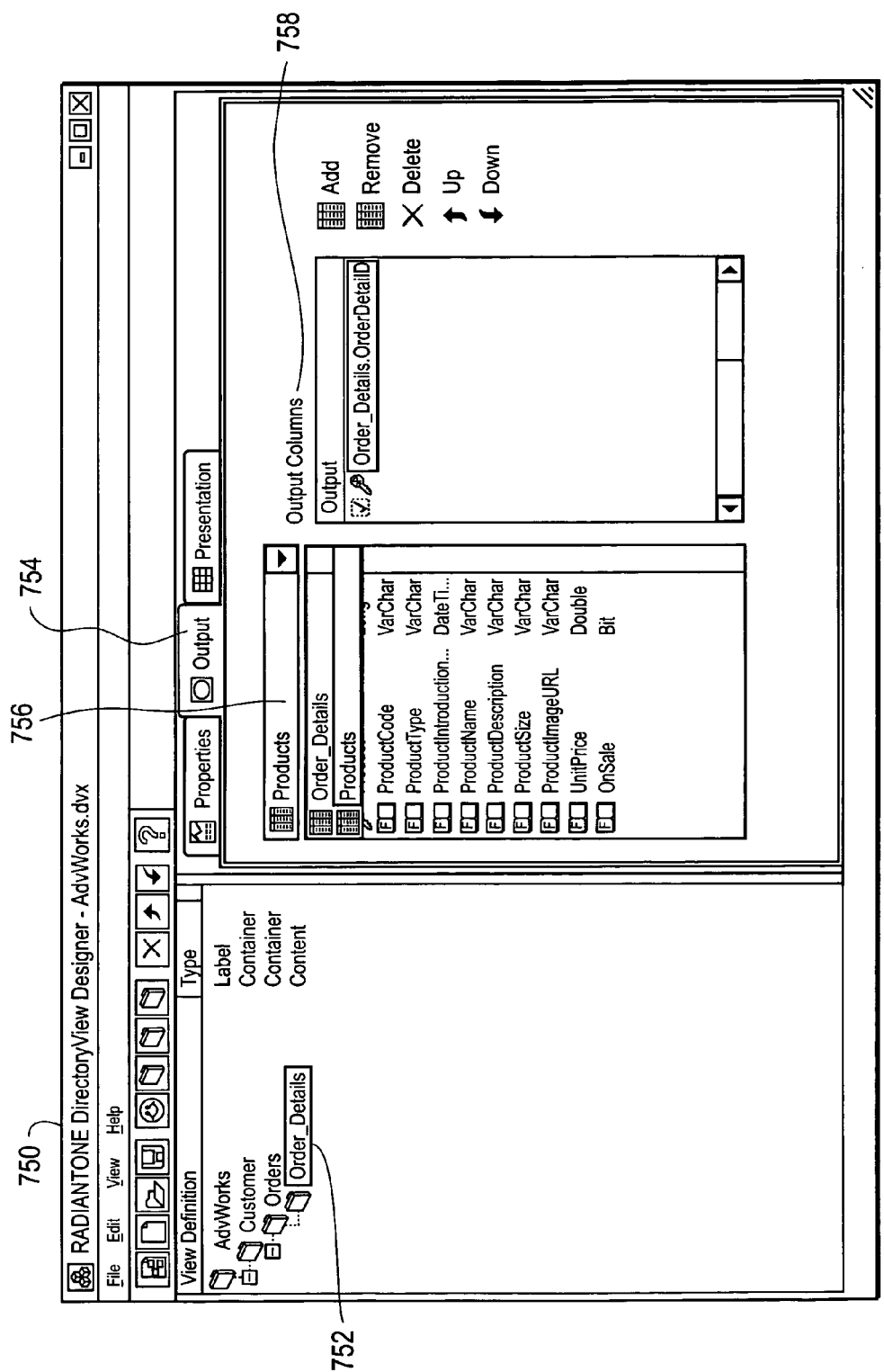
FIG. 45 illustrates an exemplary graphical representation of a user interface for selecting or modifying Content output in accordance with the present invention.

Referring to FIG. 45, to select or modify the Content output, using the DirectoryView Designer interface 750, the Content object 752 is selected. After selecting the Output tab 754, the name of the table appears in the drop-down list 756, and the fields in the table appear in the Column list on the left. The Column list 510 can be seen more clearly in FIG. 39. The column name that is intended to be added to the output may be selected. By doing so, the Output Columns window 512, 758 displays all of the columns that may be presented in a web browser. The fields that are displayed depend on whether the user wants to use the default template or customize their own. Still referring to FIG. 39, to remove an output column, a particular column name is selected, and the Delete command 514 is invoked. A check can be placed in the Select Statement box 516 to insert the Distinct indicator in the Select Statement so as to prevent duplicate rows. In one embodiment in accordance with the present invention, each time a user selects an output Column or selects the Add Where Clause command, a corresponding SQL query command is generated in preparation for execution during run-time.

D. Smart Browser Application

The third module 1056 is an application that includes process steps and routines to enable browsing of the virtual directory contents. Third module 1056 is referred to interchangeably herein as the SmartBrowser (application) 1056. The SmartBrowser 1056 can comprise a number of embodiments as will now be described in detail as follows. As will be discussed, the present invention provides the ability to return sets of results from a directory query in multiple formats. The application is flexible as it can specify whether to return the data as a formatted result set. Several exemplary formatted result sets, include but are not limited to: (1) an SQL result set; (2) LDAP entries; (3) ADO or JDBC results set, and (4) a result set in a mark-up language, like XML, HTML, and DHTML. The SmartBrowser 1056 is preferably a web client for the Internet Explorer and Netscape Communicator that does not require any special installation or download of information, since the SmartBrowser 1056 interoperates within a current conventionally-available web browser and because all of the needed components reside on the server 406.

Figure 5A:
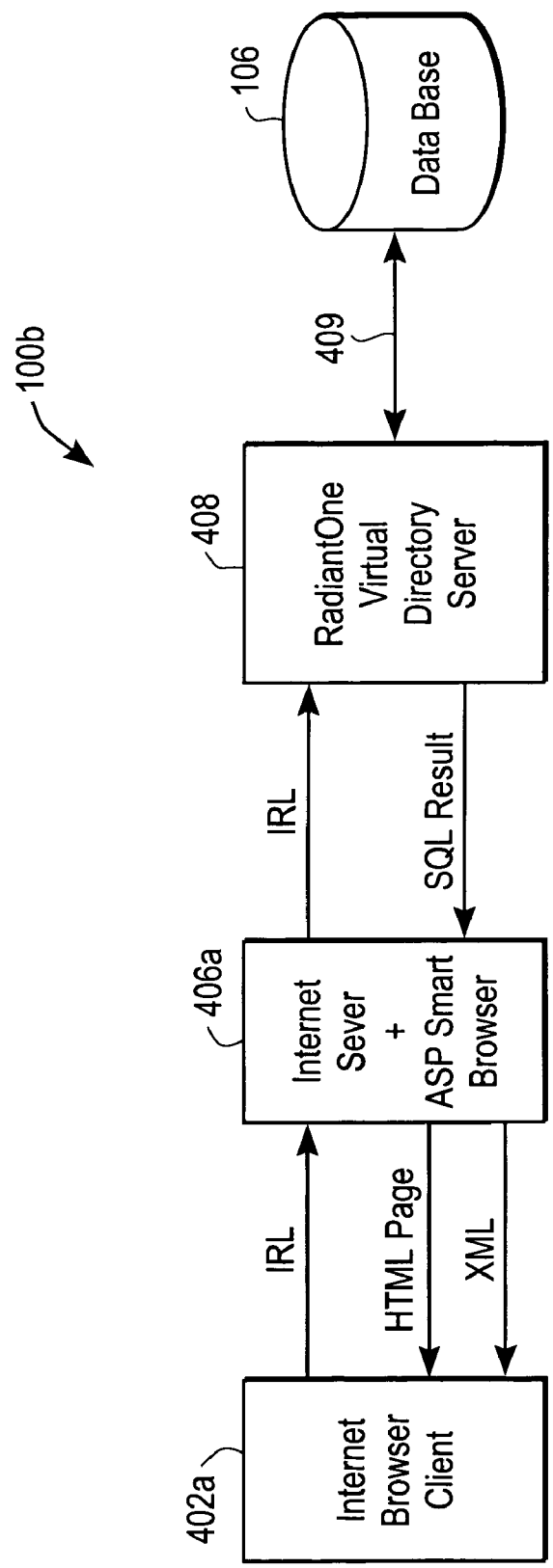
FIGS. 5A–5C are block diagrams of exemplary embodiments of the communication system of FIG. 4.

Reference is now made to FIG. 5A, where one embodiment of system 100*b* is shown. In the embodiment of FIG. 5A, system 100*b* includes server 406*a*, which in turn is further described in FIG. 6A as having a first module 602 and the SmartBrowser 604. Under the control of the first module 602, the server 406*a* communicates with client computer 402*a*. For example, the first module 602 may be an Internet Information Server (IIS), or equivalent web application server that operates in a run-time environment. Additionally, the SmartBrowser 604 may be embodied as Active Server Pages (ASPs), which are enabled by the first module 602 to interface therewith. Alternatively, SmartBrowser 604 may be embodied as Java Serve Pages (JSP) in accordance with other appropriate types of web servers. ASPs (and JSPs) generally provide a framework for constructing web applications using the HyperText Markup Language (HTML), XML, scripts, and ActiveX or Java components. The ASP (and JSP) page is created by embedding such scripts within the HTML page. As a user makes the request for an ASP/JSP page, an Information Resource Locator (IRL, for example an LDAP URL) is forwarded from the client 402*a* to the server 406*a*. Responsive to receiving the IRL, the server 406*a* executes the scripts that have been embedded within the page so that the output generated from running the scripts is included in the HTML or XML, thereby allowing a browser (e.g., 1722 of FIG. 17) on client application 402*a* to permit a user to view the page. In order to generate the virtual DIT, server 406*a*, forwards the IRL to the VDS 408, which translates the IRL into a query-based command, such as SQL. Under the control of the VDS, the query-based commands are forwarded to the back-end relational databases 106 for execution. The result of the query from database 106 is returned by the VDS 408 to server 406*a*, preferably in the format of an SQL result.

Figure 6A:
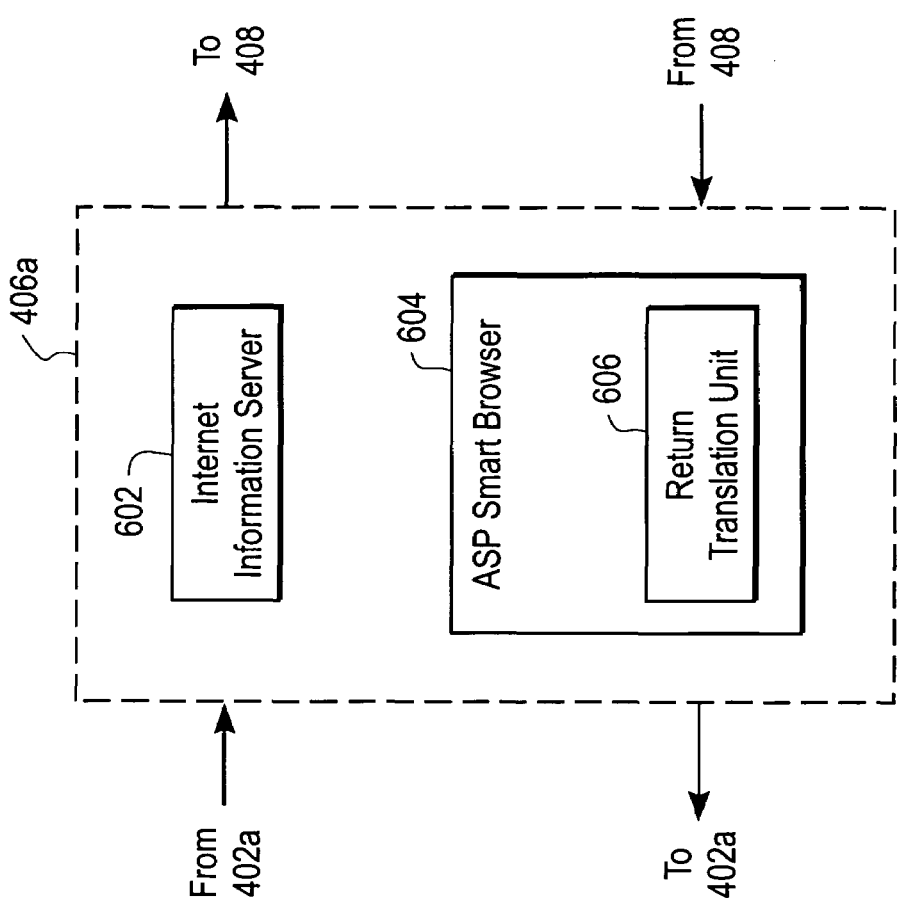
FIG. 6A is a block diagram of a first embodiment for the server of the communication system of FIG. 5A.
Figure 6B:
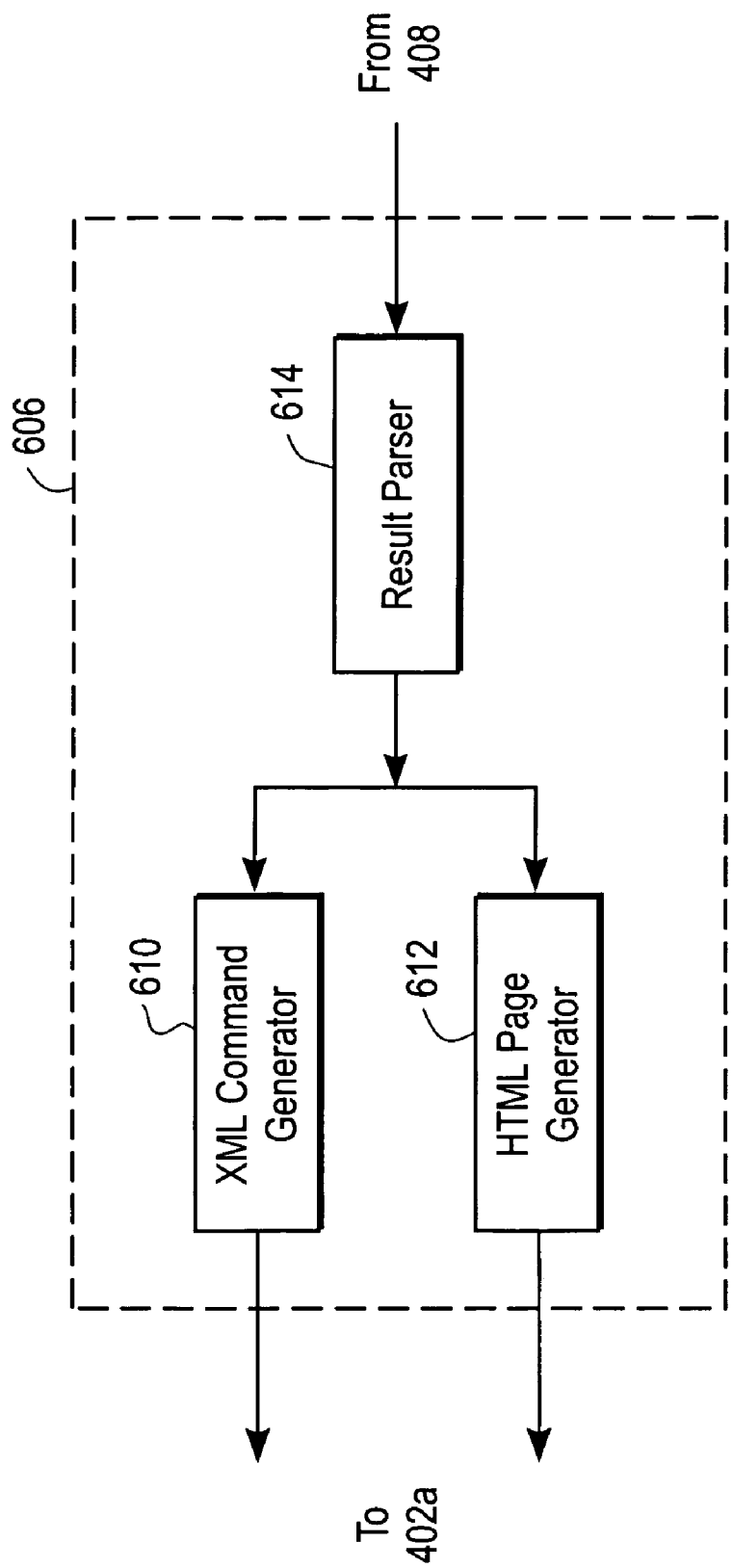
FIG. 6B is a block diagram of one embodiment for a return translation unit of FIG. 6A.

Referring to FIG. 6A, there is depicted an embodiment of a return translation unit 606 that converts a format associated with the database results into a format that is compatible with the browser on client 402*a*. Further details of one embodiment for return translation unit 606 is depicted in FIG. 6B. For example, a result parser 614 receives the SQL results and determines which format the database results should be translated into to be compatible with the browser used with client 402*a*. For example, an XML command generator 610 is included, as well as an HTML page generator 612.

It is noted that the present invention is well-suited to work with other formats for creating forms and processing input, including Dynamic HTML (DHTML) technology. It will become evident to those skilled in the art that the client 402*a* is adapted to run various types of commercially available browsers (e.g., Netscape, Internet Explorer) suited to enable HTML or DHTML functionality. Furthermore, here and throughout this application, the description of the present invention in the context of the Internet, browsers, ASP, etc., is by way of example. Those skilled in the art will realize that the present invention could be implemented on a variety of other hardware environments, such as peer-to-peer networks and mainframe systems, just by way of example.

Figure 5B:
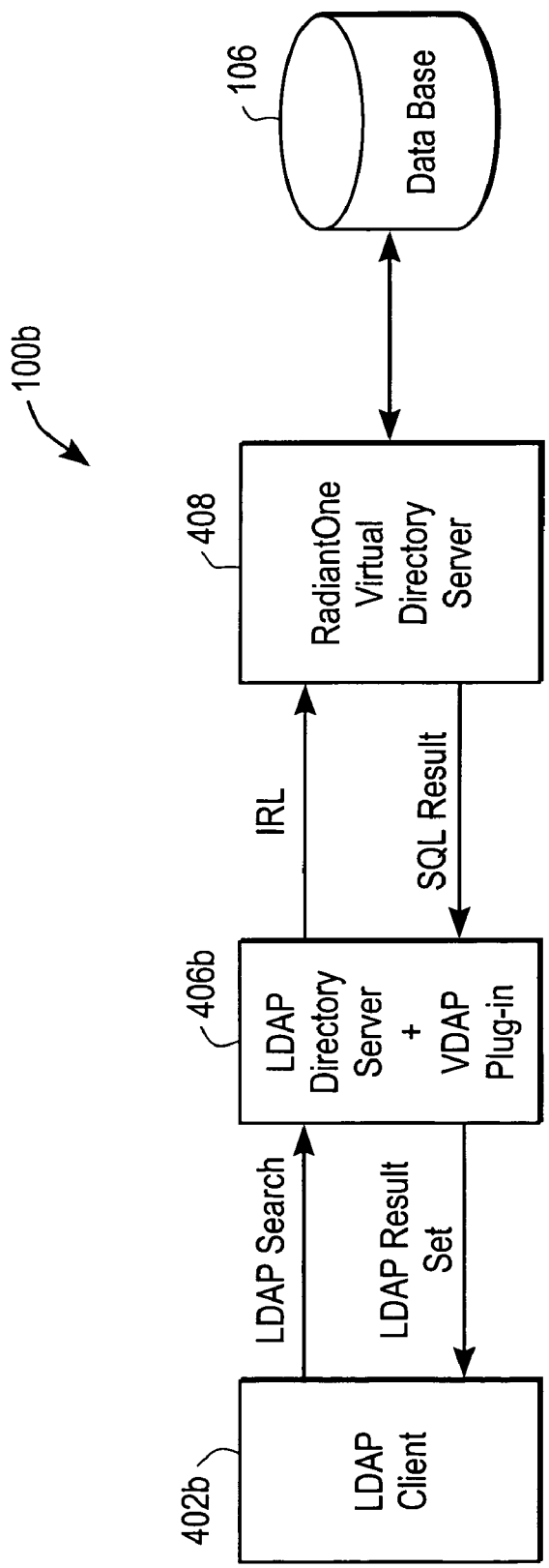

Referring to FIG. 5B, there is shown another embodiment of system 100*b*. In the embodiment of FIG. 5B, system 100*b* includes server 406*b*, which in turn is further described in FIG. 7A as having a first module 702 and a second module 704. Under the control of the first module 702, the server 406*b* communicates with client 402*b*.

Figure 7A:
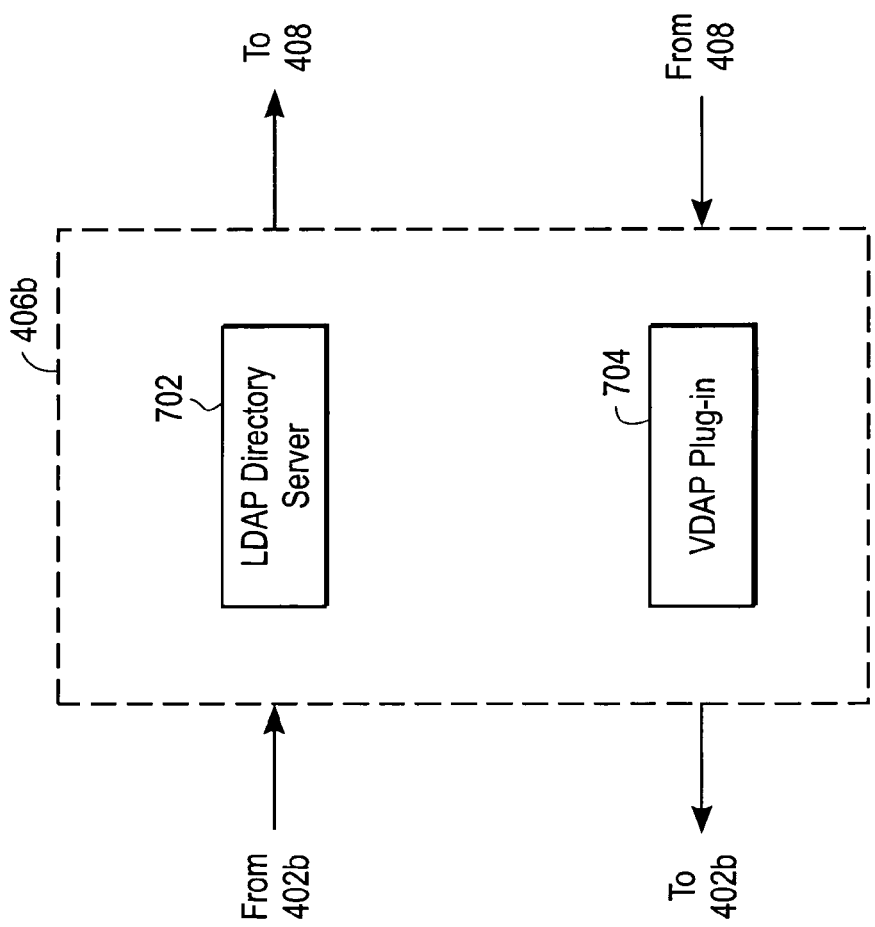
FIG. 7A is a block diagram of a second embodiment for the server of communication system of FIG. 5B.
Figure 7B:
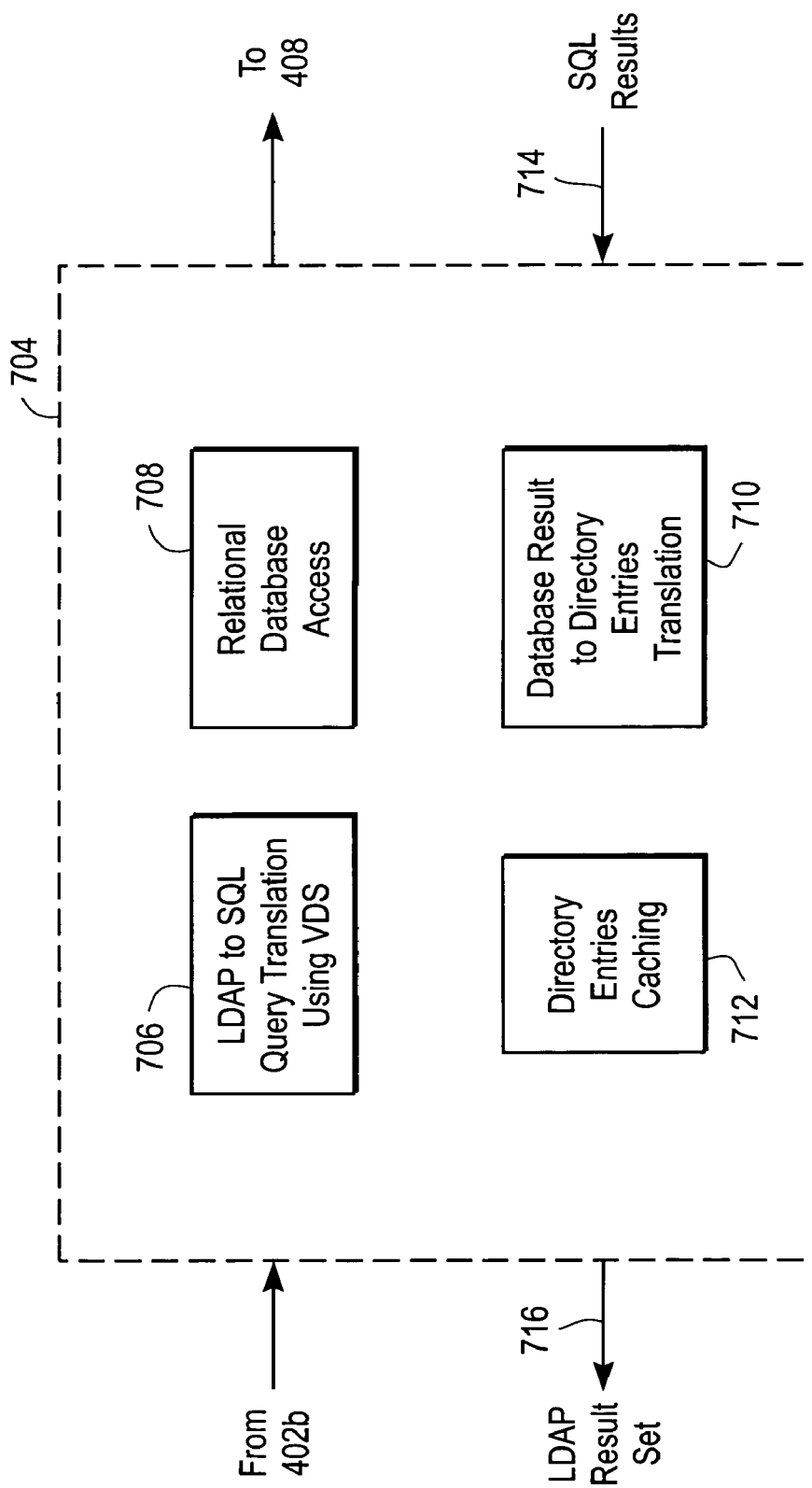
FIG. 7B is a block diagram of one embodiment for the VDAP plug-in of FIG. 7A.

For example, the first module 702 may be an LDAP-enabled directory server 702, as shown in FIG. 7A, and the second module 704 may be a Virtual Directory Application Protocol (VDAP) plug-in 704 as described in the present invention. FIG. 7B illustrates the functional block diagram of VDAP plug-in 704. Several exemplary VDAP plug-ins could be modified to comply with the Netscape/iplanet directory server, and also for the IBM Secureway server. The VDS 408 preferably does not hold any data within the virtual directory itself, so there is no requirement to synchronize or replicate data. In response to requests from the LDAP client 402*b*, live data from the authoritative source 106 is returned through the VDAP plug-in 704. The VDS 408 handles the schema transformation automatically and as described herein.

Referring to FIG. 7B, VDAP plug-in 704 includes a first module 706 for translating LDAP command to an SQL query using the VDS, a second module 708 for invoking relational database access operations, a third module 710 for mapping the results received from the database 106 to hierarchical directory entries, and a fourth module 712 for caching directory entries received. The functionality provided by these modules may be programmed in software and implemented in a variety of ways, so long as the SQL results 714 received are mapped into an LDAP Result set 716. For example, the functions could be implemented using a set of APIs in one embodiment.

With the alternate embodiment, the VDS 408 can seamlessly integrate with existing LDAP directories that have deployed the Stand-Alone LDAP (SLAPD) pre- or post-processing plug-in extension. Using a database plug-in mechanism, the VDS 408 is able to transparently intercept LDAP requests bound for objects in the VDS structure and pass these to the VDS 408 for processing. Other LDAP requests will be passed to the original LDAP directory.

Figure 5C:
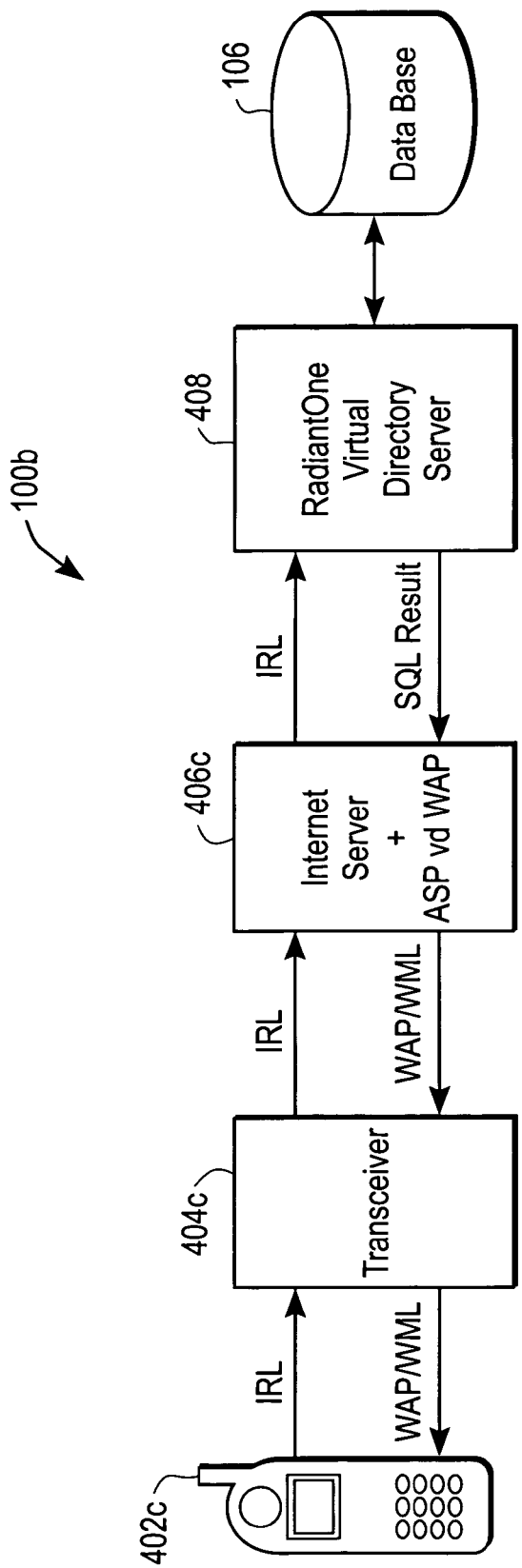

In yet another alternative embodiment of the present invention shown in FIG. 5C, system 100*b* includes server 406*c* and transceiver 404*c* in communication with an alternate embodiment of a client 402*c*. Server 406*c* is further described in FIG. 8A as having a first module 802 and a second module 804. Under the control of the first module 802, the server 406*c* communicates with client application 402*c*. For example, the first module 802 may be an Internet Information Server (IIS) 802, as previously described. Additionally, the SmartBrowser 804 may be embodied as Active Server Pages (ASPs), which are enabled by the IIS 602 to interface therewith. As seen in FIG. 8A, a set of APIs for allowing the virtual directories to be formatted for wireless transmission with (ASP vdWap) module 804 is provided to interface with the IIS 802, and to receive the virtual directory information from VDS 408. System 100*b* also includes a transceiver 404*c* which operates with a plurality of wireless devices. One such wireless device as shown is a mobile phone. In addition to ASPs, the invention works suitably well with JSPs substituted therefore.

As a user makes the request in the form of an HTTP URL command that embeds an Information Resource Locator (IRL), which is forwarded from the client 402*c* to transceiver 404c. Transceiver 404c receives the wireless signal and routes the IRL, most likely via a non-wireless medium to the server 406c. Responsive to receiving the IRL, the server 406a executes the scripts that have been embedded within the page so that the IRL can be forwarded to the VDS 408. The VDS communicates with the back-end relational databases hosting the directory data using OLE DB, or JDBC. SQL commands are generated by server 408 to request the attributes specified for a particular directory object. The result is returned by the VDS 408 to server 406c, preferably in the format of an SQL result.

Figure 8B:
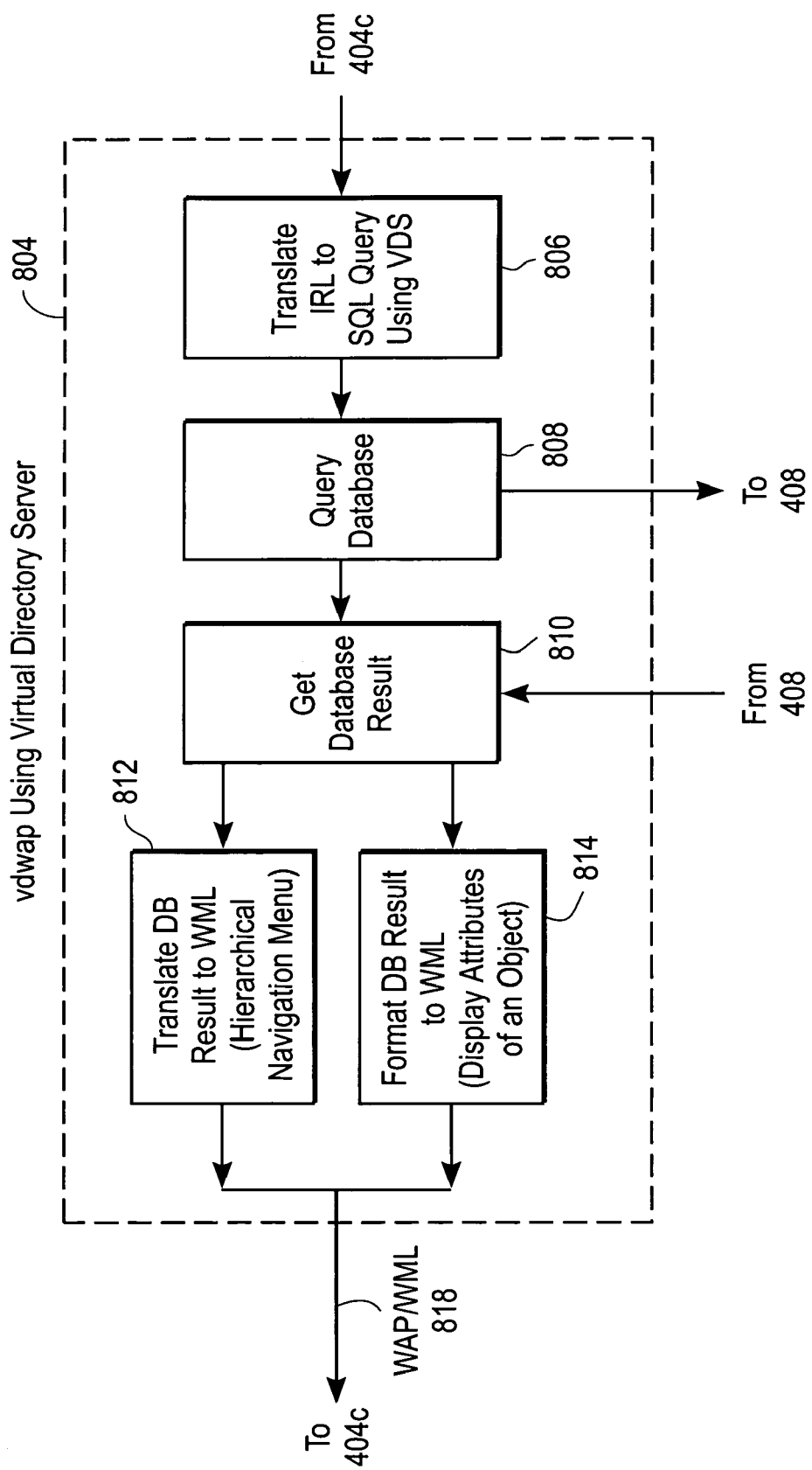
FIG. 8B is a block diagram one embodiment for the ASP vdWap of FIG. 8A.

Server 406c then uses a script 804 to format the result into a Wireless Application Protocol (WAP) standard for providing cellular phones, pagers and other handheld devices with secure access to e-mail and text-based Web pages. FIG. 8B illustrates further details of the script 804. Functions contained in module 812 provide the translation from database results to the a hierarchical navigation menu using WML. WAP provides a complete environment for wireless applications that includes a wireless counterpart of TCP/IP and a framework for telephony integration. WAP features the Wireless Markup Language (WML), which was derived from a streamlined version of HTML for small screen displays. Additionally, module 814 is provided to format a database object in order to display it on the WAP-enabled portable handheld device. Independent of the air interface, WAP runs over many major wireless networks. The transceiver then broadcasts the wireless signal to client 402c. It will also be appreciated that the present invention may work suitably-well with other networked and/or wireless devices, like personal digital assistants (PDAs) having wireless access and/or network capabilities, by way of example.

E. Schema Mapping Application

The fourth module 1062 (i.e., the schema mapping module) includes software to implement the process of how the VDS maps database objects, such as tables, columns, attributes, and other entities into LDAP object classes and attributes. The second module 1062 is preferably implemented or encapsulated within one or more Component Object Models (COM) objects. The COM objects are a way for software components to communicate with each other as is known in the art.

(i) Terminology

Several definitions are now discussed to provide clarity when subsequently describing the process steps of the schema mapping module. Although each of the following terms and notations may refer to different levels of abstraction, for simplicity and without obscuring the present invention, reference may be made interchangeably (i.e., equivalently) when in respective contexts, the terms are associated with the same role. For example, in an Object Model, an Object plays the same role as an entity in the Entities/Relationships model, or a row of a table in the physical data model. The notation $Object_{Object\ Model}$ is defined to mean an object relative to the Object Model context. The text $in_{subscript}$ describes the underlying context. Further, it should be recognized that the following definitions are not intended to limit the applicability of the present invention to relational databases, but matches the definition of the Object Model underlying an Object Oriented (OO) application. Therefore, the abstract mapping as described herein is well-suited for use with any OO component-based application.

The term "schema" has many conventional definitions, but as described herein, it refers to the "physical data model" for an application, that is, the formal set of objects/entities and the relationships between these objects/entities. The manner of how these relationships are physically implemented (e.g., by join operations in the case of RDBMS; and by methods for object and relationship navigation) is a consideration that is handled at a lower level of abstraction by the VDS. Accordingly, the implementation of these relationships does not necessarily impact or change the higher-level design of a virtual directory.

Regarding schemas in general: (1) a physical schema is equivalent to a physical data model; (2) a logical schema is equivalent to a logical data model; and (3) a logical data model is equivalent to an object model. Regarding entities in general: (1) an $Object_{Object\ Model}$ is equivalent to an $Entity_{E/R}$; (2) an $Entity_{E/R}$ is equivalent to a Table-$ROW_{PDM}$; and (3) a Table-$Row_{PDM}$ is equivalent to an $Entry_{LDAP}$. Regarding attributes in general: (1) an $Attribute_{E/R\ LDM}$ is equivalent to a Property/Member/$Attribute_{Object\ Model}$; and (2) a Property/Member/$Attribute_{ObjectModel}$ is equivalent to a $Column_{PDM}$.

Each entity described in a schema is reference by some unique "qualified" name. As such, any schema defines a namespace. The semantics of a schema may be characterized as a type of "closed" world because each application defines a set of entities/objects that is specific to its domain. For example, a "customer entity" that is found in a sales management software application may be the same "customer entity" defined in an unrelated accounting software package, and likely with some different attributes associated therewith. Even though an end-user may have knowledge that this "customer" is the same person, this "extra" information (i.e., the knowledge about the customer) often times referred to as "metadata" is out of the scope of each of the two specific software applications. In accordance with the present invention, the first module 1058 can be used to manage this related "scope" by assigning a different name to each schema being handled.

One exemplary process for capturing a new schema will now be discussed using the functions associated with the first module 1058. Upon invoking the Schema Extraction Wizard 2402, a data source is selected and the schema is analyzed using the first module 1058. Metadata in the nature of objects, attributes and relationships associated with the new schema are saved in a schema file. One manner of naming the schema file is to include an extension of .orx, which is defined to mean Objects and Relationships expressed in XML.

For example, if a schema based on the northwind.mdb data source is captured using the present invention, the name of the schema should preferably be "northwind" unless another name is selected during the schema extraction process. Alternatively, another schema name may be selected to over-write an existing schema name by selecting the Save As command (not explicitly shown in FIG. 19A) from the File drop-down menu 1914 of interface 1900. The name assigned to the schema description save in the schema file should preferably be used by the first module 1058 as the base name for the different LDAP object classes to be created from the schema when mapping the database schema to an LDAP schema. More details about capturing a new schema are discussed in the section entitled Capture the Database Schema.

(ii) Mapping the Captured Schema to an LDAP Schema

Still referring to the fourth module 1062 of FIG. 10B and the flowchart of FIG. 14c, an exemplary process for mapping the database schema to an LDAP schema will now be discussed. Once the schema files have been created, under the control of fourth module 1062, a set of routines or process steps may be invoked to construct the LDAP schema definition corresponding to the database schema. The set of routines may be embodied as software in a utility program referenced, for convenience herein, as the LDAP Schema Builder. For example, the LDAP Schema Builder extracts all the objects and attributes from the schema files and builds the following files: at.conf for attributes; and oc.conf for Object class.

Those skilled in the art will recognize that various specific implementations exists, and will appreciate that the particular notation and syntax used herein are for purposes of discussion. Accordingly, the process for mapping the database schema to an LDAP schema disclosed herein are well-suited for any of the variants introduced by specific implementations, which for example, could arise as between the University of Michigan's Netscape configuration file format, a subset of ASN.1, LDAP.version 3, and Netscape LDAP schema format, among others. ASN.1 represents the Abstract Syntax Notation One, and is defined to mean that mechanism of defining language that peer entities use to communicate across a data communications network, in accordance with the International Telecommunications Union (ITU) as is known in the art.

Each object described in the schema file is translated into an Object class in the LDAP schema. For example, each class name may be defined by the construction: vd_<shema filename>_<object name in schema>, as illustrated in the following Table 1.

TABLE 1

| The object named | Located in the schema file | Generates the Class |
| --- | --- | --- |
| Employees | Northwind.orx | vd_Northwind_Employees |
| Employees | AdvWorks.orx | vd_Advworks_Employees |

Preferably, every object class that is defined should be a descendant of an object class designated as the "top" object class. The top object class is the only LDAP object class that does not have a superclass Additionally, two auxiliary classes may also be defined as: vdapcontainer and vdapobject. While each object declared for the LDAP schema should have its primary key(s) set as a mandatory attribute, all other attributes may be set as optional attributes. Additionally, every object should preferably be defined with the auxiliary class vdaobject. If an object include a descendent, then the descendant should also be declared as a vdacontainer. For example, the Object class attribute for "employees" from the Northwind database would be defined by: ObjectClass=top # vd_Northwind_Employees. If a node in the directory view comprises a join operation that involves two or more objects, then the Object class should preferably include both class names. For example, if a node includes a join operation between the two tables Order_Products and Order_Details, then its Object class would be: ObjectClass=top # vd_Northwind_Order_Products# vd_Northwind_Order_Details.

All attributes of all objects contained in a schema file should be declared as LDAP attributes according to a preferred embodiment of the present invention. The name for the declared LDAP attribute is derived from the attribute name inside the object. For example, if a customer object (e.g., table) in a schema includes an attribute (e.g., column) named companyname, an LDAP attribute name companyname would be declared under the control of the first module 1058. Since LDAP attributes are domain oriented, their names are tied to a specific object class. This means that the attribute names can be defined once, based on their domain-related attributes. By contrast, although attributes in the RDBMS are domain-oriented, their names are tied relative-to the object where they are defined.

One aspect of the present invention resolves incompatibilities in attribute names and data types amongst LDAP and RDBMS. All object attributes are preferably declared as LDAP string types, and an attribute OID is generated. OIDs are defined to mean Object Identifiers, which are numeric identifiers that are defined in ASN.1, and that can be used in LDAP to uniquely identify elements in the protocol, like for example, attribute types and object classes. Each LDAP attribute is preferably declared with a Case Insensitive Syntax (CIS). For example, an attribute declaration may take the form of: attribute CompanyName Vd_Adv_Works.

(iii) Virtual Directory Access Protocol

In accordance with one embodiment of the present invention, a Virtual Directory Access Protocol (VDAP) is used with the LDAP on server 406 as shown in FIG. 5B. In order to better focus on the features of the VDAP, general definitions of LDAP/VDAP classes and attributes will now be described. The attributes of an object that are accessible using an LDAP (base) search are the attributes that are published under the control of the second module 1060, the DirectoryView Designer module. As a default, the views as defined in the first module 1058 should be published with all attributes of an object. However, depending on a specific access path, an object can expose different attributes instead of all attributes by default; the selected exposure of attributes may be controlled by the second module 1060. Accordingly, this means that depending on the directory view and the context desired, the present invention allows selected attributes of an object to be displayed and accessible to a user.

As seen in the embodiments of FIGS. 5B, and 7A the VDAP 704 may be implemented as an auxiliary software program, like for example, a plug-in. In particular implementations, a VDAP plug-in 704 can be provided for the Netscape and iPlanet directory servers, as well as for the IBM Secureway server. A Query filter in the VDAP plug-in 704 should preferably apply to an Object class, and not to a domain. A search can be issued on "companyname" for the object class "customer," but searching for "companyname" across every kind of object is not always relevant.

Each filter in the VDAP is preferably associated with a specific Object class, like for example,

```
(|(&(objectclass = vd_Northwind_Employees)
    (LastName=S*))
  (&(objectclass = vd_Northwind_Product)
    (ProductID>2000))
)
```

Several rules of constitution for DN/RDN in VDAP will now be discussed. Within an LDAP API, an Relative Distinguished Name (RDN, which is a component of a Distinguished Name, as is known in the art) may be specified based on a primary key combined with a "display name." For example, an RDN is defined with AttributeName=customer And display name=FirstName+LastName.

At run-time, and under the control of the third module 1056 for LDAP, the following information will be displayed:

Customer=Janet Levering {231}(where 231 is the primary key value for Janet Levering)

When using the LDAP API, the RDN for this example would be Customer=231. The Distinguished Name (DN) is comprised of a specific set of RDNs. The format of an RDN generally comprises an Attribute Name=Primary Key value, and an optional "display name" value. Still referring to the same example for the RDN, the corresponding DN would be as follows.

DN: customer=Janet Levering, category=Customer, dv=AdvWorks,
o=Radiant Logic, where customer=container level, and o=organization.

The Attribute Name portion of the RDN can be an object (e.g., content or container), a category (e.g., label), or a dv (e.g., link). The Primary Key value portion can be either the actual primary key value or the display name.

Schema mapping module 1062 and DirectoryView Designer module 1060 may be alternatively implemented on a server separate from server 406, and can be use with Windows NT/98/2000 operating system and a web browser such as the Internet Explorer.

F. Namespace Management Application

In accordance with one aspect of the present invention, the VDS 408 separates the data structure mapping and the LDAP namespace creation into two distinct processes. With the first process as described in more detail in the section entitled Schema Mapping Application, relationships in the back-end databases are initially mapped into the VDS server using an automated database schema discovery mechanism. With the second process as described in more detail in the present section, LDAP namespace hierarchies are then built on top of this mapping. As new LDAP attributes and objects are required in the namespace, they can be added using the point and click interface in the DirectoryView Designer application. Changes to the directory structure take effect immediately.

Figure 9:
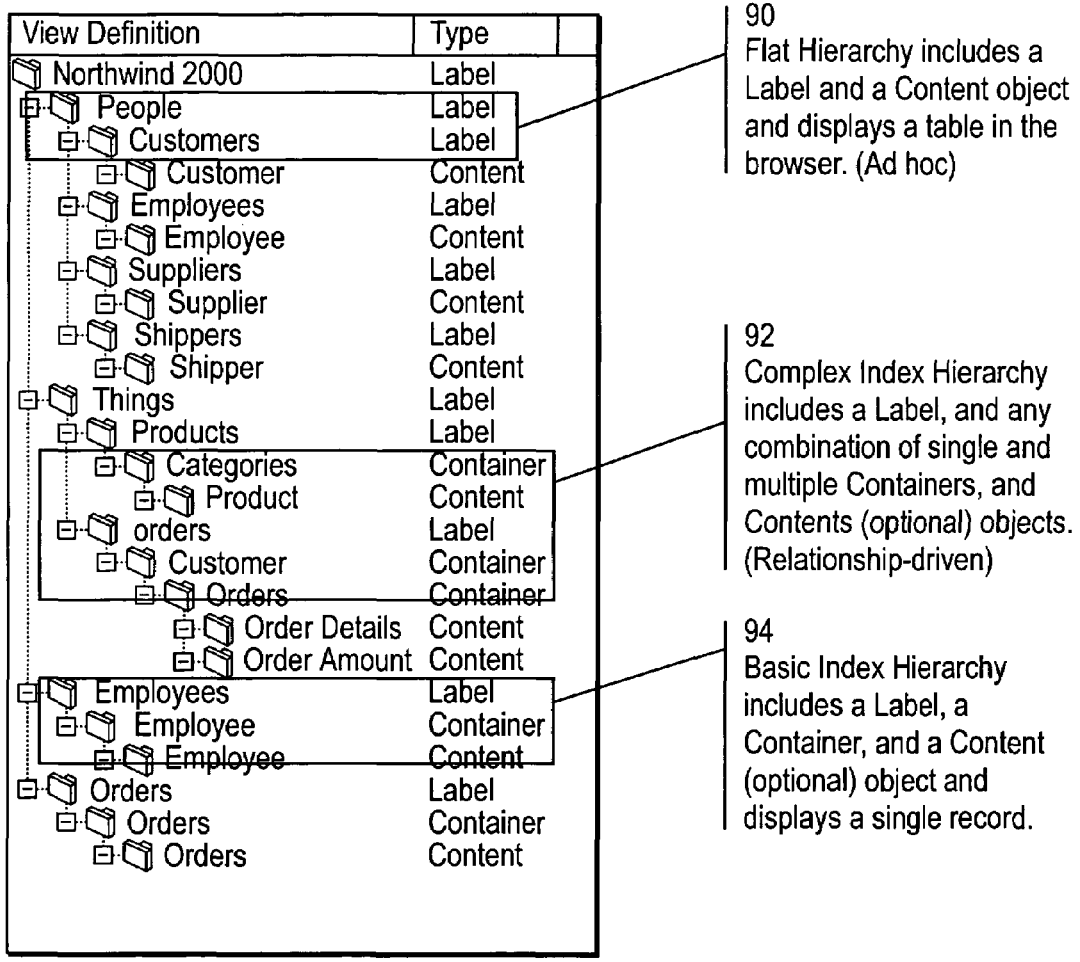
FIG. 9 is an exemplary graphical representation of a user interface for displaying directory view definitions in accordance with the present invention.

In accordance with one aspect of the present invention, hierarchical namespaces can be defined as either flat 90, complex 92, and/or indexed 94, and may be based on existing relationships between objects as shown in FIG. 9. One particular manner of generating a flat namespace base on objects (e.g., tables) contained in a schema has been already described in the section entitled Creating Default View with reference to FIG. 22. Alternatively, the design of namespaces for virtual directories may be implemented under the control of the second module 1060.

When using the second module 1060 as an alternative to creating namespaces, several approaches will now be described. With the first approach, existing relationships between objects, tables and entities for each of the schemas and databases can be published in the hierarchical namespaces. The second module 1060 is designed to maintain knowledge of the existing relationships, so that laying out a complex hierarchical namespace can simply be a matter of selecting the source and destination objects for each level of the hierarchy. An example will provide further clarification as follows, using the symbol <- ->, which is defined to mean "has a relationship with."

IF, a schema has the following relationships:
    customers<--->orders<--->order_details<--->products
    orders<--->employees
THEN, "customers" may be selected as a starting point for the virtual directory hierarchy.

Under the control of the second module 1060, the following hierarchical relationships can be defined in the DIT (where the symbol -> merely represents a level of nesting in the hierarchy of the directory information tree), and designated as Tree 1.

```
Tree 1
customers
    ->orders
        ->order_details
        ->products
        ->employees
```

With the second approach, the directory information tree may be further segmented into context in order to provide a more meaningful, or easier to browse and/or search namespace using "label" containers. The use of containers is a mechanism to segment an existing relationship into categories. For example, Tree 1 can be categorized using labels to develop a more structured DIT, like the one indicated by Tree 2 below.

```
Tree 2
customers
    ->Past Orders_Label
        ->orders
            ->order_details
    ->Sales and Support_Label
        ->employees
    ->Buying Profile_Label
        ->products
```

A label acts as a "pass-through" container for the underlying relationship. The key value of the parent node determines the key value of its descendant nodes through the relationship, independent of the label. In the example pertaining to Tree 2, the relationship between a customer and their orders are preserved, no matter what label is introduced. One technical advantage with the introduction of a label container enables the virtual directory structure to be enhanced based on the criteria that was not explicitly defined in the database schema. That is, the introduction of labels facilitates the browsing and/or searching of the relationship-driven hierarchy, and at the expense of a more lengthier namespace. For example, the DN for Tree 1 without the use of a label is Order=10000, Customer=651; while the DN for Tree 2 with the use of a label is Order= 1000, Label=Past Orders, Customer=651.

Figure 33A:
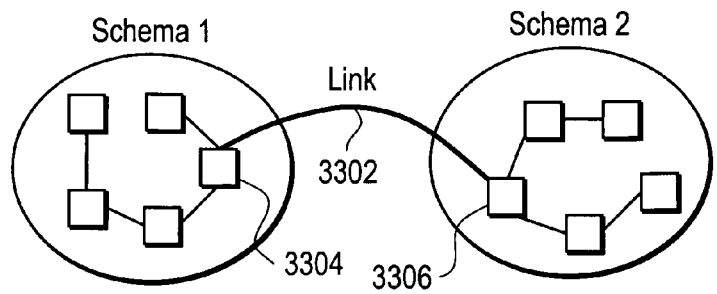
FIGS. 33A–D are exemplary diagrams of the link mechanism utilized for various purposes in accordance with the present invention.
Figure 33B:
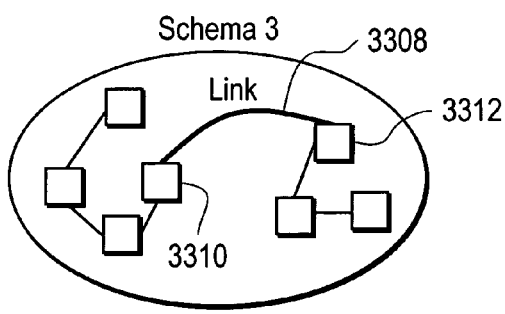
Figure 33C:
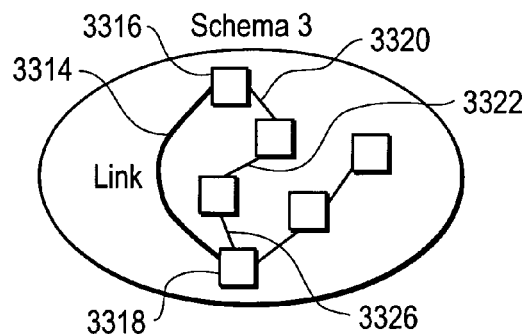
Figure 33D:
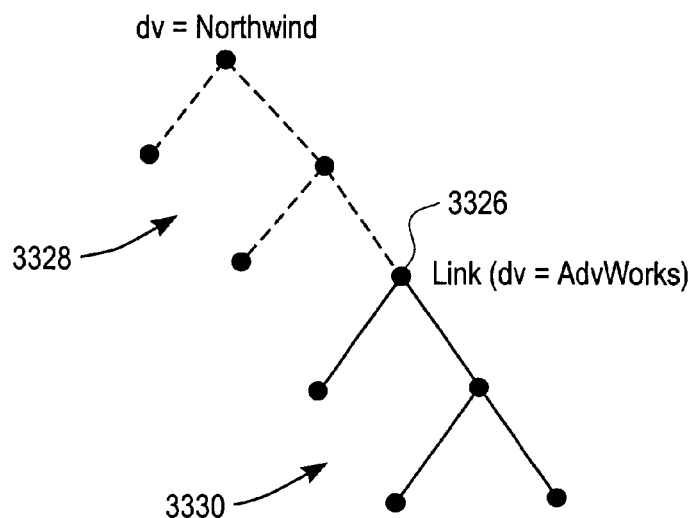

With the third approach, the "ad hoc" relationships between objects not linked within an existing schema or between objects existing amongst different schemas may be created. While a link functions similarly to a label container, a link should preferably not propagate the key value (identity) from a parent node to its descendants. Reference is now made to several examples in FIGS. 33A–D to further clarify how link objects may be used to create "ad hoc" aggregation for objects, schemas and virtual directory trees. As shown in FIG. 33A, a link object 3302 is used to aggregate objects 3304, 3306 existing in different Schemas 1 and 2, respectively. In FIG. 33B, a link object 3308 is used to aggregate objects 3310 and 3312 existing in the same Schema 3, but have no explicit relationship therebetween. Referring to FIG. 33C, a link object 3314 is used to aggregate objects 3316, 3318 existing in the same Schema 3, but whose existing relationships 3320, 3322, 3324 are undesirable for a particular situation. Now referring to FIG. 33D, a link object 3326 is used to aggregate two or more virtual directory trees 3328 and 3330. Virtual DIT 3328 is shown in dotted lines and has top object dv=Northwind, while virtual DIT 3330 is shown in solid lines and has a top object dv=AdvWorks. In the example of FIG. 33D, the linking of virtual DITs can be characterized as "mounting" a sub-tree 3330 into an existing tree 3328. As will become apparent to those skilled in the art, one benefit of the third approach as described is that it enables the aggregation of different virtual directories into a more global directory.

An Exemplary Process for Building Virtual Directory Views

The process of one embodiment for creating "directory views" in accordance with the present invention will now be discussed with focus on an example of building a directory view. Generally, an aspect of the present invention enables the creation of a Directory Information Tree (DIT, used interchangeably herein with "directory tree," "tree," and "directory") of the virtual directory. The DIT can comprise tables, entries and objects representing content and relationships captured and extracted from particular databases. The directory tree can be flat in one embodiment, meaning that the tree has no levels and points directly to specific tables, entries and/or objects. In another embodiment, multilevel hierarchical namespaces can be constructed to "reflect" the relationships that exist between the tables, entities, and objects of the unrelated database. By doing so, different paths of the virtual directory represent simplified "views" to the data, thereby allow end-users a more natural way to browse and/or search for information.

In order to further describe the aspect of representing the multilevel hierarchical namespaces corresponding to relationships of the relational database, the particular example for building a directory view will refer to a "pre-mapped" schema derived from the Microsoft Access database AdvWorks.mdb for discussion purpose only. Also, several assumptions are made to clarify aspects of the present invention in a relatively simple manner so as not to obscure the invention. It is noted that upon initiating the present invention for the first time, the intended database should be mapped with the first module 1058, i.e., the schema manager application 1058.

Figure 32B:
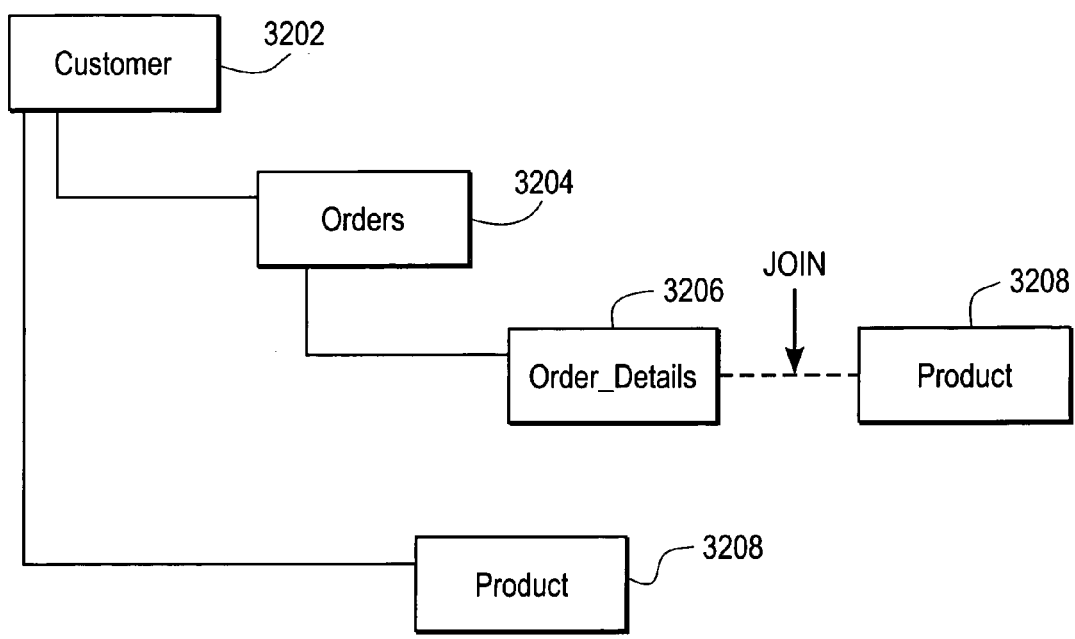
FIG. 32B is a directory tree according to an exemplary namespace of FIG. 32A.

FIG. 32A shows a block diagram of the relationships between four entities as they exist in the AdvWorks schema, namely the Customer 3202, Orders 3204, Order_Details 3206, and Product 3208. The relationships may be summarized as follows: (1) customers place orders; (2) an order comprises a header and lines of order details; and (3) each order detail line references some quantity of product. FIG. 32B shows a block diagram of an exemplary layout of a namespace, that is, a subtree built on top of these four entities. The subtree is the item of interest to be published in the virtual directory of the present invention.

The virtual directory for the directory tree shown in FIG. 32B is created by the second module 1060, referred to herein as the DirectoryView Designer™ interface. During runtime, the virtual directory server 408 uses the description created by the DirectoryView Designer™ interface to instantiate the corresponding "virtual" LDAP directory tree. This process involves translating "entities" (e.g., the database tables) into "virtual" LDAP Objectclasses. As seen in FIG. 32B, the namespace is structured around four Objectclasses: Customer, Orders, Order_Details and Product.

The hierarchy of the directory tree shown in FIG. 32B is derived from the existing and underlying relationship amongst these four entities. More precisely, the resulting "directory views" will show for each customer, the orders they placed, the details for each order placed, and a direct list of products that the customers purchased. The hierarchy depicts a direct relationship between the customer and the products they have purchased, leaving out all ordering details. One advantage for doing so is to provide a representation of the products that have been purchased by a customer, yet without the details of the intermediate steps concerning the order.

One aspect of the present invention provides a mechanism to directly relate information that is currently linked indirectly by relationships. More specifically, the present invention enables the creation of an intermediate view for linking related information. In this particular example, the namespace can be organized so that customers are directly linked to products, that is, by using the Orders and Order_Details as an intermediate link.

The particular operation that is performed to create the intermediate view is an SQL join operation, as is known by those skilled in the art of RDBMS technology. In accordance with the present invention, the provision of an intermediate view simplifies the design process by suppressing the need to utilize an external query tool. The initial Order_Detail table extracted from the database will typically include a reference key to the product table; however, additional information about the product table can be shown in the order details. As such, the present invention enables more information about the product to be displayed at the directory level as the product is referenced in the order details.

An Exemplary Distributed System for Building Virtual Directory Views

Figure 16A:
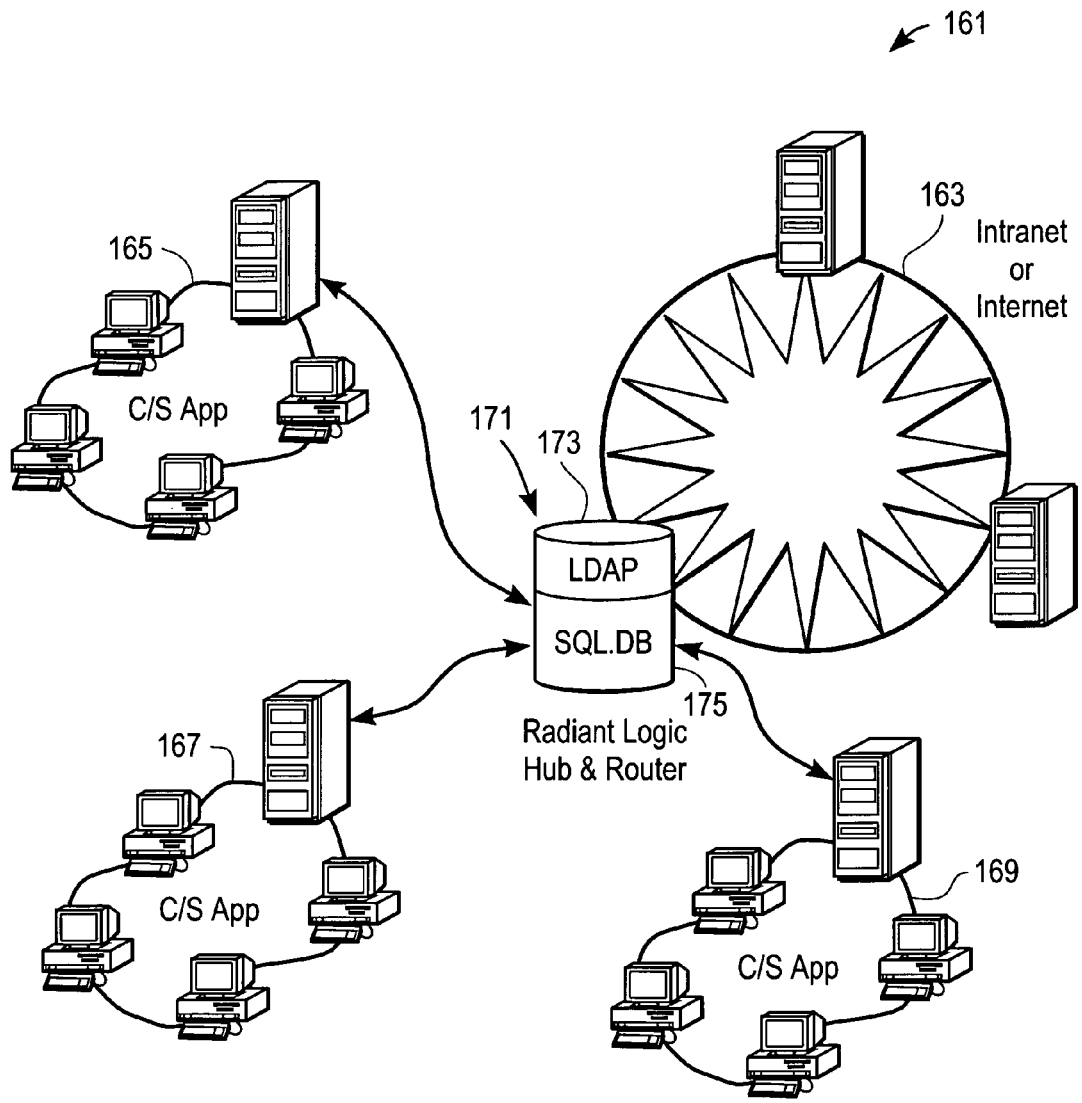
FIG. 16A is a diagram of an embodiment of a hub and router system.

Referring to FIG. 16A, there is shown a distributed computing system 161 comprising a first network 163, a second network 165, a third network 167, and a fourth network 169. Distributed computing system 161 also includes a VDS 171, which includes an LDAP interface 173 in communication with a database interface 175. VDS 171 is coupled to the first network 163, the second network 165, the third network 167, and the fourth network 169, and enables communication amongst all networks. More specifically, and to enable B2B applications, VDS 171 is used as central hub for message routing. In particular, VDS 171 facilitates communication between satellite networks (e.g., 163, 165, 167, and 169) by functioning as a router of messages sent amongst the networks. The universal addressing scheme similar to the embodiments discussed herein is used with the VDS 171 beneficially to: (1) discern addresses associated with data distributed amongst each network; and (2) route information amongst networks to other networks. As such, VDS 171 unites conventional inward-focused, tightly controlled environments by unlocking their corresponding data for use by other applications and users in a decentralized manner.

Figure 16B:
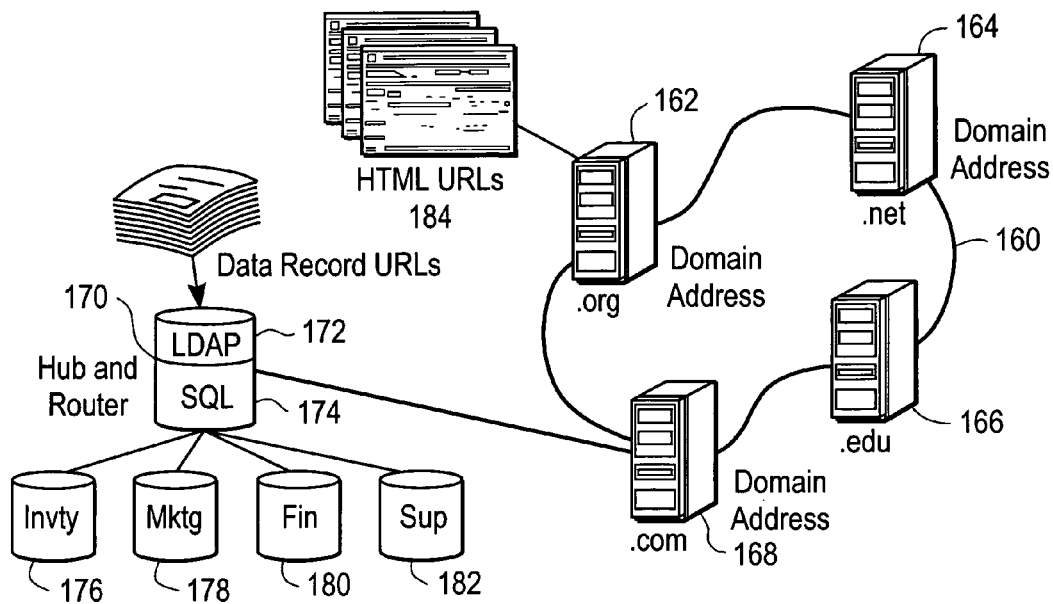
FIG. 16B illustrates one manner for using LDAP to uniquely address database records at a "finer" level of granularity than permitted by conventional DNS namespace.

FIG. 16B illustrates a network 160 comprising a plurality of domain name servers 162, 164, 166, and 168. Network 160 maybe the Internet, by way of example. Domain name server 168 is communicatively coupled to a VDS 170. In the embodiment of FIG. 16B, VDS 170 includes an LDAP interface 172 in communication with database interface 174. Interface 174 is coupled to various relational databases 176, 178, 180 and 182. Effectively, VDS 170 functions as a hub and router device to aggregate information. In particular, VDS 170 functions as a central aggregation point for diverse heterogeneous enterprise data. Rather than physically extracting and storing the data from the various databases 176, 178, 180 and 182, the VDS 170 stores addresses for the location of such data. Similar to how a URL 184 is used as an address for a web page, VDS 170 uses an IRL to retrieve the relational database information using the techniques described herein with respect to the VDI combined with industry standard LDAP functions.

Figure 16C:
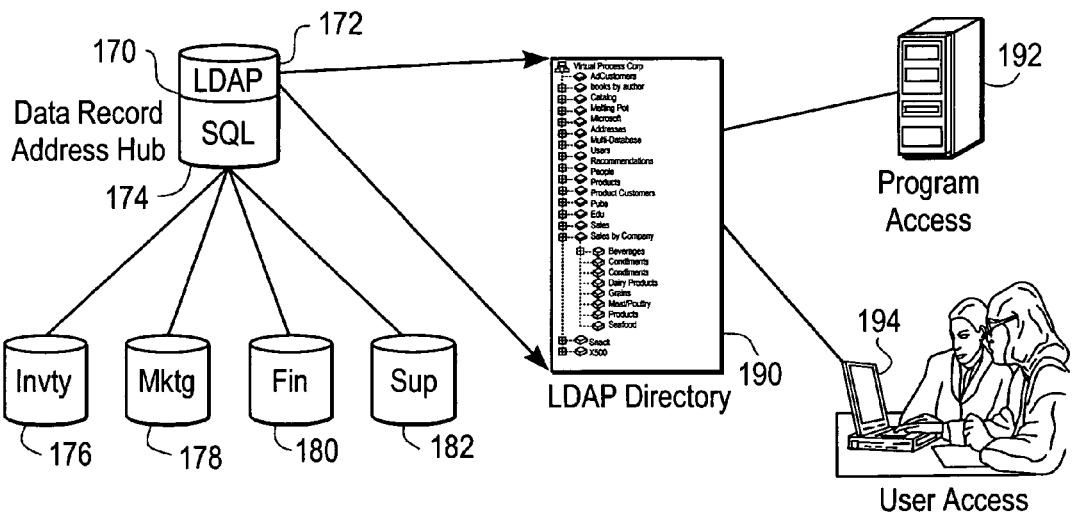
FIG. 16C illustrates structured data indexes being stored in a hub and expressed as an LDAP address.

As shown in more detail in FIG. 16C, VDS 170 provides an LDAP interface to relational database data, through a combined presentation 190 of the LDAP directory. When VDS 170 receives a query in the form of an IRL, VDS 170 formats the query in SQL and routes it to the relevant databases. In response, data is returned to the entity requesting the query. This entity may comprise a user 194 and/or an application implemented on a computing device 192. For example, the format of the combined presentation 190 of the result can be in HTML for user 194, and/or in XML for computing device 192. As a result, LDAP thereby enables navigation through complex corporate back-end databases to be simply deployed in accordance with the present invention.

Although the invention has been described in considerable detail with reference to certain embodiments, other embodiments are possible. As will be understood by those of skill in the art, the invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A method for building standard-based hierarchical view definitions, comprising steps of:
   capturing relationships and objects from a first data source and a second data source, each data source having a data model, the first data source having a data model different from the second data source;
   mapping the relationships and objects captured into a set of hierarchical paths; creating a virtual directory of the hierarchical paths; and forming a combined presentation of the view definitions based on the hierarchical paths.

2. A method for building view definitions according to claim 1, further comprising the step of transferring the combined presentation for display and modification.

3. A system for building view definitions, comprising:
   a server for accessing a first data source and a second data source, each data source having a data model, the first data source having a relational data model, the second data source having a data model different from the first data source, in response to an instruction received from a client device communicatively coupled to the server;
   coupled to the server, a database for providing the relational data of the first data source;
   a module for capturing the relational data from the database;
   a module for converting the relational data into a set of hierarchical paths;
   a module for creating a virtual directory of the hierarchical paths; and
   a module for navigating the hierarchical paths from the client device.

4. A computer program product for building standard-based hierarchical view definitions, the computer program product stored on a computer readable medium, and adapted to perform the operations of:
   capturing relationships and objects from a first data source and a second data source, each data source having a data model, the first data source having a data model different from the second data source;
   mapping the relationships and objects captured into a set of hierarchical paths;
   creating a virtual directory of the hierarchical paths; and
   forming a combined presentation of the view definitions based on the hierarchical paths.

5. A system for providing hierarchical representation of a first data source and a second data source, each data source having a data model, the first data source having a relational data model, the second data source having a data model different from the first data source, comprising:
   a first server capturing the relational data of the first data source from a database coupled to the server;
   coupled to the first server, a virtual server mapping the relational data captured into a virtual directory of hierarchical representations; and
   an interface application coupled to the first server for forming a presentation of the virtual directory for display.

6. The method of claim 1 wherein each data source is selected from the group of: a network operating system, a database, an application, a web service protocol, and a directory structure.

7. The method of claim 6 wherein the database is a relational database.

8. The method of claim 2 further comprises: transferring the combined presentation in a form viewable on a device that is one from the group: a browser, an electronic mail display device, and a wireless portable device.

9. The system of claim 5 wherein the presentation display is selected from the group consisting of: a browser, electronic mail display, and on a wireless portable device.

* * * * *